(12) United States Patent
Abe et al.

(10) Patent No.: US 11,601,669 B2
(45) Date of Patent: Mar. 7, 2023

(54) IMAGE ENCODING DEVICE, IMAGE DECODING DEVICE, IMAGE ENCODING METHOD, AND IMAGE DECODING METHOD

(71) Applicant: Panasonic Intellectual Property Corporation of America, Torrance, CA (US)

(72) Inventors: Kiyofumi Abe, Osaka (JP); Takahiro Nishi, Nara (JP); Tadamasa Toma, Osaka (JP); Ryuichi Kanoh, Osaka (JP); Chong Soon Lim, Singapore (SG); Ru Ling Liao, Singapore (SG); Hai Wei Sun, Singapore (SG); Sughosh Pavan Shashidhar, Singapore (SG); Han Boon Teo, Singapore (SG); Jing Ya Li, Singapore (SG)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 17/534,898

(22) Filed: Nov. 24, 2021

(65) Prior Publication Data
US 2022/0086476 A1 Mar. 17, 2022

Related U.S. Application Data

(63) Continuation of application No. 16/894,020, filed on Jun. 5, 2020, now Pat. No. 11,218,717, which is a
(Continued)

(30) Foreign Application Priority Data

Sep. 13, 2018 (SG) .............................. 10201807934T

(51) Int. Cl.
*H04N 19/513* (2014.01)
*H04N 19/132* (2014.01)
(Continued)

(52) U.S. Cl.
CPC ......... *H04N 19/513* (2014.11); *H04N 19/132* (2014.11); *H04N 19/176* (2014.11); *H04N 19/563* (2014.11)

(58) Field of Classification Search
CPC .. H04N 19/513; H04N 19/132; H04N 19/176; H04N 19/563
See application file for complete search history.

(56) References Cited

U.S. PATENT DOCUMENTS

| 2013/0272410 A1 | 10/2013 | Seregin et al. |
| 2018/0376166 A1 | 12/2018 | Chuang et al. |

(Continued)

FOREIGN PATENT DOCUMENTS

| WO | 2018/113658 | 6/2018 |
| WO | 2018/230493 | 12/2018 |

OTHER PUBLICATIONS

International Search Report dated Apr. 30, 2019 in International (PCT) Application No. PCT/JP2018/044326.
(Continued)

*Primary Examiner* — Hesham K Abouzahra
(74) *Attorney, Agent, or Firm* — Wenderoth, Lind & Ponack, L.L.P.

(57) ABSTRACT

The present disclosure provides systems and methods for video coding. The systems include, for example, an image encoder comprising: circuitry; and a memory coupled to the circuitry, wherein the circuitry, in operation, performs the following: predicting a first block of prediction samples for a current block of a picture, wherein predicting the first block of prediction samples includes at least a prediction
(Continued)

process with a motion vector from a different picture; padding the first block of prediction samples to form a second block of prediction samples, wherein the second block is larger than the first block; calculating at least a gradient using the second block of prediction samples; and encoding the current block using at least the calculated gradient.

2 Claims, 51 Drawing Sheets

Related U.S. Application Data continuation of application No. PCT/JP2018/044326, filed on Nov. 30, 2018.

(60) Provisional application No. 62/596,396, filed on Dec. 8, 2017.

(51) Int. Cl.
*H04N 19/176* (2014.01)
*H04N 19/563* (2014.01)

(56) References Cited

U.S. PATENT DOCUMENTS

| 2019/0191171 | A1* | 6/2019 | Ikai | H04N 19/117 |
| 2019/0320199 | A1* | 10/2019 | Chen | H04N 19/176 |
| 2019/0356909 | A1* | 11/2019 | Lainema | H04N 19/182 |

OTHER PUBLICATIONS

H.265 (ISO/IEC 23008-2 High Efficiency video coding (HEVC)), Dec. 1, 2013.
Wei-ge Chen et al., "Repetitive and Morphological Padding for Object-based video Coding", Proceedings of International Conference on Image Processing, Oct. 1997, pp. 373-376.
Jianle Chen et al., Algorithm Description of Joint Exploration Test Model 7 (JEM 7), Joint Video Exploration Team (JVET) of ITU-T SG16 WP3 and ISO/IEC JTC1/SC29/WG11, Document: JVET-G1001-v1, Jul. 2017.
Tadamada Toma et al., "Description of SDR video coding technology proposal by Panasonic", Joint Video Experts Team (JVET) of ITU-T SG16 WP3 and ISO/IEC JTC1/SC29/WG11, Document: JVET-J0020-v1, Apr. 2018.
Office Action dated Apr. 21, 2022 in Indian Patent Application No. 202047028241.

\* cited by examiner

FIG. 3

| TRANSFORM TYPE | BASIS FUNCTION $T_i(j)$, $i, j = 0, 1, ..., N-1$ |
|---|---|
| DCT-II | $T_i(j) = \omega_0 \cdot \sqrt{\dfrac{2}{N}} \cdot \cos\left(\dfrac{\pi \cdot i \cdot (2j+1)}{2N}\right)$<br><br>WHERE $\omega_0 = \begin{cases} \sqrt{\dfrac{2}{N}} & i = 0 \\ 1 & i \neq 0 \end{cases}$ |
| DCT-V | $T_i(j) = \omega_0 \cdot \omega_1 \cdot \sqrt{\dfrac{2}{2N-1}} \cdot \cos\left(\dfrac{2\pi \cdot i \cdot j}{2N-1}\right)$<br><br>WHERE $\omega_0 = \begin{cases} \sqrt{\dfrac{2}{N}} & i = 0 \\ 1 & i \neq 0 \end{cases}$, $\omega_1 = \begin{cases} \sqrt{\dfrac{2}{N}} & j = 0 \\ 1 & j \neq 0 \end{cases}$ |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| DST-I | $T_i(j) = \sqrt{\dfrac{2}{N+1}} \cdot \sin\left(\dfrac{\pi \cdot (i+1) \cdot (j+1)}{N+1}\right)$ |
| DST-VII | $T_i(j) = \sqrt{\dfrac{4}{2N+1}} \cdot \sin\left(\dfrac{\pi \cdot (2i+1) \cdot (j+1)}{2N+1}\right)$ |

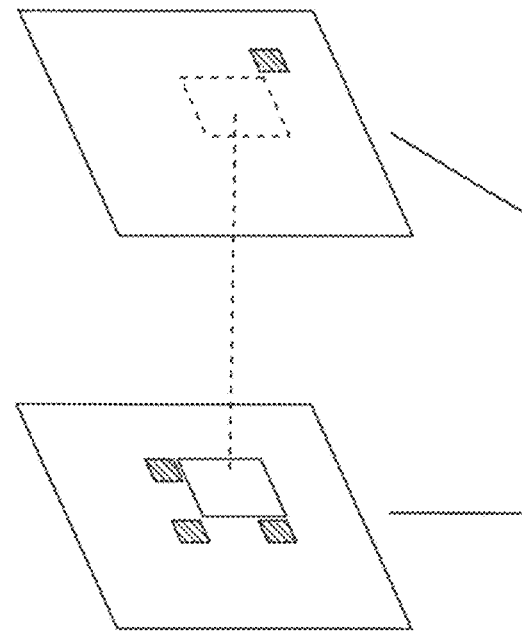

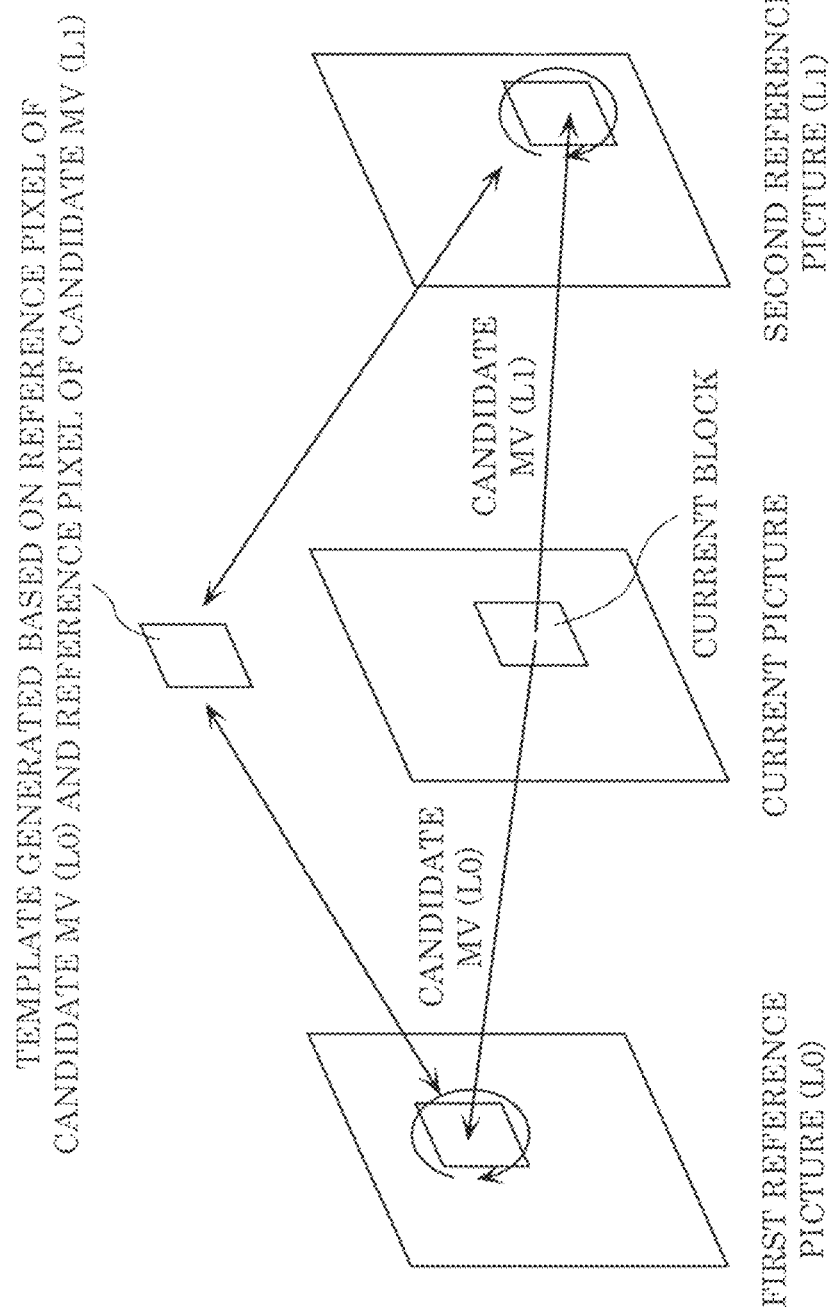

S101: Start block unit loop
S102: Start L0/L1 picture loop
S103: Drive/get moving picture
S104: Acquire predicted image
S105: Acquire gradient image
S106: End L0/L1 picture loop
S107: Start sub-block unit loop
S108: Derive local motion estimation value
S109: Generate final predicted image
S110: End sub-block unit loop
S111: End block unit loop

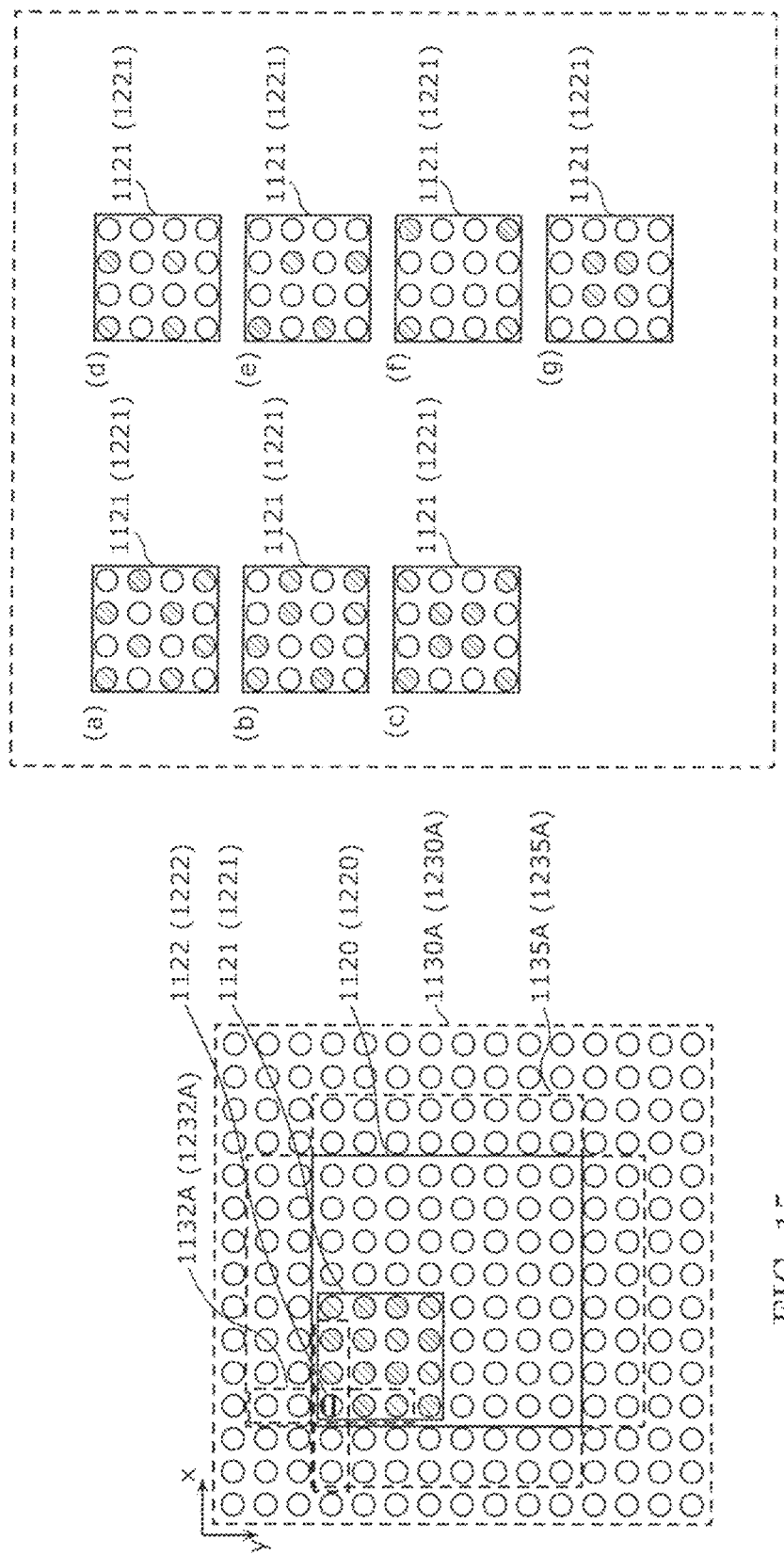

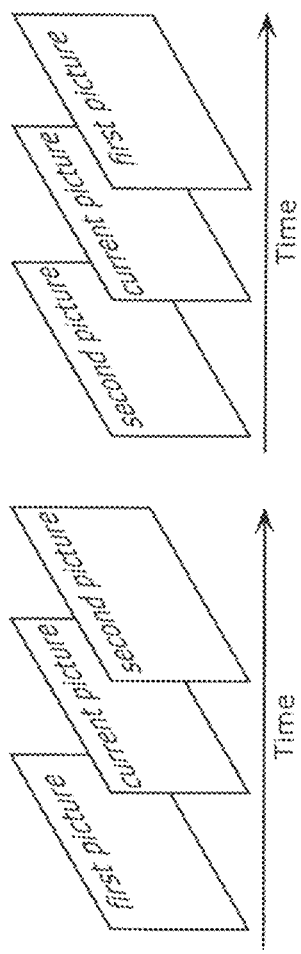
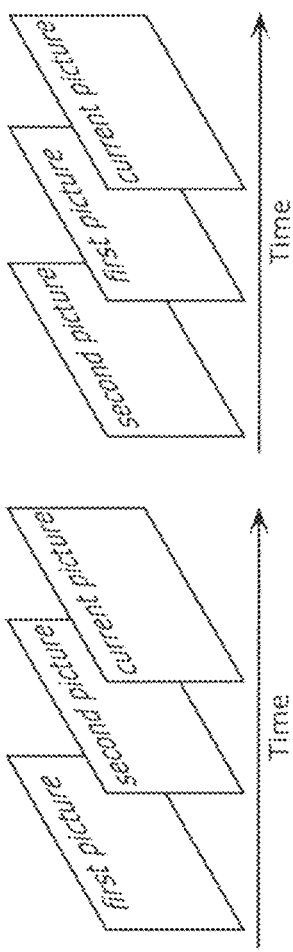
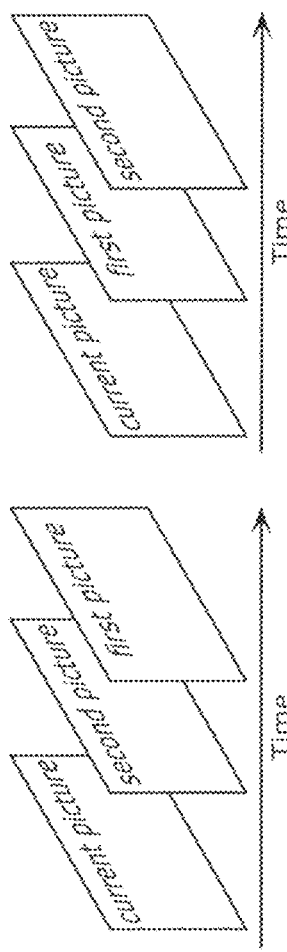
FIG. 18A
FIG. 18B
FIG. 18C

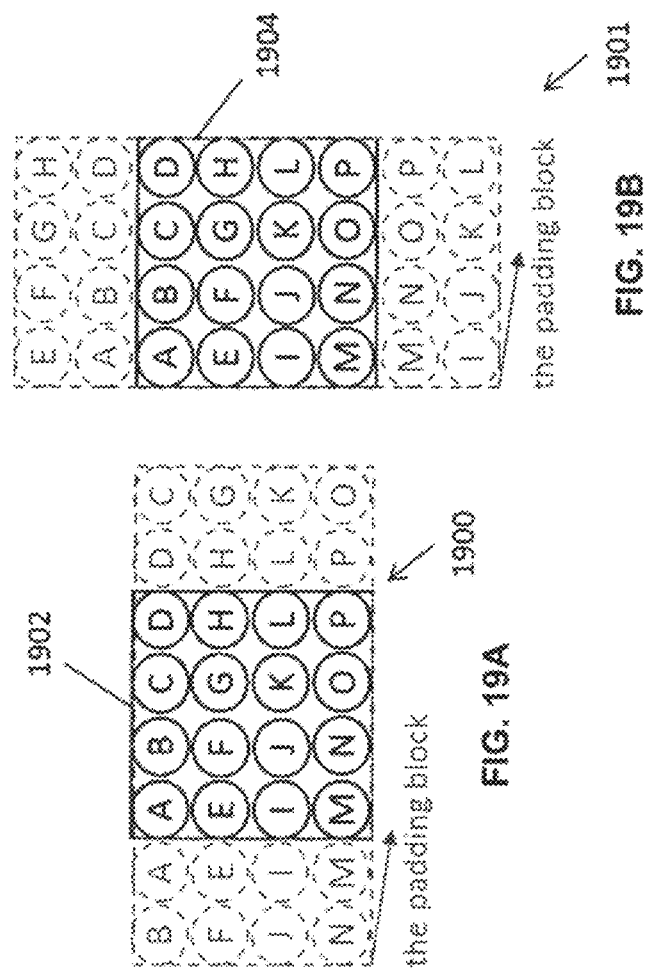

FIG. 21A

| Fractional part of motion vector | Gradient filter |
|---|---|
| 0 | { 2, -9, 0, 9, -2 } |
| 1/16 | { 2, -9, 0, 9, -2 } |
| 1/8 | { 2, -9, 0, 9, -2 } |
| 3/16 | { 2, -9, 0, 9, -2 } |
| 1/4 | { 2, -9, 0, 9, -2 } |
| 5/16 | { 2, -9, 0, 9, -2 } |
| 3/8 | { 2, -9, 0, 9, -2 } |
| 7/16 | { 2, -9, 0, 9, -2 } |
| 1/2 | { 2, -9, 0, 9, -2 } |

FIG. 21B

| Fractional part of motion vector | Gradient filter |
|---|---|
| 0 | { 8, -39, -3, 46, -17, 5 } |
| 1/16 | { 8, -32, -13, 50, -18, 5 } |
| 1/8 | { 7, -27, -20, 54, -19, 5 } |
| 3/16 | { 6, -21, -29, 57, -18, 5 } |
| 1/4 | { 4, -17, -36, 60, -15, 4 } |
| 5/16 | { 3, -9, -44, 61, -15, 4 } |
| 3/8 | { 1, -4, -48, 61, -13, 3 } |
| 7/16 | { 0, 1, -54, 60, -9, 2 } |
| 1/2 | { -1, 4, -57, 57, -4, 1 } |

| Fractional part of motion vector | Gradient Filter | | | |
|---|---|---|---|---|
| 0 | { | -1, | 0, | 1} |
| 1/16 | { | -1, | 0, | 1} |
| 1/8 | { | -1, | 0, | 1} |
| 3/16 | { | -1, | 0, | 1} |
| 1/4 | { | -1, | 0, | 1} |
| 5/16 | { | -1, | 0, | 1} |
| 3/8 | { | -1, | 0, | 1} |
| 7/16 | { | -1, | 0, | 1} |
| 1/2 | { | -1, | 0, | 1} |

FIG. 21C

| Fractional part of motion vector | Gradient Filter | | | |
|---|---|---|---|---|
| 0 | { | -1, | -1, | 1} |
| 1/16 | { | -1, | -1, | 1} |
| 1/8 | { | -1, | -1, | 1} |
| 3/16 | { | -1, | -1, | 1} |
| 1/4 | { | -1, | -1, | 1} |
| 5/16 | { | -1, | -1, | 1} |
| 3/8 | { | -1, | -1, | 1} |
| 7/16 | { | -1, | -1, | 1} |
| 1/2 | { | -1, | -1, | 1} |

FIG. 21D

| top-left block | top block | top-right block |
| --- | --- | --- |
| left block | current block | right block |
| bottom-left block | bottom block | bottom-right block |

FIG. 31

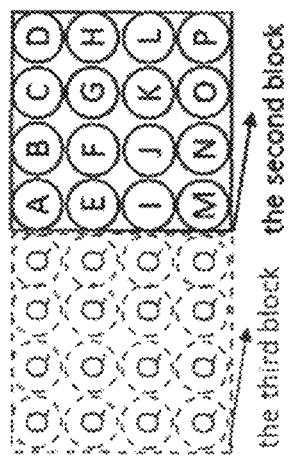
FIG. 32A
FIG. 32B
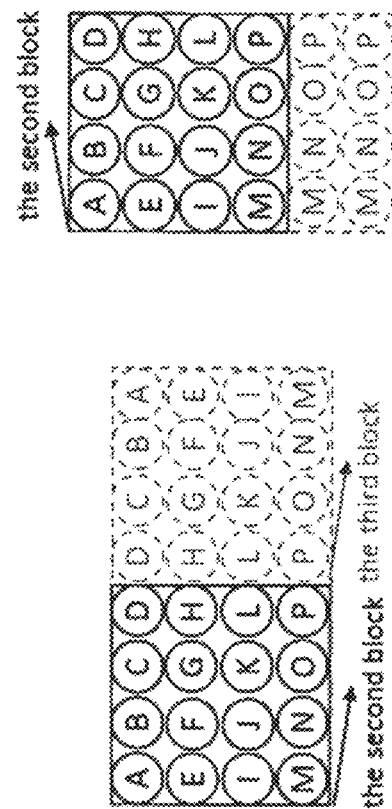
FIG. 32C
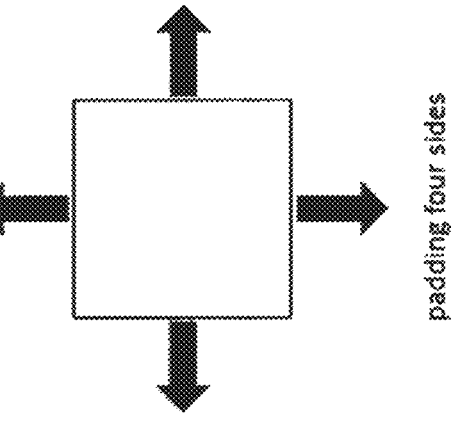
padding one side
FIG. 33A
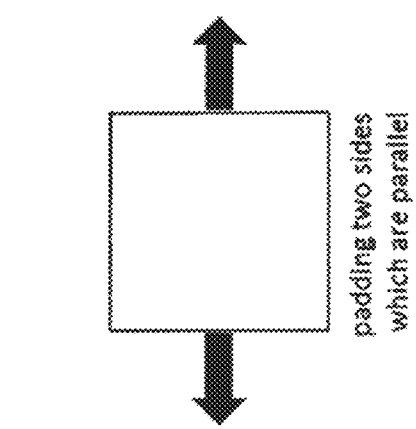
padding two sides which are orthogonal
FIG. 33B
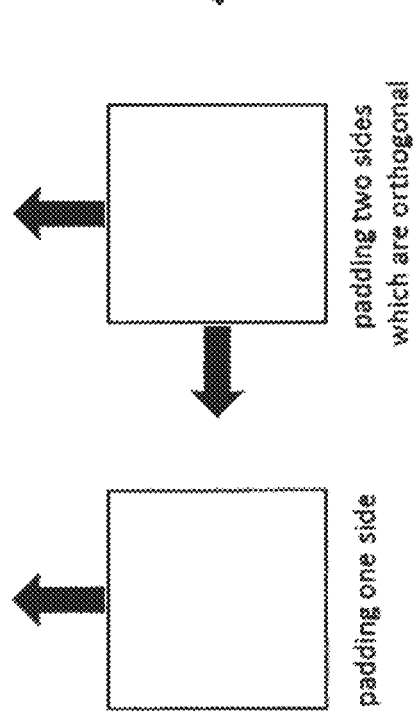
padding two sides which are parallel
FIG. 33C
padding four sides
FIG. 33D

IMAGE ENCODING DEVICE, IMAGE DECODING DEVICE, IMAGE ENCODING METHOD, AND IMAGE DECODING METHOD

BACKGROUND

1. Technical Field

This disclosure relates to video coding, and particularly to video encoding and decoding systems, components, and methods for performing an inter prediction function to predict a current frame based on a reference frame.

2. Description of the Related Art

The video coding standards known as High-Efficiency Video Coding (HEVC) have been standardized by the Joint Collaborative Team on Video Coding (JCT-VC).

With advancement in video coding technology, from H. 261 and MPEG-1 to H. 264/AVC (Advanced Video Coding), MPEG-LA, H. 265/HEVC (High Efficiency Video Coding) and H. 266/VVC (Versatile Video Codec), there remains a constant need to provide improvements and optimizations to the video coding technology to process an ever increasing amount of digital video data in various applications. This disclosure relates to further advancements, improvements and optimizations in video coding, particularly in an inter prediction function to build a prediction of a current frame based on a reference frame.

SUMMARY

One aspect of the present disclosure is an encoder for encoding a block to be coded in a picture using inter prediction, the encoder comprising a processor and memory, and the processor using the memory to perform the steps of: acquiring two predicted images from two reference pictures by performing motion compensation using motion vectors corresponding to each of the two reference pictures; acquiring two gradient images corresponding to the two predicted images from the two reference pictures; deriving local motion estimation values using the two predicted images and the two gradient images in sub-blocks obtained by dividing the block to be coded; and generating a final prediction image of the block to be coded using the two predicted images, the two gradient images, and the local motion estimation values of the sub-block.

In accordance with another aspect of the present disclosure, there is provided an image encoder comprising circuitry and a memory coupled to the circuitry. The circuitry, in operation, performs the following: predicting a first block of prediction samples for a current block of a picture, wherein predicting the first block of prediction samples includes at least a prediction process with a motion vector from a different picture; padding the first block of prediction samples to form a second block of prediction samples, wherein the second block is larger than the first block; calculating at least a gradient using the second block of prediction samples; and encoding the current block using at least the calculated gradient.

In accordance with another aspect of the present disclosure, there is provided an image encoder comprising circuitry and a memory coupled to the circuitry. The circuitry, in operation, performs the following: predicting a first block of prediction samples for a current block of a picture, wherein predicting the first block of prediction samples includes at least a prediction process with a motion vector from a different picture; padding the first block of prediction samples to form a second block of prediction samples, wherein the second block is larger than the first block; performing an interpolation process using the second block of prediction samples; and encoding the current block using at least a resulting block of the interpolation process.

In accordance with another aspect of the present disclosure, there is provided an image encoder comprising circuitry and a memory coupled to the circuitry. The circuitry, in operation, performs the following: predicting a first block of prediction samples for a current block of a picture, wherein predicting the first block of prediction samples includes at least a prediction process with a motion vector from a different picture; padding a second block of prediction samples to form a third block of prediction samples, wherein the second block is neighboring to the current block; performing an overlapped block motion compensation process using at least the first block and the third block of prediction samples; and encoding the current block using at least a resulting block of the overlapped block motion compensation process.

In accordance with another aspect of the present disclosure, there is provided an image encoder comprising circuitry and a memory coupled to the circuitry. The circuitry, in operation, performs the following: predicting a first block of prediction samples for a current block of a picture, wherein predicting the first block of prediction samples includes at least a prediction process with a first motion vector from a different picture; deriving a second motion vector for the current block with a dynamic motion vector refreshing (DMVR) process using at least the first motion vector; performing an interpolation process for the current block using the second motion vector, wherein the interpolation process includes a padding process; and encoding the current block using at least a resulting block of the interpolation process.

In accordance with another aspect of the present disclosure, there is provided an image decoder comprising circuitry and a memory coupled to the circuitry. The circuitry, in operation, performs the following: predicting a first block of prediction samples for a current block of a picture, wherein predicting the first block of prediction samples includes at least a prediction process with a motion vector from a different picture; padding the first block of prediction samples to form a second block of prediction samples, wherein the second block is larger than the first block; calculating at least a gradient using the second block of prediction samples; and decoding the current block using at least the calculated gradient.

In accordance with another aspect of the present disclosure, there is provided an image decoder comprising circuitry and a memory coupled to the circuitry. The circuitry, in operation, performs the following: predicting a first block of prediction samples for a current block of a picture, wherein predicting the first block of prediction samples includes at least a prediction process with a motion vector from a different picture; padding the first block of prediction samples to form a second block of prediction samples, wherein the second block is larger than the first block; performing an interpolation process using the second block of prediction samples; and decoding the current block using at least a resulting block of the interpolation process.

In accordance with another aspect of the present disclosure, there is provided an image decoder comprising circuitry and a memory coupled to the circuitry. The circuitry, in operation, performs the following: predicting a first block of prediction samples for a current block of a picture, wherein predicting the first block of prediction samples includes at least a prediction process with a motion vector from a different picture; padding a second block of prediction samples to form a third block of prediction samples, wherein the second block is neighboring to the current block; performing an overlapped block motion compensation process using at least the first block and the third block of prediction samples; and decoding the current block using at least at least a resulting block of the overlapped block motion compensation process.

In accordance with another aspect of the present disclosure, there is provided an image decoder comprising circuitry and a memory coupled to the circuitry. The circuitry, in operation, performs the following: predicting a first block of prediction samples for a current block of a picture, wherein predicting the first block of prediction samples includes at least a prediction process with a first motion vector from a different picture; deriving a second motion vector for the current block with a dynamic motion vector refreshing (DMVR) process using at least the first motion vector; performing an interpolation process for the current block using the second motion vector, wherein the interpolation process includes a padding process; and decoding the current block using at least a resulting block of the interpolation process.

In accordance with another aspect of the present disclosure, there is provided an image encoding method. The image encoding method comprises enabling an image encoder performing steps in accordance with various aspects of the present disclosure as described herein.

In accordance with another aspect of the present disclosure, there is provided an image decoding method. The image decoding method comprises enabling an image decoder performing steps in accordance with various aspects of the present disclosure as described herein.

These general and specific embodiments may be realized using systems, methods, integrated circuits, computer programs, or media such as computer-readable CD-ROMs, and may be realized by a combination of systems, methods, integrated circuits, computer programs, and media.

Some implementations of embodiments of the present disclosure may improve an encoding efficiency, may simplify an encoding/decoding process, may accelerate an encoding/decoding process speed, may efficiently select appropriate components/operations used in encoding and decoding such as appropriate filter, block size, motion vector, reference picture, reference bloc, etc.

Additional benefits and advantages of the disclosed embodiments will become apparent from the specification and drawings. The benefits and/or advantages may be individually obtained by the various embodiments and features of the specification and drawings, not all of which need to be provided in order to obtain one or more of such benefits and/or advantages.

It should be noted that general or specific embodiments may be implemented as a system, a method, an integrated circuit, a computer program, a storage medium, or any selective combination thereof.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

In the drawings, identical reference numbers identify similar elements. The sizes and relative positions of elements in the drawings are not necessarily drawn to scale.

FIG. 3 is a table indicating transform basis functions of various transform types;

FIG. 9B illustrates one example of a process for deriving a motion vector in merge mode;

FIG. 9C is a conceptual diagram illustrating an example of DMVR (dynamic motion vector refreshing) processing;

FIG. 15 is a conceptual diagram used to explain an example of a reference range for a gradient filter in accordance with Modified Example 1 of the embodiment shown in FIG. 11;

FIG. 16 is a diagram showing an example of pixel patterns referenced by deriving local motion estimation values in accordance with Modified Example 2 of the embodiment shown in FIG. 11;

FIG. 18A is a conceptual diagram illustrating an example of picture order counts of the picture and the different picture. In FIG. 18A, the picture may be referenced as a current picture, and the different picture may be referenced as a first picture or a second picture;

FIG. 18B is a conceptual diagram illustrating another example of picture order counts of the picture and the different picture;

FIG. 18C is a conceptual diagram illustrating yet another example of picture order counts of the picture and the different picture;

FIG. 19A illustrates an example of padding direction for padding a block of prediction samples in accordance with the example of the image encoding/decoding method as shown in FIG. 17;

FIG. 19B illustrates another example of padding direction for padding a block of prediction samples in accordance with the example of the image encoding/decoding method as shown in FIG. 17;

FIG. 21A illustrates an example of a gradient filter for a block;

FIG. 21B illustrates an example of multiple gradient filters for a block;

FIG. 21C illustrates yet another example of a gradient filter for a block;

FIG. 21D illustrates yet another example of a gradient filter for a block;

FIG. 31 shows examples of neighboring blocks of a current block;

FIG. 32A illustrates an example of a process for padding a block of prediction samples in accordance with the examples of the image encoding/decoding method as shown in FIGS. 27A, 27B and 27C;

FIG. 32B illustrates another example of a process for padding a block of prediction samples in accordance with the examples of the image encoding/decoding method as shown in FIGS. 27A, 27B and 27C;

FIG. 32C illustrates another example of a process for padding a block of prediction samples in accordance with the examples of the image encoding/decoding method as shown in FIGS. 27A, 27B and 27C;

FIG. 33A illustrates an example of padding direction for padding a block in accordance with the examples of the image encoding/decoding method as shown in FIGS. 17, 22, 24, 27A, 27B and 27C;

FIG. 33B illustrates another example of padding direction for padding a block in accordance with the examples of the image encoding/decoding method as shown in FIGS. 17, 22, 24, 27A, 27B and 27C;

FIG. 33C illustrates another example of padding direction for padding a block in accordance with the examples of the image encoding/decoding method as shown in FIGS. 17, 22, 24, 27A, 27B and 27C;

FIG. 33D illustrates yet another example of padding direction for padding a block in accordance with the example of the image encoding/decoding method as shown in FIGS. 17, 22, 24, 27A, 27B and 27C;

DETAILED DESCRIPTION OF THE EMBODIMENT

Embodiment

Figure 1:
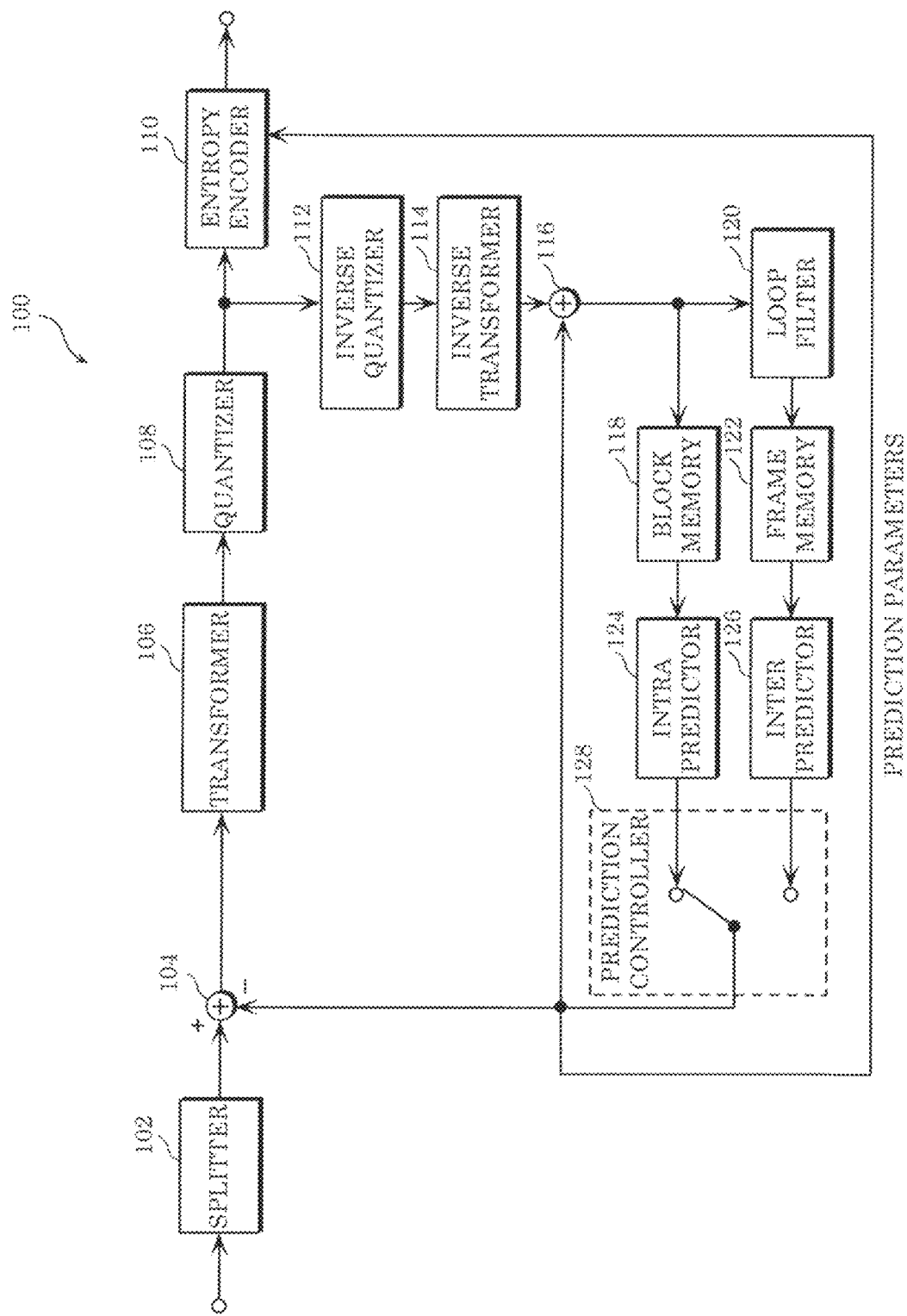
FIG. 1 is a block diagram illustrating a functional configuration of an encoder according to an embodiment.

Hereinafter, embodiment(s) will be described with reference to the drawings. Note that the embodiment(s) described below each show a general or specific example. The numerical values, shapes, materials, components, the arrangement and connection of the components, steps, the relation and order of the steps, etc., indicated in the following embodiment(s) are mere examples, and are not intended to limit the scope of the claims. Therefore, those components disclosed in the following embodiment(s) but are not recited in any of the independent claims defining the broadest inventive concepts may be understood as optional components.

Embodiments of an encoder and a decoder will be described below. The embodiments are examples of an encoder and a decoder to which the processes and/or configurations presented in the description of aspects of the present disclosure are applicable. The processes and/or configurations can also be implemented in an encoder and a decoder different from those according to the embodiments. For example, regarding the processes and/or configurations as applied to the embodiments, any of the following may be implemented:

(1) Any of the components of the encoder or the decoder according to the embodiments presented in the description of aspects of the present disclosure may be substituted or combined with another component presented anywhere in the description of aspects of the present disclosure.

(2) In the encoder or the decoder according to the embodiments, discretionary changes may be made to functions or processes performed by one or more components of the encoder or the decoder, such as addition, substitution, removal, etc., of the functions or processes. For example, any function or process may be substituted or combined with another function or process presented anywhere in the description of aspects of the present disclosure.

(3) In the method implemented by the encoder or the decoder according to the embodiments, discretionary changes may be made such as addition, substitution, and removal of one or more of the processes included in the method. For example, any process in the method may be substituted or combined with another process presented anywhere in the description of aspects of the present disclosure.

(4) One or more components included in the encoder or the decoder according to embodiments may be combined with a component presented anywhere in the description of aspects of the present disclosure, may be combined with a component including one or more functions presented anywhere in the description of aspects of the present disclosure, and may be combined with a component that implements one or more processes implemented by a component presented in the description of aspects of the present disclosure.

(5) A component including one or more functions of the encoder or the decoder according to the embodiments, or a component that implements one or more processes of the encoder or the decoder according to the embodiments, may be combined or substituted with a component presented anywhere in the description of aspects of the present disclosure, with a component including one or more functions presented anywhere in the description of aspects of the present disclosure, or with a component that implements one or more processes presented anywhere in the description of aspects of the present disclosure.

(6) In the method implemented by the encoder or the decoder according to the embodiments, any of the processes included in the method may be substituted or combined with a process presented anywhere in the description of aspects of the present disclosure or with any corresponding or equivalent process.

(7) One or more processes included in the method implemented by the encoder or the decoder according to the embodiments may be combined with a process presented anywhere in the description of aspects of the present disclosure.

(8) The implementation of the processes and/or configurations presented in the description of aspects of the present disclosure is not limited to the encoder or the decoder according to the embodiments. For example, the processes and/or configurations may be implemented in a device used for a purpose different from the moving picture encoder or the moving picture decoder disclosed in the embodiments.

(Encoder)

First, the encoder according to an embodiment will be described. FIG. 1 is a block diagram illustrating a functional configuration of encoder 100 according to the embodiment. Encoder 100 is a moving picture encoder that encodes a moving picture block by block.

As illustrated in FIG. 1, encoder 100 is a device that encodes a picture block by block, and includes splitter 102, subtractor 104, transformer 106, quantizer 108, entropy encoder 110, inverse quantizer 112, inverse transformer 114, adder 116, block memory 118, loop filter 120, frame memory 122, intra predictor 124, inter predictor 126, and prediction controller 128.

Encoder 100 is realized as, for example, a generic processor and memory. In this case, when a software program stored in the memory is executed by the processor, the processor functions as splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128. Alternatively, encoder 100 may be realized as one or more dedicated electronic circuits corresponding to splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128.

Hereinafter, each component included in encoder 100 will be described.

(Splitter)

Splitter 102 splits each picture included in an inputted moving picture into blocks, and outputs each block to subtractor 104. For example, splitter 102 first splits a picture into blocks of a fixed size (for example, 128×128). The fixed size block may also be referred to as coding tree unit (CTU). Splitter 102 then splits each fixed size block into blocks of variable sizes (for example, 64×64 or smaller) based, for example, on recursive quadtree and/or binary tree block splitting. The variable size block may also be referred to as a coding unit (CU), a prediction unit (PU), or a transform unit (TU). In various implementations there may be no need to differentiate between CU, PU, and TU; all or some of the blocks in a picture may be processed per CU, PU, or TU.

Figure 2:
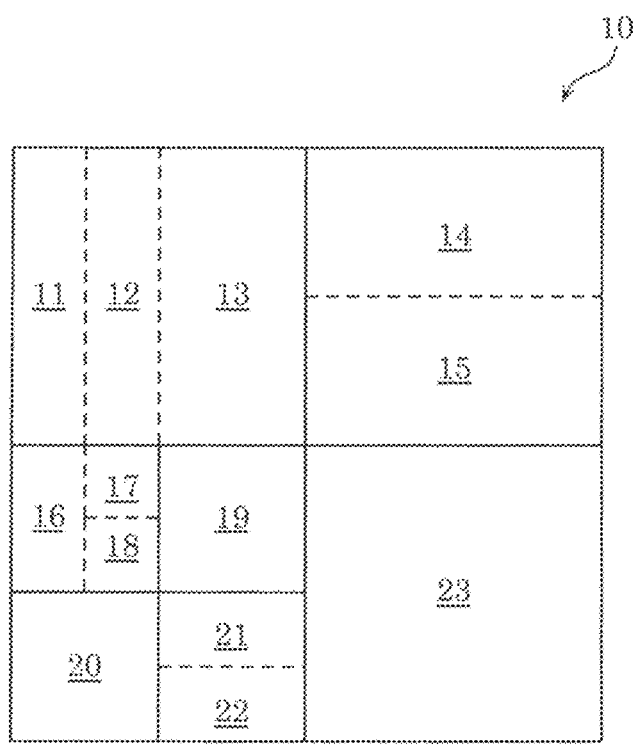
FIG. 2 illustrates one example of block splitting.

FIG. 2 illustrates one example of block splitting according to an embodiment. In FIG. 2, the solid lines represent block boundaries of blocks split by quadtree block splitting, and the dashed lines represent block boundaries of blocks split by binary tree block splitting.

Here, block 10 is a square 128×128 pixel block (128×128 block). This 128×128 block 10 is first split into four square 64×64 blocks (quadtree block splitting).

The top left 64×64 block is further vertically split into two rectangle 32×64 blocks, and the left 32×64 block is further vertically split into two rectangle 16×64 blocks (binary tree block splitting). As a result, the top left 64×64 block is split into two 16×64 blocks 11 and 12 and one 32×64 block 13.

The top right 64×64 block is horizontally split into two rectangle 64×32 blocks 14 and 15 (binary tree block splitting).

The bottom left 64×64 block is first split into four square 32×32 blocks (quadtree block splitting). The top left block and the bottom right block among the four 32×32 blocks are further split. The top left 32×32 block is vertically split into two rectangle 16×32 blocks, and the right 16×32 block is further horizontally split into two 16×16 blocks (binary tree block splitting). The bottom right 32×32 block is horizontally split into two 32×16 blocks (binary tree block splitting). As a result, the bottom left 64×64 block is split into 16×32 block 16, two 16×16 blocks 17 and 18, two 32×32 blocks 19 and 20, and two 32×16 blocks 21 and 22.

The bottom right 64×64 block 23 is not split.

As described above, in FIG. 2, block 10 is split into 13 variable size blocks 11 through 23 based on recursive quadtree and binary tree block splitting. This type of splitting is also referred to as quadtree plus binary tree (QTBT) splitting.

While in FIG. 2 one block is split into four or two blocks (quadtree or binary tree block splitting), splitting is not limited to these examples. For example, one block may be split into three blocks (ternary block splitting). Splitting including such ternary block splitting is also referred to as multi-type tree (MBT) splitting.

(Subtractor)

Subtractor 104 subtracts a prediction signal (prediction sample, inputted from prediction controller 128, to be described below) from an original signal (original sample) per block split by and inputted from splitter 102. In other words, subtractor 104 calculates prediction errors (also referred to as "residuals") of a block to be encoded (hereinafter referred to as a "current block"). Subtractor 104 then outputs the calculated prediction errors (residuals) to transformer 106.

The original signal is a signal input into encoder 100, and is a signal representing an image for each picture included in a moving picture (for example, a luma signal and two chroma signals). Hereinafter, a signal representing an image is also referred to as a sample.

(Transformer)

Transformer 106 transforms spatial domain prediction errors into frequency domain transform coefficients, and outputs the transform coefficients to quantizer 108. More specifically, transformer 106 applies, for example, a predefined discrete cosine transform (DCT) or discrete sine transform (DST) to spatial domain prediction errors.

Note that transformer 106 may adaptively select a transform type from among a plurality of transform types, and transform prediction errors into transform coefficients by using a transform basis function corresponding to the selected transform type. This sort of transform is also referred to as explicit multiple core transform (EMT) or adaptive multiple transform (AMT).

The transform types include, for example, DCT-II, DCT-V, DCT-VIII, DST-I, and DST-VII. FIG. 3 is a chart indicating transform basis functions for each transform type. In FIG. 3, N indicates the number of input pixels. For example, selection of a transform type from among the plurality of transform types may depend on the prediction type (intra prediction and inter prediction) as well as intra prediction mode.

Information indicating whether to apply EMT or AMT (referred to as, for example, an EMT flag or an AMT flag) and information indicating the selected transform type is typically signaled at the CU level. Note that the signaling of such information need not be performed at the CU level, and may be performed at another level (for example, at the bit sequence level, picture level, slice level, tile level, or CTU level).

Moreover, transformer 106 may apply a secondary transform to the transform coefficients (transform result). Such a secondary transform is also referred to as adaptive secondary transform (AST) or non-separable secondary transform (NSST). For example, transformer 106 applies a secondary transform to each sub-block (for example, each 4×4 sub-block) included in the block of the transform coefficients corresponding to the intra prediction errors. Information indicating whether to apply NSST and information related to the transform matrix used in NSST are typically signaled at the CU level. Note that the signaling of such information need not be performed at the CU level, and may be performed at another level (for example, at the sequence level, picture level, slice level, tile level, or CTU level).

There are a separate transform and a non-separable transform, which may be applied in transformer 106. A separate transform is a method in which a transform is performed a plurality of times by separately performing a transform for each direction according to the number of dimensions input. A non-separable transform is a method of performing a collective transform in which two or more dimensions in a multidimensional input are collectively regarded as a single dimension.

In one example of a non-separable transform, when the input is a 4×4 block, the 4×4 block is regarded as a single array including 16 components, and the transform applies a 16×16 transform matrix to the array.

In a further example of a non-separable transform, after the input 4×4 block is regarded as a single array including 16 components, a transform that performs a plurality of Givens rotations (e.g., a Hypercube-Givens Transform) may be applied on the array.

(Quantizer)

Quantizer 108 quantizes the transform coefficients output from transformer 106. More specifically, quantizer 108 scans, in a predetermined scanning order, the transform coefficients of the current block, and quantizes the scanned transform coefficients based on quantization parameters (QP) corresponding to the transform coefficients. Quantizer 108 then outputs the quantized transform coefficients (hereinafter referred to as quantized coefficients) of the current block to entropy encoder 110 and inverse quantizer 112.

A predetermined scanning order is an order for quantizing/inverse quantizing transform coefficients. For example, a predetermined scanning order is defined as ascending order of frequency (from low to high frequency) or descending order of frequency (from high to low frequency).

A quantization parameter (QP) is a parameter defining a quantization step size (quantization width). For example, if the value of the quantization parameter increases, the quantization step size also increases. In other words, if the value of the quantization parameter increases, the quantization error increases.

(Entropy Encoder)

Entropy encoder 110 generates an encoded signal (encoded bitstream) based on the quantized coefficients, which are inputted from quantizer 108. More specifically, for example, entropy encoder 110 binarizes quantized coefficients and arithmetic encodes the binary signal, to output a compressed bitstream or sequence.

(Inverse Quantizer)

Inverse quantizer 112 inverse quantizes the quantized coefficients, which are inputted from quantizer 108. More specifically, inverse quantizer 112 inverse quantizes, in a predetermined scanning order, quantized coefficients of the current block. Inverse quantizer 112 then outputs the inverse quantized transform coefficients of the current block to inverse transformer 114.

(Inverse Transformer)

Inverse transformer 114 restores prediction errors (residuals) by inverse transforming the transform coefficients, which are inputted from inverse quantizer 112. More specifically, inverse transformer 114 restores the prediction errors of the current block by applying an inverse transform corresponding to the transform applied by transformer 106 on the transform coefficients. Inverse transformer 114 then outputs the restored prediction errors to adder 116.

Note that since typically information is lost in quantization, the restored prediction errors do not match the prediction errors calculated by subtractor 104. In other words, the restored prediction errors typically include quantization errors.

(Adder)

Adder 116 reconstructs the current block by summing prediction errors, which are inputted from inverse transformer 114, and prediction samples, which are inputted from prediction controller 128. Adder 116 then outputs the reconstructed block to block memory 118 and loop filter 120. A reconstructed block is also referred to as a local decoded block.

(Block Memory)

Block memory 118 is storage for storing blocks in a picture to be encoded (referred to as a "current picture") for reference in intra prediction, for example. More specifically, block memory 118 stores reconstructed blocks output from adder 116.

(Loop Filter)

Loop filter 120 applies a loop filter to blocks reconstructed by adder 116, and outputs the filtered reconstructed blocks to frame memory 122. A loop filter is a filter used in an encoding loop (in-loop filter), and includes, for example, a deblocking filter (DF), a sample adaptive offset (SAO), and an adaptive loop filter (ALF).

In ALF, a least square error filter for removing compression artifacts is applied. For example, one filter from among a plurality of filters is selected for each 2×2 sub-block in the current block based on direction and activity of local gradients, and is applied.

More specifically, first, each sub-block (for example, each 2×2 sub-block) is categorized into one out of a plurality of classes (for example, 15 or 25 classes). The classification of the sub-block is based on gradient directionality and activity. For example, classification index C is derived based on gradient directionality D (for example, 0 to 2 or 0 to 4) and gradient activity A (for example, 0 to 4) (for example, $C=5D+A$). Then, based on classification index C, each sub-block is categorized into one out of a plurality of classes.

For example, gradient directionality D is calculated by comparing gradients of a plurality of directions (for example, the horizontal, vertical, and two diagonal directions). Furthermore, for example, gradient activity A is calculated by summing gradients of a plurality of directions and quantizing the sum.

The filter to be used for each sub-block is determined from among the plurality of filters based on the result of such categorization.

Figure 4A:
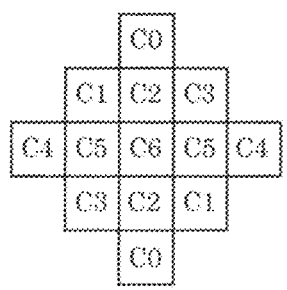
FIG. 4A illustrates one example of a filter shape used in ALF (adaptive loop filter)
Figure 4B:
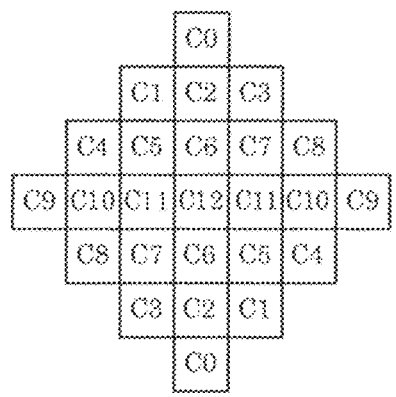
FIG. 4B illustrates another example of a filter shape used in ALF.
Figure 4C:
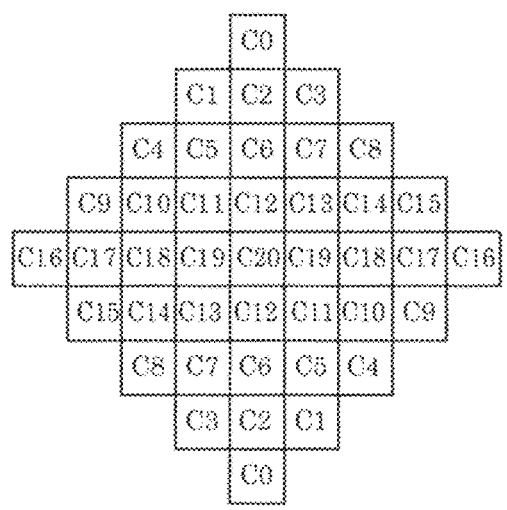
FIG. 4C illustrates another example of a filter shape used in ALF.

The filter shape to be used in ALF is, for example, a circular symmetric filter shape. FIGS. 4A, 4B, and 4C illustrate examples of filter shapes used in ALF. FIG. 4A illustrates a 5×5 diamond shape filter, FIG. 4B illustrates a 7×7 diamond shape filter, and FIG. 4C illustrates a 9×9 diamond shape filter. Information indicating the filter shape is typically signaled at the picture level. Note that the signaling of information indicating the filter shape need not be performed at the picture level, and may be performed at another level (for example, at the sequence level, slice level, tile level, CTU level, or CU level).

The enabling or disabling of ALF may be determined at the picture level or CU level. For example, for luma, the decision to apply ALF or not may be done at the CU level, and for chroma, the decision to apply ALF or not may be done at the picture level. Information indicating whether ALF is enabled or disabled is typically signaled at the picture level or CU level. Note that the signaling of information indicating whether ALF is enabled or disabled need not be performed at the picture level or CU level, and may be performed at another level (for example, at the sequence level, slice level, tile level, or CTU level).

The coefficients set for the plurality of selectable filters (for example, 15 or 25 filters) is typically signaled at the picture level. Note that the signaling of the coefficients set need not be performed at the picture level, and may be performed at another level (for example, at the sequence level, slice level, tile level, CTU level, CU level, or sub-block level).

(Frame Memory)

Frame memory 122 is storage for storing reference pictures used in inter prediction, for example, and is also referred to as a frame buffer. More specifically, frame memory 122 stores reconstructed blocks filtered by loop filter 120.

(Intra Predictor)

Intra predictor 124 generates a prediction signal (intra prediction signal) by intra predicting the current block with reference to a block or blocks that are in the current picture as stored in block memory 118 (also referred to as intra frame prediction). More specifically, intra predictor 124 generates an intra prediction signal by intra prediction with reference to samples (for example, luma and/or chroma values) of a block or blocks neighboring the current block, and then outputs the intra prediction signal to prediction controller 128.

For example, intra predictor 124 performs intra prediction by using one mode from among a plurality of predefined intra prediction modes. The intra prediction modes typically include one or more non-directional prediction modes and a plurality of directional prediction modes.

The one or more non-directional prediction modes include, for example, planar prediction mode and DC prediction mode defined in the H. 265/HEVC standard.

The plurality of directional prediction modes include, for example, the 33 directional prediction modes defined in the H. 265/HEVC standard. Note that the plurality of directional prediction modes may further include 32 directional prediction modes in addition to the 33 directional prediction modes (for a total of 65 directional prediction modes).

Figure 5A:
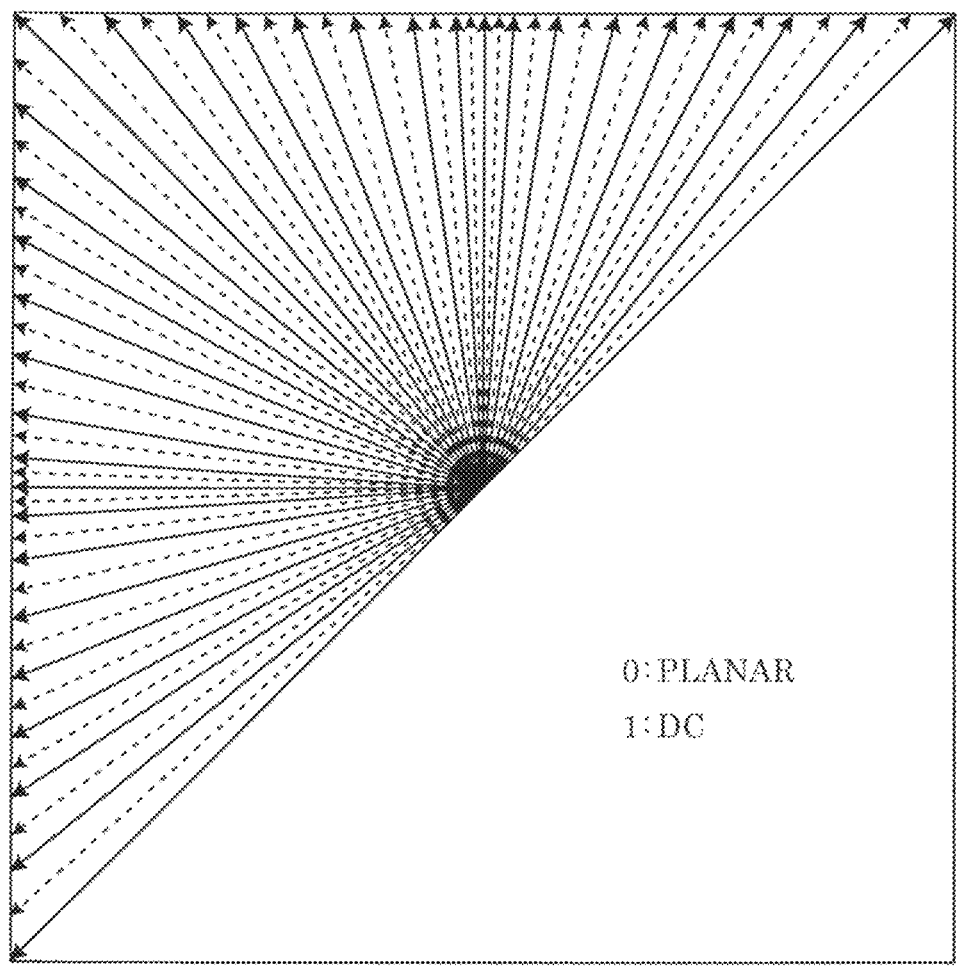
FIG. 5A illustrates 67 intra prediction modes used in an example of intra prediction.

FIG. 5A illustrates a total of 67 intra prediction modes used in intra prediction (two non-directional prediction modes and 65 directional prediction modes). The solid arrows represent the 33 directions defined in the H. 265/HEVC standard, and the dashed arrows represent the additional 32 directions. (The two "non-directional" prediction modes are not illustrated in FIG. 5A.)

In various implementations, a luma block may be referenced in chroma block intra prediction. That is, a chroma component of the current block may be predicted based on a luma component of the current block. Such intra prediction is also referred to as cross-component linear model (CCLM) prediction. The chroma block intra prediction mode that references a luma block (referred to as, for example, CCLM mode) may be added as one of the chroma block intra prediction modes.

Intra predictor 124 may correct post-intra-prediction pixel values based on horizontal/vertical reference pixel gradients. Intra prediction accompanied by this sort of correcting is also referred to as position dependent intra prediction combination (PDPC). Information indicating whether to apply PDPC or not (referred to as, for example, a PDPC flag) is typically signaled at the CU level. Note that the signaling of this information need not be performed at the CU level, and may be performed at another level (for example, on the sequence level, picture level, slice level, tile level, or CTU level).

(Inter Predictor)

Inter predictor 126 generates a prediction signal (inter prediction signal) by inter predicting the current block with reference to a block or blocks in a reference picture, which is different from the current picture and is stored in frame memory 122 (also referred to as inter frame prediction). Inter prediction is performed per current block or per current sub-block (for example, per 4×4 block) in the current block. For example, inter predictor 126 performs motion estimation in a reference picture for the current block or the current sub-block, to find a reference block or sub-block in the reference picture that best matches the current block or sub-block. Inter predictor 126 then performs motion compensation (or motion prediction) based on the motion estimation, to obtain motion information (for example, a motion vector) that compensates for (or predicts) the movement or change from the reference block or sub-block to the current block or sub-block, and generates an inter prediction signal of the current block or sub-block based on the motion information. Inter predictor 126 then outputs the generated inter prediction signal to prediction controller 128.

The motion information used in motion compensation may be signaled in a variety of forms as the inter prediction signal. For example, a motion vector may be signaled. As another example, a difference between a motion vector and a motion vector predictor may be signaled.

Note that the inter prediction signal may be generated using motion information for a neighboring block in addition to motion information for the current block obtained from motion estimation. More specifically, the inter prediction signal may be generated per sub-block in the current block by calculating a weighted sum of a prediction signal based on motion information obtained from the motion estimation (in the reference picture) and a prediction signal based on motion information of a neighboring block (in the current picture). Such inter prediction (motion compensation) is also referred to as overlapped block motion compensation (OBMC).

In OBMC mode, information indicating sub-block size for OBMC (referred to as, for example, OBMC block size) may be signaled at the sequence level. Further, information indicating whether to apply the OBMC mode or not (referred to as, for example, an OBMC flag) may be signaled at the CU level. Note that the signaling of such information need not be performed at the sequence level and CU level, and may be performed at another level (for example, at the picture level, slice level, tile level, CTU level, or sub-block level).

Figure 5B:
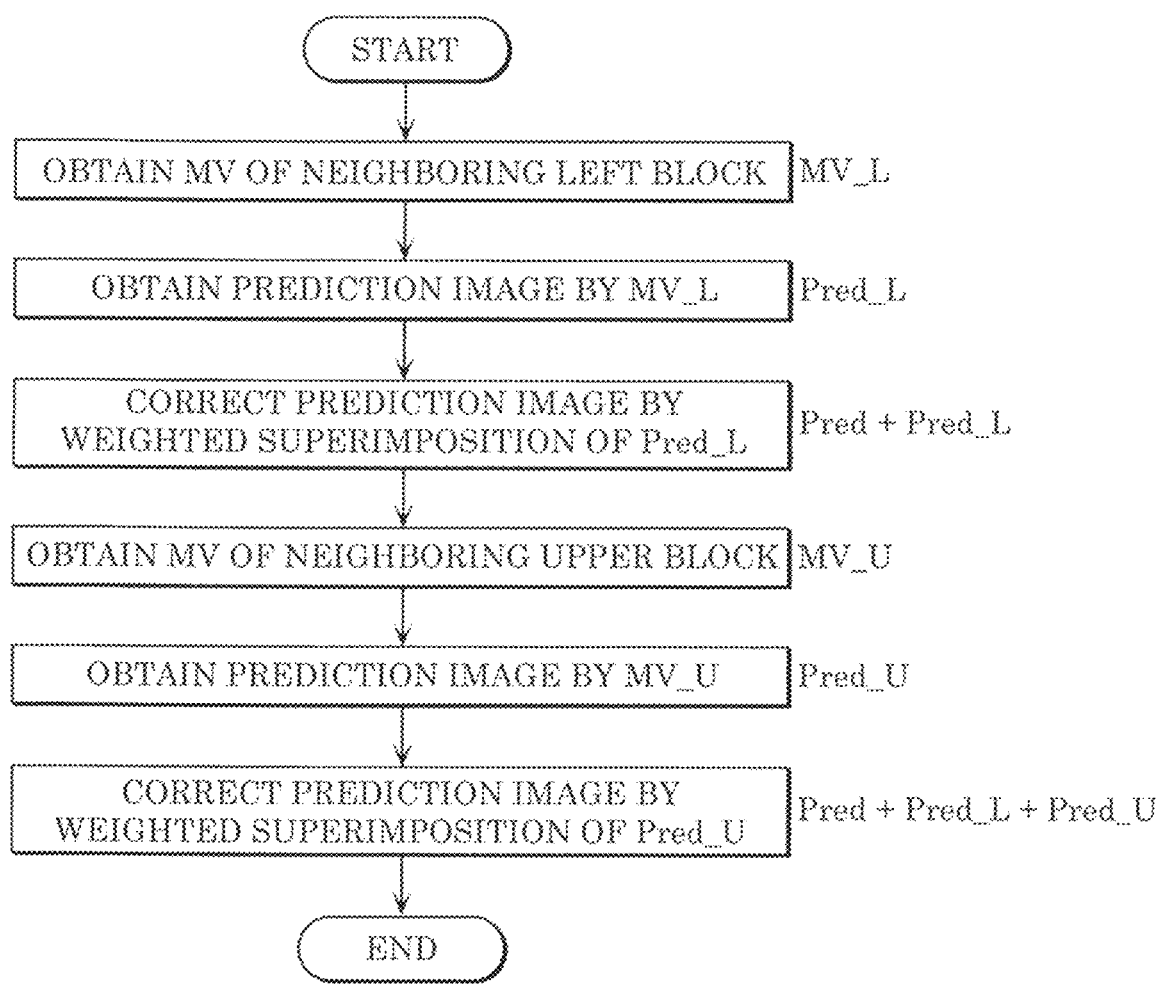
FIG. 5B is a flow chart illustrating one example of a prediction image correction process performed in OBMC (overlapped block motion compensation) processing.

Hereinafter, the OBMC mode will be described in further detail. FIG. 5B is a flowchart and FIG. 5C is a conceptual diagram illustrating a prediction image correction process performed by OBMC processing.

Figure 5C:
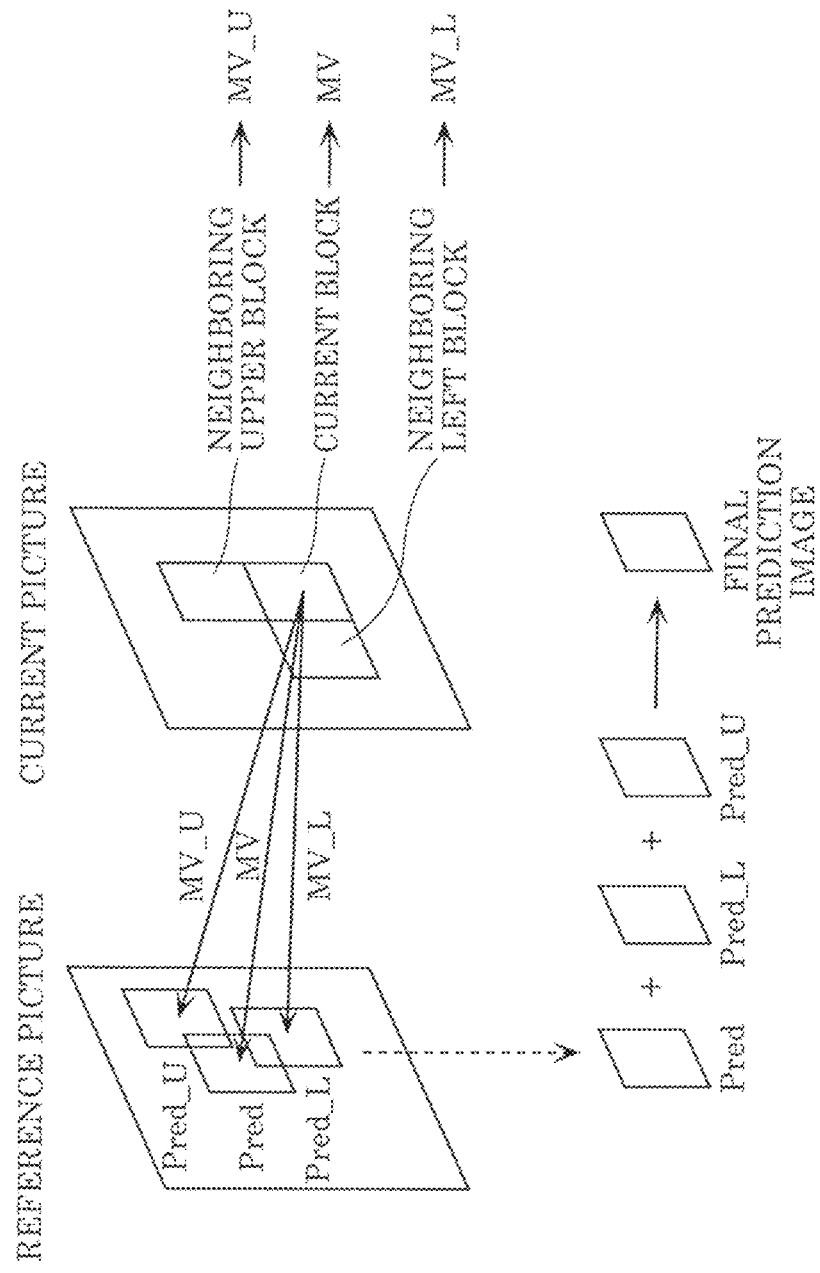
FIG. 5C is a conceptual diagram illustrating one example of a prediction image correction process performed in OBMC processing.

Referring to FIG. 5C, first, a prediction image (Pred) is obtained through typical motion compensation using a motion vector (MV) assigned to the target (current) block. In FIG. 5C, an arrow "MV" points to the reference picture, to indicate what the current block in the current picture is referencing in order to obtain a prediction image.

Next, a prediction image (Pred_L) is obtained by applying (reusing) a motion vector (MV_L), which was already derived for the encoded neighboring left block, to the target (current) block, as indicated by an arrow "MV_L" originating from the current block and pointing to the reference picture to obtain the prediction image Pred_L. Then, the two prediction images Pred and Pred_L are superimposed to perform a first pass of the correction of the prediction image, which in one aspect has an effect of blending the border between the neighboring blocks.

Similarly, a prediction image (Pred_U) is obtained by applying (reusing) a motion vector (MV_U), which was already derived for the encoded neighboring upper block, to the target (current) block, as indicated by an arrow "MV_U" originating from the current block and pointing to the reference picture to obtain the prediction image Pred_U. Then, the prediction image Pred_U is superimposed with the prediction image resulting from the first pass (i.e., Pred and Pred_L) to perform a second pass of the correction of the prediction image, which in one aspect has an effect of blending the border between the neighboring blocks. The result of the second pass is the final prediction image for the current block, with blended (smoothed) borders with its neighboring blocks.

Note that the above example is of a two-pass correction method using the neighboring left and upper blocks, but the method may be a three-pass or higher-pass correction method that also uses the neighboring right and/or lower block.

Note that the region subject to superimposition may be the entire pixel region of the block, and, alternatively, may be a partial block boundary region.

Note that here, the prediction image correction process of OBMC is described as being based on a single reference picture to derive a single prediction image Pred, to which additional prediction images Pred_L and Pred_U are superimposed, but the same process may apply to each of a plurality of reference pictures when the prediction image is corrected based on the plurality of reference pictures. In such a case, after a plurality of corrected prediction images are obtained by performing the image correction of OBMC based on the plurality of reference pictures, respectively, the obtained plurality of corrected prediction images are further superimposed to obtain the final prediction image.

Note that, in OBMC, the unit of the target block may be a prediction block and, alternatively, may be a sub-block obtained by further dividing the prediction block.

One example of a method to determine whether to implement OBMC processing is to use an obmc_flag, which is a signal that indicates whether to implement OBMC processing. As one specific example, the encoder may determine whether the target block belongs to a region including complicated motion. The encoder sets the obmc_flag to a value of "1" when the block belongs to a region including complicated motion and implements OBMC processing during encoding, and sets the obmc_flag to a value of "0" when the block does not belong to a region including complication motion and encodes the block without implementing OBMC processing. The decoder switches between implementing OBMC processing or not by decoding the obmc_flag written in the stream (i.e., the compressed sequence) and performing the decoding in accordance with the flag value.

Note that the motion information may be derived on the decoder side without being signaled from the encoder side. For example, a merge mode defined in the H. 265/HEVC standard may be used. Furthermore, for example, the motion information may be derived by performing motion estimation on the decoder side. In this case, the decoder side may perform motion estimation without using the pixel values of the current block.

Here, a mode for performing motion estimation on the decoder side will be described. A mode for performing motion estimation on the decoder side is also referred to as pattern matched motion vector derivation (PMMVD) mode or frame rate up-conversion (FRUC) mode.

Figure 5D:
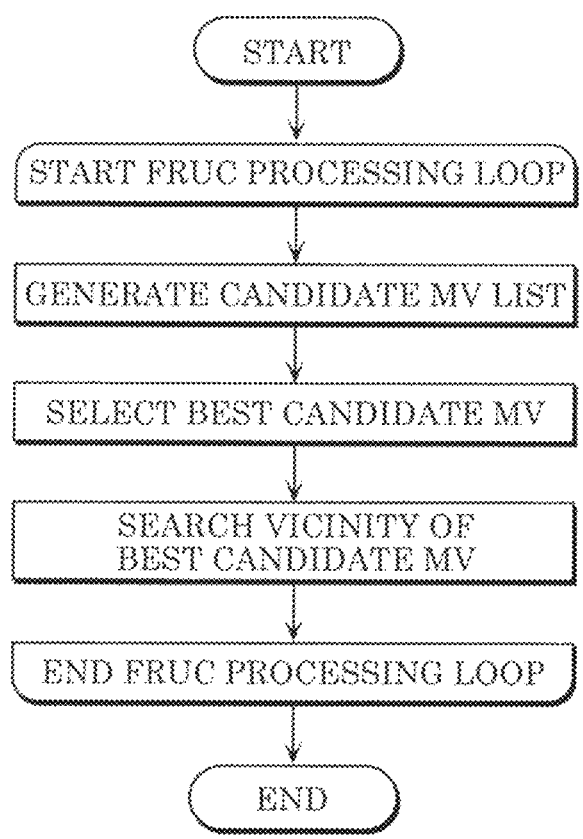
FIG. 5D is a flow chart illustrating one example of FRUC (frame rate up conversion) processing.

One example of FRUC processing is illustrated in FIG. 5D. First, a candidate list (a candidate list may be a merge list) of candidates, each including a prediction motion vector (MV), is generated with reference to motion vectors of encoded blocks that spatially or temporally neighbor the current block. Next, the best candidate MV is selected from among the plurality of candidate MVs registered in the candidate list. For example, evaluation values for the candidate MVs included in the candidate list are calculated and one candidate MV is selected based on the calculated evaluation values.

Next, a motion vector for the current block is derived from the motion vector of the selected candidate. More specifically, for example, the motion vector for the current block is calculated as the motion vector of the selected candidate (the best candidate MV), as-is. Alternatively, the motion vector for the current block may be derived by pattern matching performed in the vicinity of a position in a reference picture corresponding to the motion vector of the selected candidate. In other words, when the vicinity of the best candidate MV is searched using pattern matching in a reference picture and evaluation values, and an MV having a better evaluation value is found, the best candidate MV may be updated to the MV having the better evaluation value, and the MV having the better evaluation value may be used as the final MV for the current block. A configuration in which the processing to update the MV having a better evaluation value is not implemented is also acceptable.

The same processes may be performed in cases in which the processing is performed in units of sub-blocks.

An evaluation value may be calculated in various ways. For example, a reconstructed image of a region in a reference picture corresponding to a motion vector is compared with a reconstructed image of a predetermined region (which may be in another reference picture or in a neighboring block in the current picture, for example, as described below), and a difference in pixel values between the two reconstructed images may be calculated and used as an evaluation value of the motion vector. Note that the evaluation value may be calculated by using some other information in addition to the difference.

Next, pattern matching is described in detail. First, one candidate MV included in a candidate list (e.g., a merge list) is selected as the starting point for the search by pattern matching. The pattern matching used is either first pattern matching or second pattern matching. First pattern matching and second pattern matching are also referred to as bilateral matching and template matching, respectively.

In the first pattern matching, pattern matching is performed between two blocks in two different reference pictures that are both along the motion trajectory of the current block. Therefore, in the first pattern matching, for a region in a reference picture, a region in another reference picture that conforms to the motion trajectory of the current block is used as the predetermined region for the above-described calculation of the candidate's evaluation value.

Figure 6:
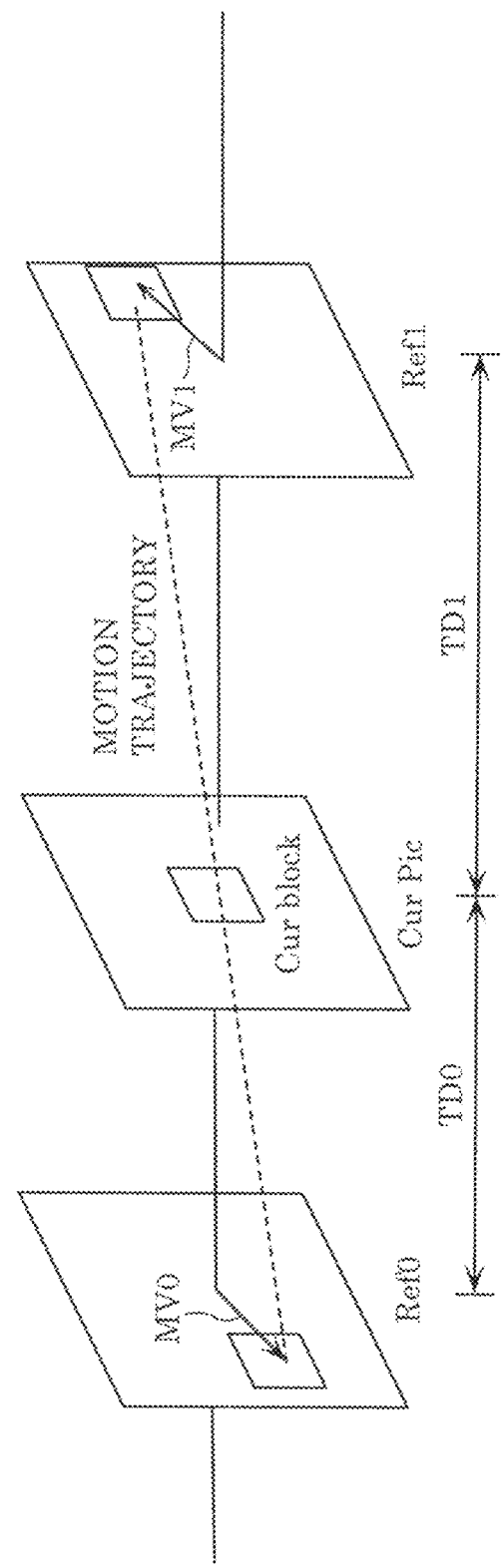
FIG. 6 illustrates one example of pattern matching (bilateral matching) between two blocks along a motion trajectory.

FIG. 6 illustrates one example of the first pattern matching (bilateral matching) between two blocks in two reference pictures along a motion trajectory. As illustrated in FIG. 6, in the first pattern matching, two motion vectors (MV0, MV1) are derived by finding the best match between the two blocks in two different reference pictures (Ref0, Ref1) along the motion trajectory of the current block (Cur block). More specifically, a difference may be obtained between (i) a reconstructed image at a position specified by a candidate MV in a first encoded reference picture (Ref0) and (ii) a reconstructed image at a position specified by the candidate MV, which is symmetrically scaled per display time intervals, in a second encoded reference picture (Ref1). Then, the difference may be used to derive an evaluation value for the current block. A candidate MV having the best evaluation value among a plurality of candidate MVs may be selected as the final MV.

Under the assumption of continuous motion trajectory, the motion vectors (MV0, MV1) pointing to the two reference blocks are proportional to the temporal distances (TD0, TD1) between the current picture (Cur Pic) and the two reference pictures (Ref0, Ref1). For example, when the current picture is temporally between the two reference pictures and the temporal distance from the current picture to the two reference pictures is the same, the first pattern matching derives two mirroring bi-directional motion vectors.

In the second pattern matching (template matching), pattern matching is performed between a template in the current picture (blocks neighboring the current block in the current picture; for example, the top and/or left neighboring blocks) and a block in a reference picture. Therefore, in the second pattern matching, a block neighboring the current block in the current picture is used as the predetermined region for the above-described calculation of the candidate evaluation value.

Figure 7:
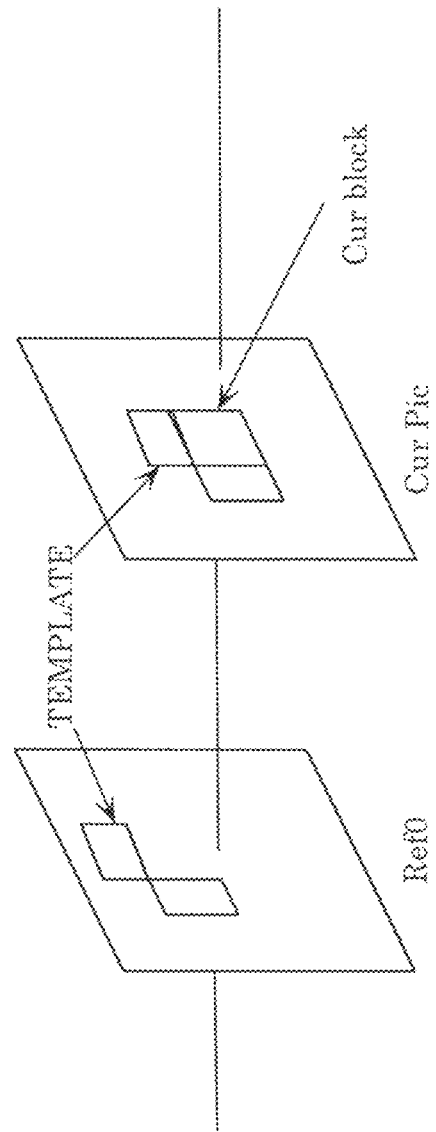
FIG. 7 illustrates one example of pattern matching (template matching) between a template in the current picture and a block in a reference picture.

FIG. 7 illustrates one example of pattern matching (template matching) between a template in the current picture and a block in a reference picture. As illustrated in FIG. 7, in the second pattern matching, a motion vector of the current block is derived by searching in a reference picture (Ref0) to find a block that best matches neighboring block(s) of the current block (Cur block) in the current picture (Cur Pic). More specifically, a difference may be obtained between (i) a reconstructed image of one or both of encoded neighboring upper and left regions relative to the current block and (ii) a reconstructed image of the same regions relative to a block position specified by a candidate MV in an encoded reference picture (Ref0). Then, the difference may be used to derive an evaluation value for the current block. A candidate MV having the best evaluation value among a plurality of candidate MVs may be selected as the best candidate MV.

Information indicating whether to apply the FRUC mode or not (referred to as, for example, a FRUC flag) may be signaled at the CU level. Further, when the FRUC mode is applied (for example, when the FRUC flag is set to true), information indicating the pattern applicable matching method (e.g., first pattern matching or second pattern matching) may be signaled at the CU level. Note that the signaling of such information need not be performed at the CU level, and may be performed at another level (for example, at the sequence level, picture level, slice level, tile level, CTU level, or sub-block level).

Next, methods of deriving a motion vector are described. First, a description is given of a mode for deriving a motion vector based on a model assuming uniform linear motion. This mode is also referred to as a bi-directional optical flow (BIO) mode.

Figure 8:
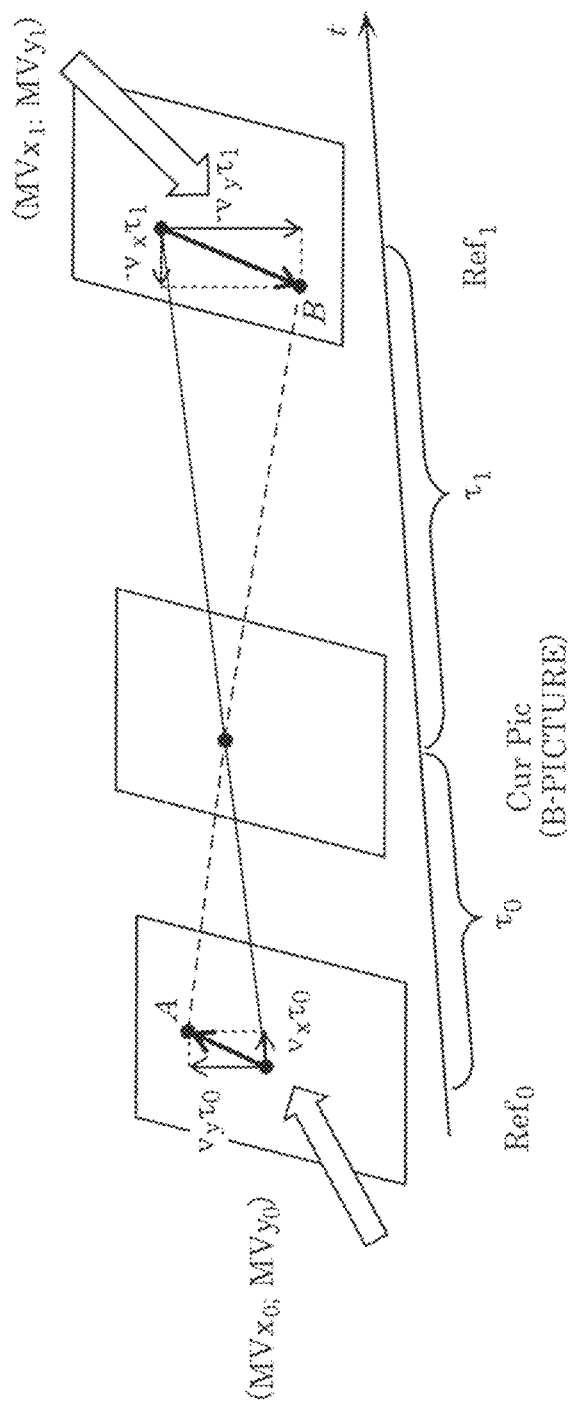
FIG. 8 illustrates a model that assumes uniform linear motion.

FIG. 8 illustrates a model that assumes uniform linear motion. In FIG. 8, $(v_x, v_y)$ denotes a velocity vector, and $\tau_0$ and $\tau_1$ denote temporal distances between the current picture (Cur Pic) and two reference pictures (Ref$_0$, Ref$_1$), respectively. $(MVx_0, MVy_0)$ denotes a motion vector corresponding to reference picture Ref$_0$, and $(MVx_1, MVy_1)$ denotes a motion vector corresponding to reference picture Ref$_1$.

Here, under the assumption of uniform linear motion exhibited by velocity vector $(v_x, v_y)$, $(MVx_0, MVy_0)$ and $(MVx_1, MVy_1)$ are represented as $(v_x\tau_0, v_y\tau_0)$ and $(-v_x\tau_1, -v_y\tau_1)$, respectively, and the following optical flow equation (Equation 1) is given.

[Math. 1]

$$\partial I^{(k)}/\partial t + v_x \partial I^{(k)}/\partial x + v_y \partial I^{(k)}/\partial y = 0. \quad (1)$$

Here, $I^{(k)}$ denotes a luma value from reference picture k (k=0, 1) after motion compensation. The optical flow equation shows that the sum of (i) the time derivative of the luma value, (ii) the product of the horizontal velocity and the horizontal component of the spatial gradient of a reference picture, and (iii) the product of the vertical velocity and the vertical component of the spatial gradient of a reference picture, is equal to zero. A motion vector of each block obtained from, for example, a merge list may be corrected pixel by pixel based on a combination of the optical flow equation and Hermite interpolation.

Note that a motion vector may be derived on the decoder side using a method other than deriving a motion vector based on a model assuming uniform linear motion. For example, a motion vector may be derived for each sub-block based on motion vectors of neighboring blocks.

Next, a description is given of a mode in which a motion vector is derived for each sub-block based on motion vectors of neighboring blocks. This mode is also referred to as affine motion compensation prediction mode.

Figure 9A:
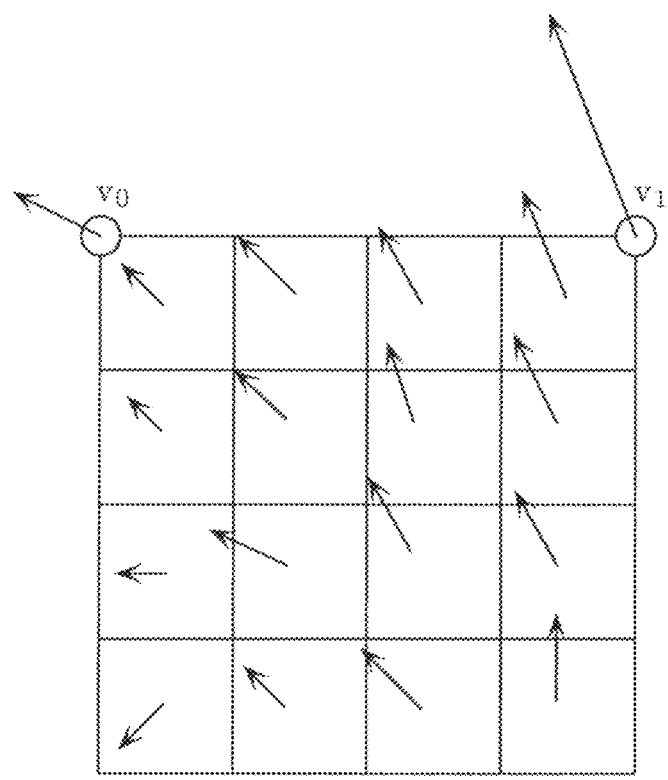
FIG. 9A illustrates one example of deriving a motion vector of each sub-block based on motion vectors of neighboring blocks.

FIG. 9A illustrates one example of deriving a motion vector of each sub-block based on motion vectors of neighboring blocks. In FIG. 9A, the current block includes 16 4×4 sub-blocks. Here, motion vector $v_0$ of the top left corner control point in the current block is derived based on motion vectors of neighboring sub-blocks. Similarly, motion vector $v_1$ of the top right corner control point in the current block is derived based on motion vectors of neighboring blocks. Then, using the two motion vectors $v_0$ and $v_1$, the motion vector $(v_x, v_y)$ of each sub-block in the current block is derived using Equation 2 below.

[Math. 2]

$$\begin{cases} v_x = \dfrac{(v_{1x} - v_{0x})}{w}x - \dfrac{(v_{1y} - v_{0y})}{w}y + v_{0x} \\ v_y = \dfrac{(v_{1y} - v_{0y})}{w}x - \dfrac{(v_{1x} - v_{0x})}{w}y + v_{0y} \end{cases} \quad (2)$$

Here, x and y are the horizontal and vertical positions of the sub-block, respectively, and w is a predetermined weighted coefficient.

An affine motion compensation prediction mode may include a number of modes of different methods of deriving the motion vectors of the top left and top right corner control points. Information indicating an affine motion compensation prediction mode (referred to as, for example, an affine flag) may be signaled at the CU level. Note that the signaling of information indicating the affine motion compensation prediction mode need not be performed at the CU level, and may be performed at another level (for example, at the sequence level, picture level, slice level, tile level, CTU level, or sub-block level).

(Prediction Controller)

Prediction controller 128 selects either the intra prediction signal (outputted from intra predictor 124) or the inter prediction signal (outputted from inter predictor 126), and outputs the selected prediction signal to subtractor 104 and adder 116.

As illustrated in FIG. 1, in various implementations, the prediction controller 128 may output prediction parameters, which are inputted to entropy encoder 110. Entropy encoder 110 may generate an encoded bitstream (or sequence) based on the prediction parameters, inputted from prediction controller 128, and the quantized coefficients, inputted from quantizer 108. The prediction parameters may be used by the decoder, which receives and decodes the encoded bitstream, to carry out the same prediction processing as performed in intra predictor 124, inter predictor 126, and prediction controller 128. The prediction parameters may include the selected prediction signal (e. g., motion vectors, prediction type or prediction mode employed in intra predictor 124 or inter predictor 126), or any index, flag, or value that is based on, or is indicative of, the prediction processing performed in intra predictor 124, inter predictor 126, and prediction controller 128.

In some implementations, prediction controller 128 operate in merge mode to optimize motion vectors calculated for a current picture using both the intra prediction signal from the intra predictor 124 and the inter prediction signal from the inter predictor 126. FIG. 9B illustrates one example of a process for deriving a motion vector in a current picture in merge mode.

First, a prediction MV list is generated, in which prediction MV candidates are registered. Examples of prediction MV candidates include: spatially neighboring prediction MV, which are MVs of encoded blocks positioned in the spatial vicinity of the target block; temporally neighboring prediction MVs, which are MVs of blocks in encoded reference pictures that neighbor a block in the same location as the target block; a coupled prediction MV, which is an MV generated by combining the MV values of the spatially neighboring prediction MV and the temporally neighboring prediction MV; and a zero prediction MV, which is an MV whose value is zero.

Next, the MV of the target block is determined by selecting one prediction MV from among the plurality of prediction MVs registered in the prediction MV list.

Further, in a variable-length encoder, a merge_idx, which is a signal indicating which prediction MV is selected, is written and encoded into the stream.

Note that the prediction MVs registered in the prediction MV list illustrated in FIG. 9B constitute one example. The number of prediction MVs registered in the prediction MV list may be different from the number illustrated in FIG. 9B, and the prediction MVs registered in the prediction MV list may omit one or more of the types of prediction MVs given in the example in FIG. 9B, and the prediction MVs registered in the prediction MV list may include one or more types of prediction MVs in addition to and different from the types given in the example in FIG. 9B.

The final MV may be determined by performing DMVR (dynamic motion vector refreshing) processing (to be described later) by using the MV of the target block derived in merge mode.

FIG. 9C is a conceptual diagram illustrating an example of DMVR processing to determine an MV.

First, the most appropriate MV which is set for the current block (e.g., in merge mode) is considered to be the candidate MV. Then, according to candidate MV(L0), a reference pixel is identified in a first reference picture (L0) which is an encoded picture in L0 direction. Similarly, according to candidate MV(L1), a reference pixel is identified in a second reference picture (L1) which is an encoded picture in L1 direction. The reference pixels are then averaged to form a template.

Next, using the template, the surrounding regions of the candidate MVs of the first and second reference pictures (L0) and (L1) are searched, and the MV with the lowest cost is determined to be the final MV. The cost value may be calculated, for example, using the difference between each pixel value in the template and each pixel value in the regions searched, using the candidate MVs, etc.

Note that the configuration and operation of the processes described here are fundamentally the same in both the encoder side and the decoder side, to be described below.

Any processing other than the processing described above may be used, as long as the processing is capable of deriving the final MV by searching the surroundings of the candidate MV.

Next, a description is given of an example of a mode that generates a prediction image (a prediction) using LIC (local illumination compensation) processing.

Figure 9D:
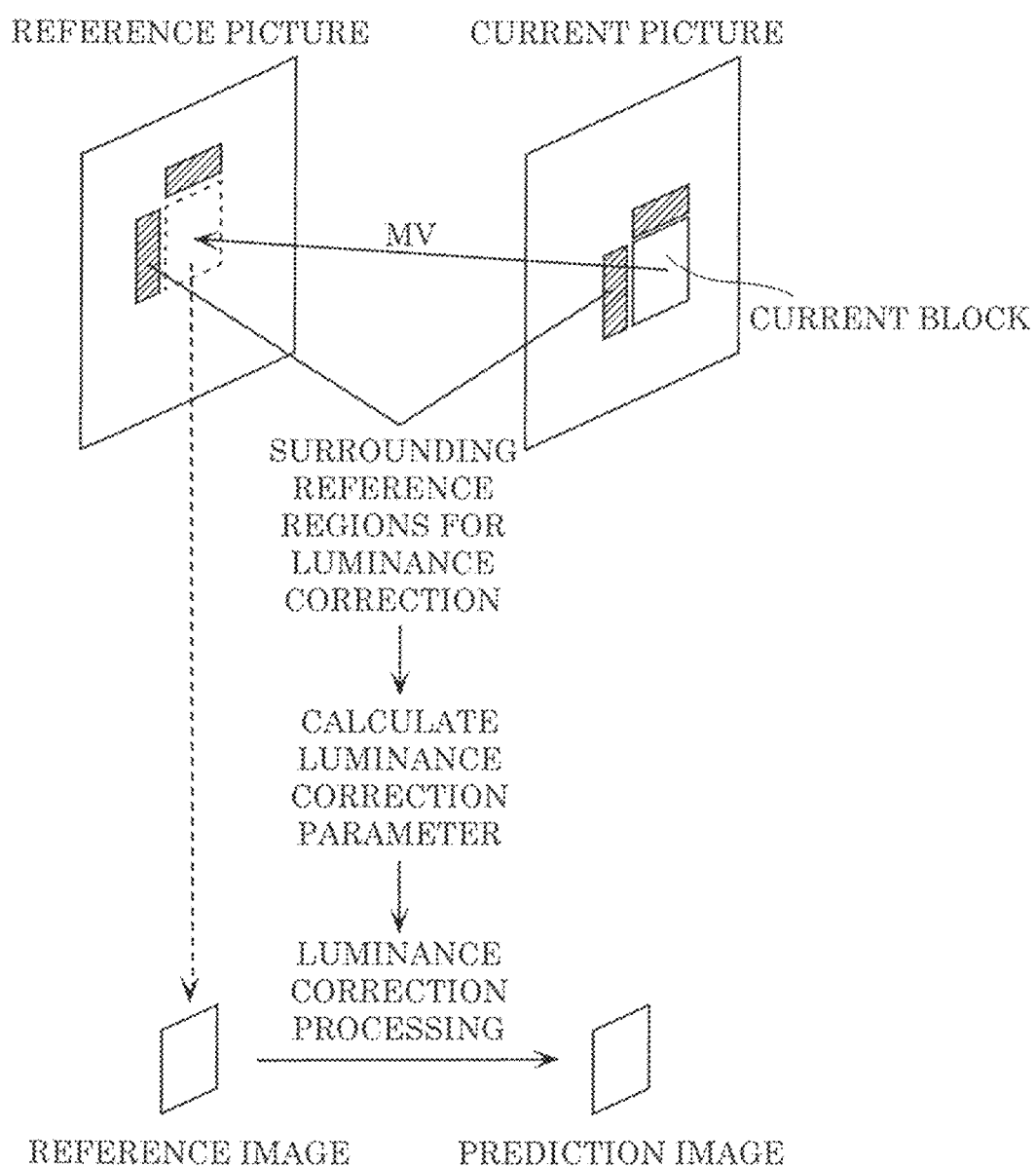
FIG. 9D illustrates one example of a prediction image generation method using a luminance correction process performed by LIC (local illumination compensation) processing.

FIG. 9D illustrates one example of a prediction image generation method using a luminance correction process performed by LIC processing.

First, from an encoded reference picture, an MV is derived to obtain a reference image corresponding to the current block.

Next, for the current block, information indicating how the luminance value changed between the reference picture and the current picture is obtained, based on the luminance pixel values of the encoded neighboring left reference region and the encoded neighboring upper reference region in the current picture, and based on the luminance pixel values in the same locations in the reference picture as specified by the MV. The information indicating how the luminance value changed is used to calculate a luminance correction parameter.

The prediction image for the current block is generated by performing a luminance correction process, which applies the luminance correction parameter on the reference image in the reference picture specified by the MV.

Note that the shape of the surrounding reference region(s) illustrated in FIG. 9D is just one example; the surrounding reference region may have a different shape.

Furthermore, although a prediction image is generated from a single reference picture in this example, in cases in which a prediction image is generated from a plurality of reference pictures the prediction image may be generated after performing a luminance correction process, as described above, on the reference images obtained from the reference pictures.

One example of a method for determining whether to implement LIC processing is using an lic_flag, which is a signal that indicates whether to implement LIC processing. As one specific example, the encoder determines whether the current block belongs to a region of luminance change. The encoder sets the lic_flag to a value of "1" when the block belongs to a region of luminance change, and implements LIC processing when encoding. The encoder sets the lic_flag to a value of "O" when the block does not belong to a region of luminance change, and performs encoding implementing LIC processing. The decoder may switch between implementing LIC processing or not by decoding the lic_flag written in the stream and performing the decoding in accordance with the flag value.

One example of a different method of determining whether to implement LIC processing includes discerning whether LIC processing was determined to be implemented for a surrounding block. In one specific example, when merge mode is used on the current block, it is determined whether LIC processing was applied in the encoding of the surrounding encoded block, which was selected when deriving the MV in merge mode. Then, the determination is used to further determine whether to implement LIC processing or not for the current block. Note that in this example also, the same applies to the processing performed on the decoder side.

(Decoder)

Figure 10:
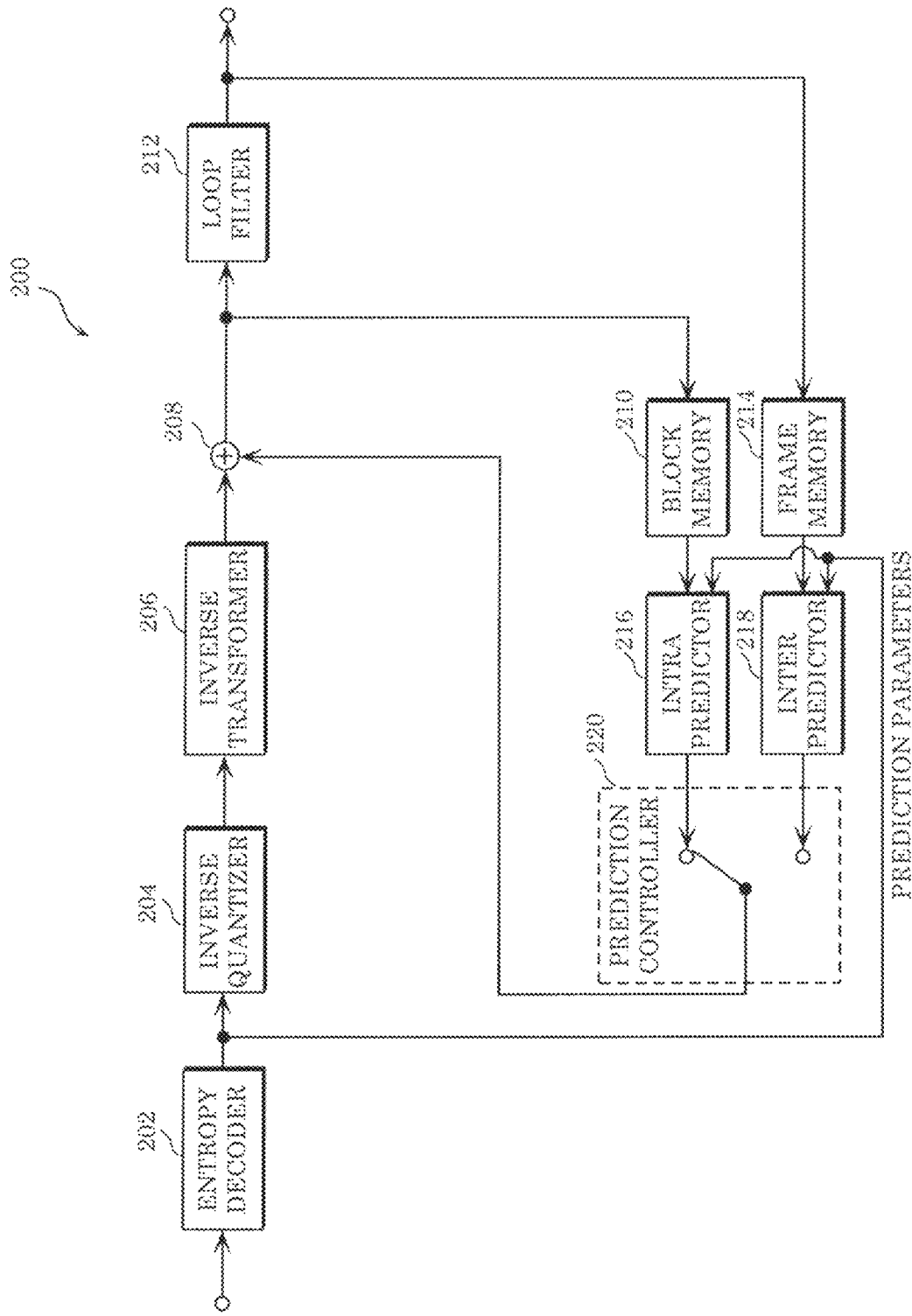
FIG. 10 is a block diagram illustrating a functional configuration of the decoder according to an embodiment.

Next, a decoder capable of decoding an encoded signal (encoded bitstream) output from encoder 100 will be described. FIG. 10 is a block diagram illustrating a functional configuration of decoder 200 according to an embodiment. Decoder 200 is a moving picture decoder that decodes a moving picture block by block.

As illustrated in FIG. 10, decoder 200 includes entropy decoder 202, inverse quantizer 204, inverse transformer 206, adder 208, block memory 210, loop filter 212, frame memory 214, intra predictor 216, inter predictor 218, and prediction controller 220.

Decoder 200 is realized as, for example, a generic processor and memory. In this case, when a software program stored in the memory is executed by the processor, the processor functions as entropy decoder 202, inverse quantizer 204, inverse transformer 206, adder 208, loop filter 212, intra predictor 216, inter predictor 218, and prediction controller 220. Alternatively, decoder 200 may be realized as one or more dedicated electronic circuits corresponding to entropy decoder 202, inverse quantizer 204, inverse transformer 206, adder 208, loop filter 212, intra predictor 216, inter predictor 218, and prediction controller 220.

Hereinafter, each component included in decoder 200 will be described.

(Entropy Decoder)

Entropy decoder 202 entropy decodes an encoded bitstream. More specifically, for example, entropy decoder 202 arithmetic decodes an encoded bitstream into a binary signal. Entropy decoder 202 then debinarizes the binary signal. Entropy decoder 202 outputs quantized coefficients of each block to inverse quantizer 204. Entropy decoder 202 may also output the prediction parameters, which may be included in the encoded bitstream (see FIG. 1), to intra predictor 216, inter predictor 218, and prediction controller 220 so that they can carry out the same prediction processing as performed on the encoder side in intra predictor 124, inter predictor 126, and prediction controller 128.

(Inverse Quantizer)

Inverse quantizer 204 inverse quantizes quantized coefficients of a block to be decoded (hereinafter referred to as a current block), which are inputted from entropy decoder 202. More specifically, inverse quantizer 204 inverse quantizes quantized coefficients of the current block based on quantization parameters corresponding to the quantized coefficients. Inverse quantizer 204 then outputs the inverse quantized coefficients (i.e., transform coefficients) of the current block to inverse transformer 206.

(Inverse Transformer)

Inverse transformer 206 restores prediction errors (residuals) by inverse transforming transform coefficients, which are inputted from inverse quantizer 204.

For example, when information parsed from an encoded bitstream indicates application of EMT or AMT (for example, when the AMT flag is set to true), inverse transformer 206 inverse transforms the transform coefficients of the current block based on information indicating the parsed transform type.

Moreover, for example, when information parsed from an encoded bitstream indicates application of NSST, inverse transformer 206 applies a secondary inverse transform to the transform coefficients.

(Adder)

Adder 208 reconstructs the current block by summing prediction errors, which are inputted from inverse transformer 206, and prediction samples, which is an input from prediction controller 220. Adder 208 then outputs the reconstructed block to block memory 210 and loop filter 212.

(Block Memory)

Block memory 210 is storage for storing blocks in a picture to be decoded (hereinafter referred to as a current picture) for reference in intra prediction. More specifically, block memory 210 stores reconstructed blocks output from adder 208.

(Loop Filter)

Loop filter 212 applies a loop filter to blocks reconstructed by adder 208, and outputs the filtered reconstructed blocks to frame memory 214 and, for example, to a display device.

When information indicating the enabling or disabling of ALF parsed from an encoded bitstream indicates enabled, one filter from among a plurality of filters is selected based on direction and activity of local gradients, and the selected filter is applied to the reconstructed block.

(Frame Memory)

Frame memory 214 is storage for storing reference pictures used in inter prediction, and is also referred to as a frame buffer. More specifically, frame memory 214 stores reconstructed blocks filtered by loop filter 212.

(Intra Predictor)

Intra predictor 216 generates a prediction signal (intra prediction signal) by intra prediction with reference to a block or blocks in the current picture as stored in block memory 210. More specifically, intra predictor 216 generates an intra prediction signal by intra prediction with reference to samples (for example, luma and/or chroma values) of a block or blocks neighboring the current block, and then outputs the intra prediction signal to prediction controller 220.

Note that when an intra prediction mode in which a chroma block is intra predicted from a luma block is selected, intra predictor 216 may predict the chroma component of the current block based on the luma component of the current block.

Moreover, when information indicating the application of PDPC is parsed from an encoded bitstream (in the prediction parameters outputted from entropy decoder 202, for example), intra predictor 216 corrects post-intra-prediction pixel values based on horizontal/vertical reference pixel gradients.

(Inter Predictor)

Inter predictor 218 predicts the current block with reference to a reference picture stored in frame memory 214. Inter prediction is performed per current block or per sub-block (for example, per 4×4 block) in the current block. For example, inter predictor 218 generates an inter prediction signal of the current block or sub-block based on motion compensation using motion information (for example, a motion vector) parsed from an encoded bitstream (in the prediction parameters outputted from entropy decoder 202, for example), and outputs the inter prediction signal to prediction controller 220.

When the information parsed from the encoded bitstream indicates application of OBMC mode, inter predictor 218 generates the inter prediction signal using motion information for a neighboring block in addition to motion information for the current block obtained from motion estimation.

Moreover, when the information parsed from the encoded bitstream indicates application of FRUC mode, inter predictor 218 derives motion information by performing motion estimation in accordance with the pattern matching method (bilateral matching or template matching) parsed from the encoded bitstream. Inter predictor 218 then performs motion compensation (prediction) using the derived motion information.

Moreover, when BIO mode is to be applied, inter predictor 218 derives a motion vector based on a model assuming uniform linear motion. Further, when the information parsed from the encoded bitstream indicates that affine motion compensation prediction mode is to be applied, inter predictor 218 derives a motion vector of each sub-block based on motion vectors of neighboring blocks.

(Prediction Controller)

Prediction controller 220 selects either the intra prediction signal or the inter prediction signal, and outputs the selected prediction signal to adder 208. Furthermore, prediction controller 220 may perform various functions and operations, such as merge mode (see FIG. 9B), DMVR processing (see FIG. 9C), and LIC processing (FIG. 9D) as described above in reference to prediction controller 128 on the encoder side. In general, the configuration, functions and operations of prediction controller 220, inter predictor 218 and intra predictor 216 on the decoder side may correspond to the configuration, functions and operations of prediction controller 128, inter predictor 126 and intra predictor 124 on the encoder side.

(Detailed Description of Inter Prediction)

The following describes examples according to another embodiment of inter prediction in accordance with the present application. The present embodiment relates to inter prediction in so-called BIO mode. In the present embodiment, the motion vectors of blocks are corrected not in pixel units, as in the embodiment as shown in FIGS. 1 to 10, but rather in sub-block units. The explanation of the present embodiment will focus on points of difference with respect to the embodiment as shown in FIGS. 1 to 10.

Because the configurations of the encoder and decoder in the present embodiment are substantially the same as those in the embodiment as shown in FIGS. 1 to 10, depiction and description of these configurations has been omitted.

(Inter Prediction)

Figure 11:
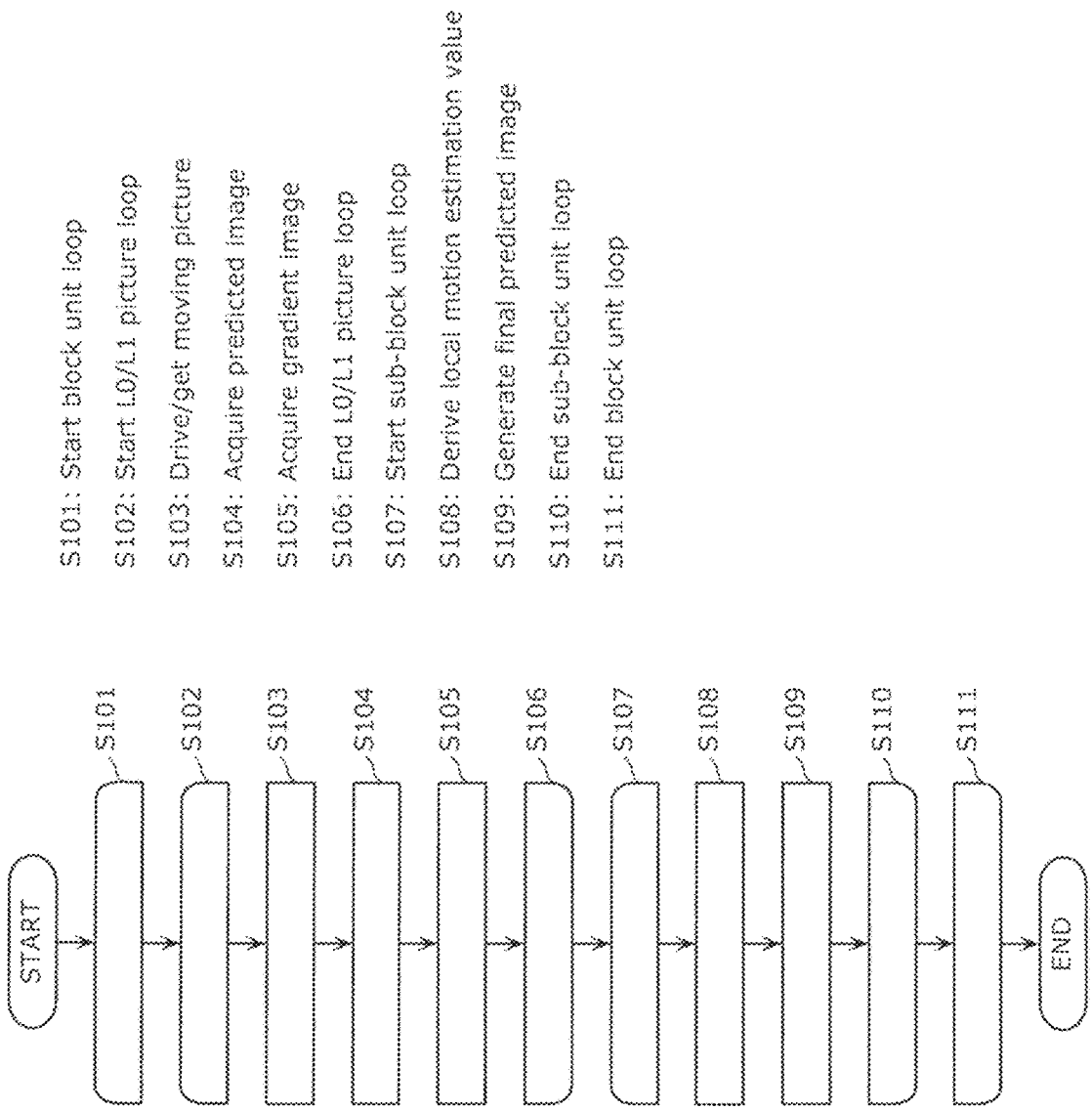
FIG. 11 is a flowchart showing an inter prediction process according to another embodiment.
Figure 12:
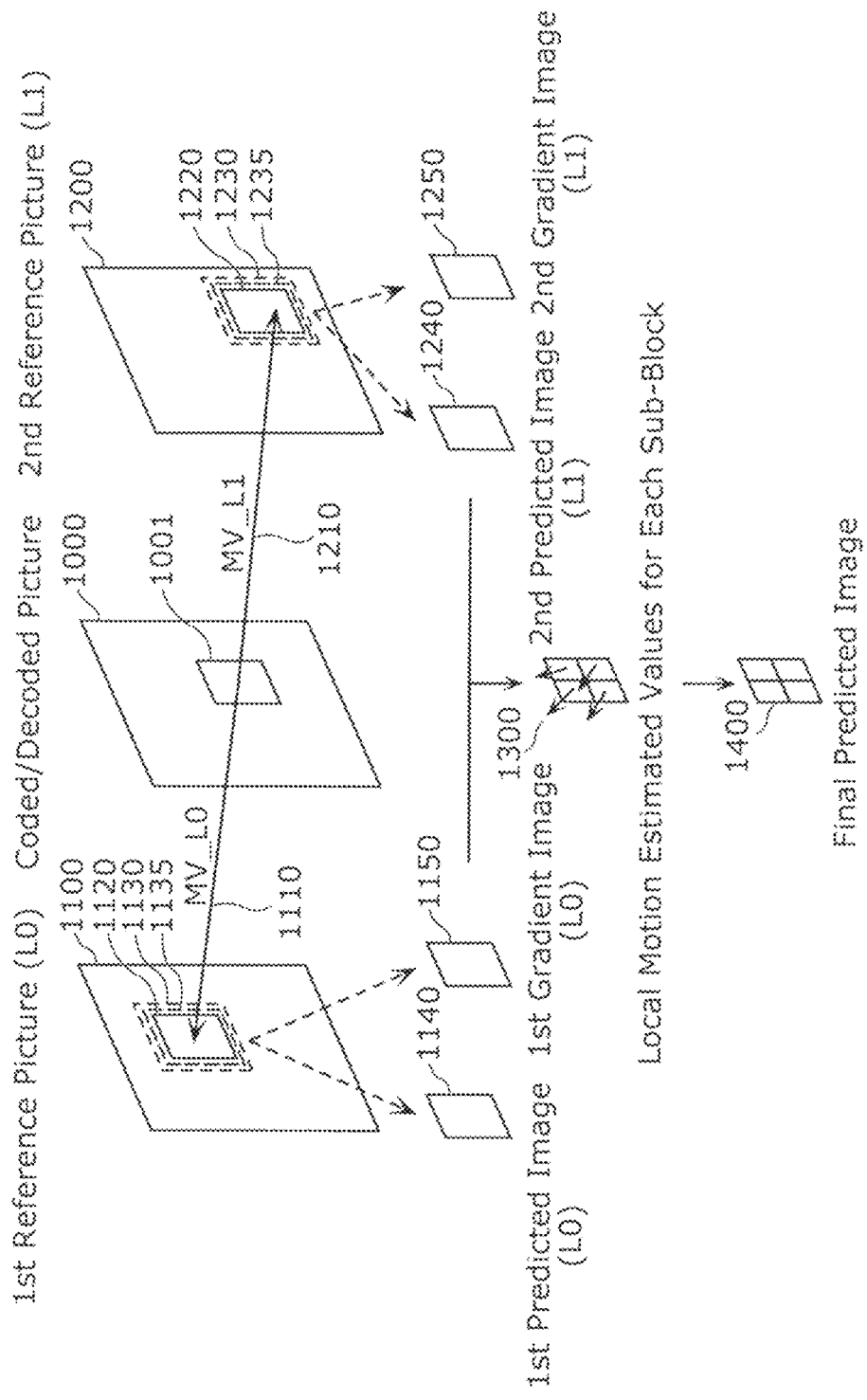
FIG. 12 is a conceptual diagram used to explain the inter prediction in accordance with the embodiment shown in FIG. 11.

FIG. 11 is a flowchart showing the inter prediction in the present embodiment. FIG. 12 is a conceptual diagram used to explain the inter prediction in the present embodiment. The following processing is performed by the inter predictor 126 in the encoder 100 and the inter predictor 218 in the decoder 200.

As shown in FIG. 11, block loop processing is first performed on a plurality of blocks in the picture (current picture 1000) to be coded/decoded (S101 to S111). In FIG. 12, a block to be encoded/decoded is selected from among the plurality of blocks as the current block 1001.

In the block loop processing, the loop processing is performed in reference pictures on a first reference picture 1100 (L0) and a second reference picture 1200 (L1) which are processed pictures (S102 to S106).

In the reference picture loop processing, block motion vectors are first derived or acquired in order to obtain predicted images from the reference pictures (S103). In FIG. 12, a first motion vector 1110 (MV_L0) is derived or acquired for the first reference picture 1100 and a second motion vector 1210 (MV_L1) is derived or acquired for the second reference picture 1200. Examples of motion vector derivation methods that can be used include the ordinary inter prediction mode, merge mode, and FRUC mode. In the case of the ordinary inter prediction mode, the encoder 100 derives a motion vector using a motion search and the decoder 200 obtains a motion vector from a bit stream.

Next, predicted images are obtained from the reference pictures by performing motion compensation using derived or acquired motion vectors (S104). In FIG. 12, a first predicted image 1140 is obtained from a first reference picture 1100 by performing motion compensation using a first motion vector 1110. Also, a second predicted image 1240 is obtained from a second reference picture 1200 by performing motion compensation using a second motion vector 1210.

In motion compensation, a motion compensation filter is applied to a reference picture. The motion compensation filter is an interpolation filter used to obtain a predicted image with sub-pixel precision. Using the first reference picture 1100 in FIG. 12, pixels in a first interpolation range 1130 including the pixels in the first predicted block 1120 and surrounding pixels are referenced by the motion compensation filter in the first predicted block 1120 indicated by the first motion vector 1110. Also, using the second reference picture 1200, pixels in a second interpolation range 1230 including the pixels in the second predicted block 1220 and surrounding pixels are referenced by the motion compensation filter in the second predicted block 1220 indicated by the second motion vector 1210.

Note that the first interpolation reference range 1130 and the second interpolation range 1230 include the first ordinary reference range and the second ordinary reference range used to perform motion compensation of the current block 1001 in ordinary inter prediction in which processing is performed using local motion estimation values. The first ordinary reference range is included in the first reference picture 1100 and the second ordinary reference range is included in the second reference picture 1200. In ordinary inter prediction, motion vectors are derived in blocks using a motion search, motion compensation is performed in blocks on the derived motion vector, and the motion compensated image is used as the final predicted image. In other words, local motion estimation values are not used in ordinary inter prediction. Note that the first interpolation reference range 1130 and the second interpolation reference range 1230 may match the first ordinary reference range and the second ordinary reference range.

Next, gradient images corresponding to the predicted images are obtained from the reference pictures (S105). Each pixel in the gradient images has a gradient value indicating the spatial slope of the luminance or color difference. Gradient values are obtained by applying a gradient filter to reference pictures. In the first reference picture 1100 in FIG. 12, pixels in a first gradient reference range 1135 including the pixels in the first predicted block 1120 and the surrounding pixels are referenced using a gradient filter for the first predicted block 1120. The first gradient reference range 1135 is included in the first interpolation reference range 1130. In the second reference picture 1200, pixels in a second gradient reference range 1235 including the pixels in the second predicted block 1220 and the surrounding pixels are referenced using a gradient filter for the second predicted block 1220. The second gradient reference range 1235 is included in the second interpolation reference range 1230.

When a predicted image and a gradient image have been obtained from both the first reference picture and the second reference picture, the reference picture loop processing is ended (S106). Afterwards, loop processing is performed on sub-blocks obtained by further dividing a block (S107 to S110). Each sub-block has a size smaller than that of the current block (for example, a size of 4×4 pixels).

In the sub-block loop processing, local motion estimation values 1300 are first derived using the first predicted image 1140, the second predicted image 1240, the first gradient image 1150, and the second gradient image 1250 obtained from the first reference picture 1100 and the second reference picture 1200 (S108). For example, the pixels in a predicted sub-block in each of the first predicted image 1140, the second predicted image 1240, the first gradient image 1150, and the second gradient image 1250 are referenced, and a local motion estimation value 1300 is derived for the sub-block. The predicted sub-block is an area in the first predicted block 1140 and the second predicted block 1240 corresponding to a sub-block in the current block 1001. A local motion estimation value is sometimes referred to as a corrected motion vector.

Next, a final predicted image 1400 for the sub-block is generated using pixel values in the first predicted image 1140 and the second predicted image 1240, gradient values in the first gradient image 1150 and the second gradient image 1250, and local motion estimation values 1300. When a final predicted image has been generated for each sub-block in the current block, a final predicted image is generated for the current block and the sub-block loop processing is ended (S110).

When the block loop processing has ended (S111), the processing in FIG. 11 is ended.

Note that predicted images and gradient images can be obtained on the sub-block level by allocating the motion vectors for sub-blocks of the current block to each of the sub-blocks.

(Reference Ranges for the Motion Compensation Filter and Gradient Filter in an example of the Present Embodiment)

The following describes an example of the reference ranges for the motion compensation filter and the gradient filter in accordance with the present embodiment.

Figure 13:
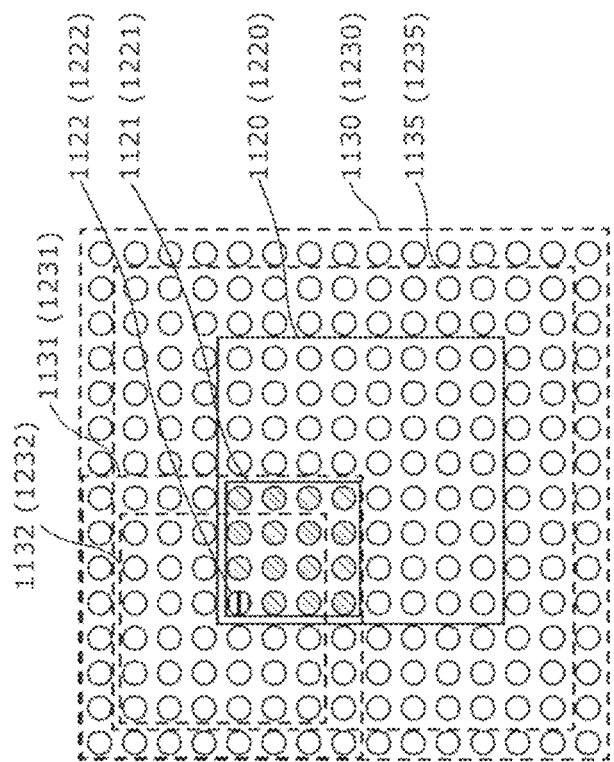
FIG. 13 is a conceptual diagram used to explain an example of reference ranges for a motion compensation filter and a gradient filter in accordance with an example of the embodiment shown in FIG. 11.

FIG. 13 is a conceptual diagram used to explain an example of reference ranges for the motion compensation filter and gradient filter in accordance with an example of the present embodiment.

In FIG. 13, each circle represents a sample. In the example shown in FIG. 13, the size of the current block is 8×8 samples and the size of the sub-blocks is 4×4 samples.

Reference range 1131 is the reference range for the motion compensation filter applied to the upper left sample 1122 of the first predicted block 1120 (for example, a square range with 8×8 samples). Reference range 1231 is the reference range for the motion compensation filter applied to the upper left sample 1222 of the second predicted block 1220 (for example, a square range with 8×8 samples).

Reference range 1132 is the reference range for the gradient filter applied to the upper left sample 1122 of the first predicted block 1120 (for example, a square range with 6×6 samples). Reference range 1232 is the reference range for the gradient filter applied to the upper left sample 1222 of the second predicted block 1220 (for example, a square range with 6×6 samples).

The motion compensation filter and the gradient filter are applied to the other samples in the first predicted block 1120 and the second predicted block 1220 while referencing samples in a same-size reference range at the positions corresponding to each sample. As a result, the samples in the first interpolation range 1130 and the second interpolation range 1230 are referenced in order to obtain a first predicted image 1140 and a second predicted image 1240. Also, the samples in the first gradient range 1135 and the second gradient range 1235 are referenced in order to obtain a first gradient image 1150 and a second gradient image 1250.

(Effects Etc.)

In this way, the encoder and the decoder in the present embodiment can derive local motion estimation values in sub-blocks. Therefore, the processing burden or processing times can be reduced compared to derivation of local motion estimation values in sample units while reducing prediction errors using local motion estimation values in sub-sample units.

Also, the encoder and the decoder in the present embodiment can use interpolation reference ranges in the ordinary reference ranges. Therefore, when generating a final predicted image using local motion estimation values in sub-blocks, new sample data does not have to be loaded from the frame memory during motion compensation and any increase in memory capacity and memory band width can be restrained.

Also, the encoder and the decoder in the present embodiment can use gradient reference ranges in the ordinary reference ranges. Therefore, new sample data does not have to be loaded from the frame memory to obtain gradient images and any increase in memory capacity and memory band width can be restrained.

The present embodiment may be combined with at least some aspects of the other embodiments. Also, some of the processing, some of the elements in the devices, and some of the syntax described in the flowchart of the present embodiment may be combined with aspects of the other embodiments.

Modified Example 1 of the Present Embodiment

The following is a detailed description of a modified example of a motion compensation filter and a gradient filter in accordance with the present embodiment. In Modified Example 1, the processing related to the second predicted image is similar to the processing related to the first predicted image so further explanation has either been omitted or simplified.

(Motion Compensation Filter)

Figure 14:
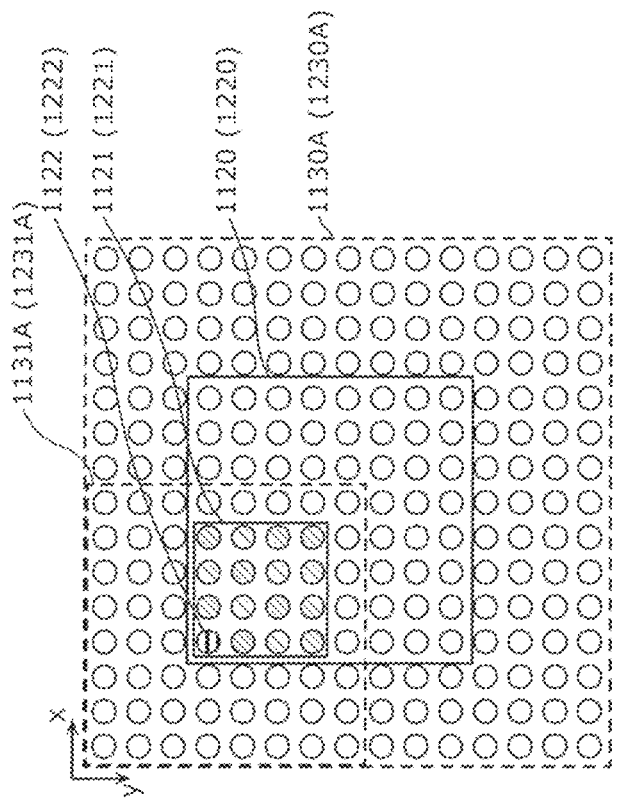
FIG. 14 is a conceptual diagram used to explain an example of a reference range for a motion compensation filter in accordance with Modified Example 1 of the embodiment shown in FIG. 11.

The motion compensation filter will be explained first. FIG. 14 is a conceptual diagram used to explain an example of a reference range for the motion compensation filter in Modified Example 1 of the present embodiment.

In the following explanation, the motion compensation filter with ¼ sample in the horizontal direction and ½ sample in the vertical direction is applied to the first predicted block 1120. The motion compensation filter is a so-called eight-tap filter and is represented by Equation (3) below.

[Math. 3]

$$I^k[x, y] = \sum_{j=0}^{7}\left(w_{0.5}[j]\sum_{i=0}^{7} w_{0.25}[i]I_0^k[x-3+i, y-3+j]\right) \quad (3)$$

$$w_{0.25} = (-1, 4, -10, 58, 17, -5, 1, 0)$$

$$w_{0.5} = (-1, 4, -11, 40, 40, -11, 4, -1)$$

Here, $I^k[x, y]$ represents a sample value in the first predicted image with sub-sample precision when k is 0 and a sample value in the second predicted image with sub-sample precision when k is 1. A sample value is a value for a sample, for example, a luminance value or a color difference value in a predicted image. Here, $w_{0.25}$ and $w_{0.5}$ are the weighting factor for ¼ sample precision and ½ sample precision. $I_0^k$ [x, y] represents a sample value in the first predicted image with whole sample precision when k is 0 and a sample value in the second predicted image with whole sample precision when k is 1.

For example, when the motion compensation filter in Equation (3) is applied to the upper left sample 1122 in FIG. 14, the values of the samples arranged in the horizontal direction in the reference range 1131A are weighted and added up in each line and the addition results for the lines are also weighted and added up.

In the present modified example, the motion compensation filter for the upper left sample 1122 references the samples in the reference range 1131A. The reference range 1131A is a rectangular range running three samples to the left, four samples to the right, three samples above, and four samples below the upper left sample 1122.

This motion compensation filter is applied to all of the samples in the first predicted block 1120. Therefore, the samples in the first interpolation reference range 1130A are referenced by the motion compensation filter for the first predicted block 1120.

The motion compensation filter is applied to the second predicted block 1220 in the same way as the first predicted block 1120. In other words, the samples in the reference range 1231A are referenced for the upper left sample 1222 and the samples in the second interpolation range 1230A are referenced in the entire second predicted block 1220.

(Gradient Filter)

The following is an explanation of the gradient filter. FIG. 15 is a conceptual diagram used to explain an example of a reference range for the gradient filter in Modified Example 1 of the present embodiment.

The gradient filter in the present modified example is a so-called five-tap filter and is represented by Equation (4) and Equation (5) below.

[Math. 4]
$$I_x^k[x, y] = \sum_{i=0}^{4} w[i] I_0^k[x - 2 + i, y] \quad (4)$$

[Math. 5]
$$I_y^k[x, y] = \sum_{j=0}^{4} w[j] I_0^k[x, y - 2 + j] \quad (5)$$

$$w = (2, -9, 0, 9, -2)$$

Here, $I_x^k$ [x, y] indicates the horizontal gradient value for each sample in the first gradient image when k is 0 and indicates the horizontal gradient value for each sample in the second gradient image when k is 1. $I_y^k$ [x, y] indicates the vertical gradient value for each sample in the first gradient image when k is 0 and indicates the vertical gradient value for each sample in the second gradient image when k is 1. In these equations, w is the weighting factor.

For example, when the gradient filter in Equation (4) and Equation (5) are applied to the upper left sample 1122 in FIG. 15, the horizontal gradient sample values are the sample values of the five samples arranged in the horizontal direction including the upper left sample 1122 and are calculated by weighting and adding up the sample values in the predicted image with whole sample precision. At this time, the weighting factor has a positive or negative value for the samples above or below and left or right of the upper left sample 1122.

In the present modified example, the gradient filter for the upper left sample 1122 references the samples in the reference range 1132A. The reference range 1132A is cross-shaped and extends two samples above and below and to the left and right of the upper left sample 1122.

This gradient filter is applied to all of the samples in the first predicted block 1120. Therefore, the samples in the first gradient reference range 1135A are referenced by the motion compensation filter for the first predicted block 1120.

The gradient filter is applied to the second predicted block 1220 in the same way as the first predicted block 1120. In other words, the samples in the reference range 1232A are referenced for the upper left sample 1222 and the samples in the second gradient range 1235A are referenced in the entire second predicted block 1220.

When a motion vector indicating the reference range indicates a sub-sample position, the sample values in the reference ranges 1132A and 1232A of the gradient filter may be converted to sample values with sub-sample precision and the gradient filter applied to the converted sample values. Also, a gradient filter having a coefficient value obtained by convoluting a coefficient value for conversion to sub-sample precision and a coefficient value for deriving a gradient value may be applied to sample values with whole sample precision. In this case, the gradient filter is different at each sub-sample location.

(Deriving Local Motion Estimation Values for Sub-Blocks)

The following is an explanation of the derivation of local motion estimation values for sub-blocks. In this example, local motion estimation values are derived for the upper left sub-block among the sub-blocks in the current block.

In the present modified example, horizontal local motion estimation values u and vertical local motion estimation values v are derived for sub-blocks based on Equation (6) below.

[Math. 6]
$$\left. \begin{array}{l} u = \dfrac{sG_x dI}{sG_x^2} \\ v = \dfrac{sG_y dI - u * sG_x G_y}{sG_y^2} \end{array} \right\} \quad (6)$$

Here, $sG_xG_y$, $sG_x^2$, $sG_y^2$, $sG_xdI$ and $sG_ydI$ are values calculated in sub-blocks and are derived based on Equation (7) below.

[Math. 7]
$$\left. \begin{array}{l} sG_xG_y = \sum_{[i,j] \in \Omega} w[i, j] * G_x[i, j] * G_y[i, j] \\ sG_x^2 = \sum_{[i,j] \in \Omega} w[i, j] * G_x[i, j] * G_x[i, j] \\ sG_y^2 = \sum_{[i,j] \in \Omega} w[i, j] * G_y[i, j] * G_y[i, j] \\ sG_x dI = \sum_{[i,j] \in \Omega} w[i, j] * G_x[i, j] * \Delta I[i, j] \\ sG_y dI = \sum_{[i,j] \in \Omega} w[i, j] * G_y[i, j] * \Delta I[i, j] \end{array} \right\} \quad (7)$$

Here, Q is the set of coordinates for all samples in a predicted sub-block in a region/area of the predicted block corresponding to the sub-block. $G_x$ [i, j] indicates the sum of the horizontal gradient value of the first gradient image and the horizontal gradient value of the second gradient image, and $G_y$ [i, j] indicates the sum of the vertical gradient value of the first gradient image and the vertical gradient value of the second gradient image. ΔI [i, j] indicates the difference value for the first predicted image and the second predicted image. w [i, j] indicates a weighting factor dependent on the sample position in the predicted sub-block. However, a weighting factor with the same value may be used for all samples in the predicted sub-block.

More specifically, $G_x$ [i, j], $G_y$ [i, j] and ΔI [i, j] are represented by Equation (8) below.

[Math. 8]

$$\left.\begin{array}{l}G_x[x, y] = I_x^0[x, y] + I_x^1[x, y]\\G_y[x, y] = I_y^0[x, y] + I_y^1[x, y]\\\Delta I[i, j] = I^0[i, j] - I^1[i, j]\end{array}\right\} \quad (8)$$

In this way, local motion estimation values are derived in sub-blocks.

(Generating Final Predicted Image)

The following is an explanation of the generation of a final predicted image. Each sample value p [x, y] in the final predicted image is derived based on Equation (9) below using a sample value $I^0$[x, y] in the first predicted image and a sample value $I^1$[x, y] in the second predicted image.

[Math. 9]

$$p[x, y] = (I^0[x, y] + I^1[x, y] + b[x, y]) >> 1 \quad (9)$$

Here, b [x, y] indicates the correction value for each sample. In Equation (9), each sample value p [x, y] in the final predicted image is calculated by shifting the sum of a sample value $I^0$[x, y] in the first predicted image, a sample value $I^1$[x, y] in the second predicted image, and the correction value b [x, y] one bit to the right. The correction value b [x, y] is represented by Equation (10) below.

[Math. 10]

$$b[x, y] = u(I_x^0[x, y] - I_x^1[x, y]) + v(I_y^0[x, y] - I_y^1[x, y]) \quad (10)$$

In Equation (10), the correction value b [x, y] is calculated by multiplying the horizontal local motion estimation value (u) by the difference of the horizontal gradient values ($I_x^0$[x, y]−$I_x^1$[x, y]) in the first gradient image and the second gradient image, multiplying the vertical local motion estimation value (v) by the difference of the vertical gradient values ($I_y^0$[x, y]−$I_y^1$[x, y]) in the first gradient image and the second gradient image, and adding the products together.

The calculations explained using Equation (6) through Equation (10) merely are an example. Equations having the same effect may also be used.

(Effects Etc.)

In this way, local motion estimation values can be derived in sub-blocks when using a motion compensation filter and gradient filter in the present modified example. When a final predicted image of the current block is generated using local motion estimation values in sub-blocks derived in this manner, results similar to those in the present embodiment can be obtained.

The present embodiment may be combined with at least some aspects of the other embodiments. Also, some of the processing, some of the elements in the devices, and some of the syntax described in the flowchart of the present embodiment may be combined with aspects of the other embodiments.

Modified Example 2 of the Present Embodiment

In the present embodiment and Modified Example 1 of the present embodiment, all samples in a predicted sub-block inside a predicted block corresponding to a sub-block in the current block are referenced when deriving local movement estimation values. However, the present disclosure is not limited to these examples. For example, only some of the samples in a predicted sub-block can be referenced. This scenario is described in the following paragraphs as Modified Example 2 of the Present Embodiment.

In the explanation of the present modified example, only some of the samples in a predicted sub-block are referenced when deriving local motion estimation values in sub-blocks. For example, in Equation (7) in Modified Example 1, a set of coordinates for some of the samples in a predicted sub-block are used instead of the sets of coordinates Q for all samples in the predicted sub-block. Various patterns can be used as sets of coordinates for some of the samples in a predicted sub-block.

FIG. 16 is a diagram showing an example of sample patterns referenced by deriving local motion estimation values in Modified Example 2 of the present embodiment. In FIG. 16, the circles with cross-hatching in predicted block 1121 or 1221 indicate referenced samples and circles without cross-hatching indicate unreferenced samples.

Each of the seven sample patterns in FIG. 16 (a) to (g) indicate some of the samples in predicted sub-block 1121 or 1221. These seven sample patterns are all different.

In FIG. 16 (a) to (c), only eight of the sixteen samples in predicted sub-block 1121 or 1221 are referenced. In FIG. 16 (d) to (g), only four of the sixteen samples in predicted sub-block 1121 or 1221 are referenced. In other words, eight of the sixteen samples have been thinned out in FIG. 16 (a) to (c) and twelve of the sixteen samples have been thinned out in FIG. 16 (d) to (g).

More specifically, in FIG. 16 (a), eight samples, or every other sample in the horizontal and vertical directions, are referenced. In FIG. 16 (b), two pairs of samples arranged on the left and on the right horizontally but alternating vertically are referenced. In FIG. 16 (c), four samples in the center and four samples in the corners are referenced in predicted sub-blocks 1121 or 1221.

In FIGS. 16 (d) and (e), two samples are referenced in the first row and the third row horizontally and vertically, respectively. In FIG. 16 (0, the four corner samples are referenced. In FIG. 16 (g), the four center samples are referenced.

A reference pattern may be selected adaptively from among a plurality of predetermined patterns based on the two predicted images. For example, a sample pattern including samples corresponding to a representative gradient value in two predicted images may be selected. More specifically, when the representative gradient value is smaller than a threshold value, a sample pattern including four samples (for example, any one of (d) to (g)) may be selected. When it is not smaller than the threshold value, a sample pattern including eight samples (for example, any one of (a) to (c)) may be selected.

When a sample pattern has been selected from among the plurality of sample patterns, samples in the predicted sub-block indicating the selected sample pattern are referenced and local motion estimation values are derived for the sub-block.

Note that information indicating the selected sample pattern may be written to a bit stream. In this case, the decoder may acquire the information from the bit stream and select the sample pattern based on the acquired information. The information indicating the selected sample pattern may be written to a header in block, slice, picture, or stream units.

In this way, an encoder and a decoder in the present embodiment can reference only some of the samples in a predicted sub-block and derive local motion estimation values in sub-blocks. Therefore, the processing load or processing time can be reduced compared to referencing all of the samples.

Also, an encoder and a decoder in the present embodiment can reference only samples in a sample pattern selected from among a plurality of sample patterns and derive local motion estimation values in sub-blocks. By switching sample patterns, samples suitable for the derivation of local motion estimation values in sub-blocks can be referenced and prediction errors can be reduced.

The present embodiment may be combined with at least some aspects of the other embodiments. Also, some of the processing, some of the elements in the devices, and some of the syntax described in the flowchart of the present embodiment may be combined with aspects of the other embodiments.

Other Modified Examples of the Present Embodiment

The encoder and decoder in one or more aspects of the present disclosure were explained with reference to embodiments and modified examples of embodiments. However, the present disclosure is not limited to these embodiments and modified examples of embodiments. Those skilled in the art could readily conceive of variations that are suitable for use in these embodiments and modified examples of embodiments without departing from the spirit and scope of the present disclosure and that are included within one or more aspects of the present disclosure.

For example, the number of taps in the motion compensation filter used in the examples of the present embodiment and Modified Example 1 of this embodiment was eight samples. However, the present disclosure is not limited to this example. The number of taps in the motion compensation filter can be any number of taps as long as the interpolation reference range is included in an ordinary reference range.

The number of taps in the gradient used in the examples of the present embodiment and Modified Example 1 of this embodiment was five or six samples. However, the present disclosure is not limited to this example. The number of taps in the gradient filter can be any number of taps as long as the gradient reference range is included in the interpolation reference range.

In the examples of the present embodiment and Modified Example 1 of this embodiment, the first gradient reference range and the second gradient reference range were included in the first interpolation reference range and the second interpolation reference range. However, the present disclosure is not limited to this example. For example, the first gradient reference range may match the first interpolation reference range and the second gradient reference range may match the second interpolation reference range.

When local motion estimation values are derived in sub-blocks, the sample values may be weighted so that the values for the samples in the center of the predicted sub-block are given preferential treatment. Specifically, when deriving local motion estimation values, the values for a plurality of samples in the predicted sub-block may be weighted in both the first predicted block and the second predicted block. In this case, the samples in the center of the predicted sub-block may be given greater weight. That is, the samples in the center of the predicted sub-block may be weighted with values higher than those used for samples outside the center of the predicted sub-block. More specifically, in Modified Example 1 of the present embodiment, the weighting factor w [i, j] in Equation (7) may cause the coordinate values closer to the center of the predicted sub-block to be larger.

When the local motion estimation values are derived in sub-blocks, samples belonging to adjacent predicted sub-blocks may be referenced. Specifically, in both the first predicted block and the second predicted sub-block, samples in an adjacent predicted sub-block may be added to the samples in the predicted sub-block and referenced to derive local motion estimation values in sub-blocks.

The reference ranges for the motion compensation filters and gradient filters in the examples of the present embodiment and Modified Example 1 of this embodiment are for illustrative purposes only. The present disclosure does not have to be limited to these examples.

In Modified Example 2 of the present embodiment, seven sample patterns were provided as examples. However, the present disclosure is not limited to these sample patterns. For example, sample patterns may be used which are obtained by rotating each of the seven sample patterns.

The values for the weighting factors in Modified Example 1 of the present embodiment are merely examples, and the present disclosure is not limited to these examples. Also, the block sizes and the sub-block sizes in the present embodiment and both modified examples of these embodiments are only examples. The present disclosure is not limited to an 8×8 sample size and a 4×4 sample size. Inter prediction can be performed in the same manner as the examples of the present embodiment and both modified examples of this embodiment using other sizes.

The present embodiment may be combined with at least some aspects of the other embodiments. Also, some of the processing, some of the elements in the devices, and some of the syntax described in the flowchart of the present embodiment may be combined with aspects of the other embodiments.

As described with reference to FIGS. 4 and 5, with respect to the reference range of surrounding samples to which the gradient filter is applied for obtaining the gradient value, the sample value in the reference block indicated by the motion vector assigned to the prediction block used in the prediction process may be compensated to other values instead of the sample values as discussed with reference to FIGS. 4 and 5.

For example, when the motion vector assigned to the prediction block indicates a decimal sample position, the sample value corresponding to the decimal sample position may be compensated and used.

However, if the filtering process that references surrounding samples is applied in order to obtain the sample value corresponding to the decimal sample position, it will not be necessary to refer to surrounding samples in a range wider than the range described with respect to FIGS. 4 and 5.

In order to solve the above problem, for example, the following methods are provided in the present disclosure.

Figure 17:
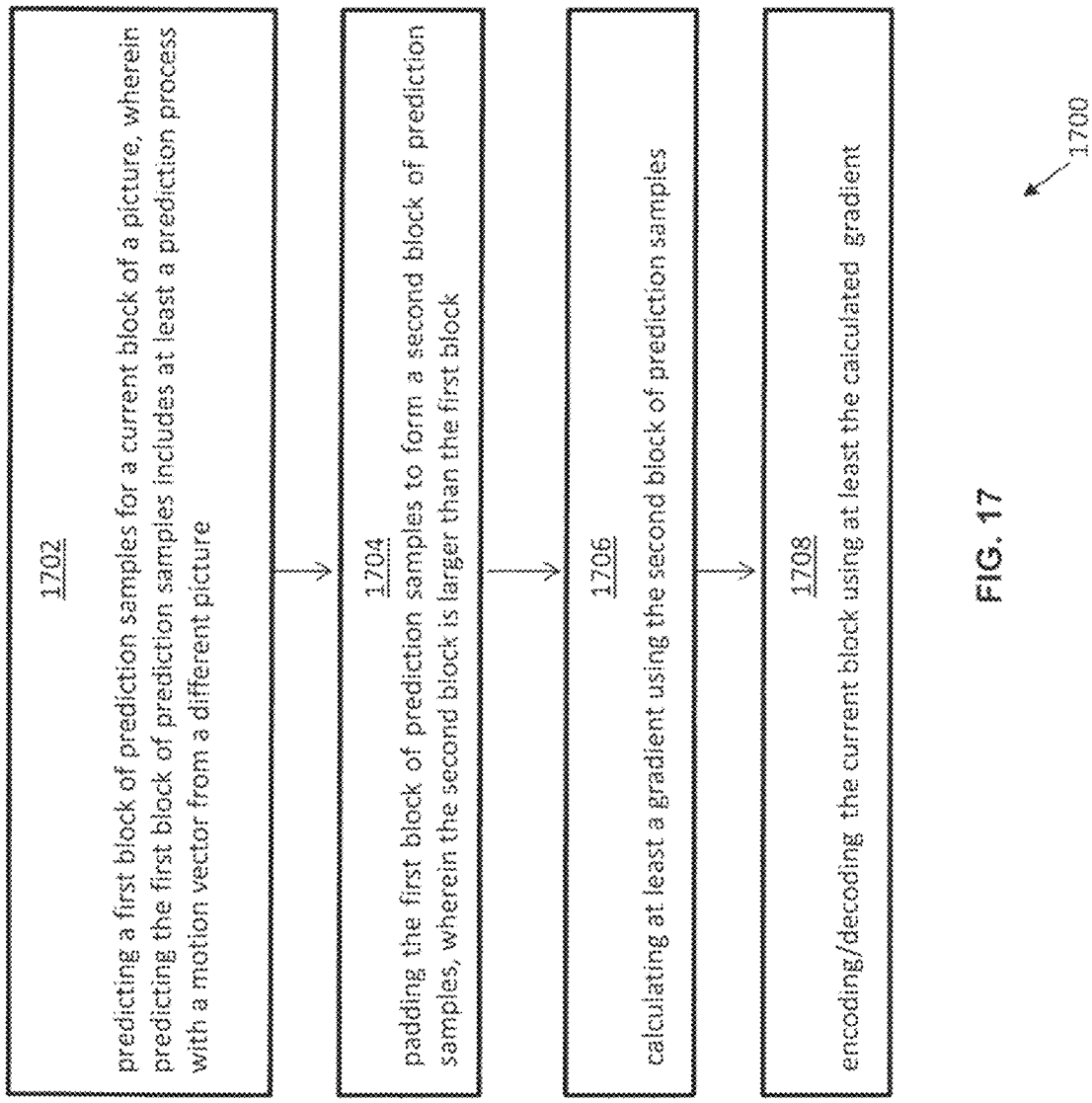
FIG. 17 is a flow chart illustrating one example of an image encoding/decoding method using an inter prediction function to generate a prediction of a current block of a picture based on a reference block in a different picture.

FIG. 17 shows a flow chart illustrating one example 1700 of an image encoding/decoding method using an inter prediction function to generate a prediction of a current block of a picture based on a reference block in a different picture.

In an embodiment of the present application, the encoding method is implemented by the encoder 100 as shown in FIG. 1 and described in the corresponding description. In an embodiment, the encoding method is implemented by the inter-predictor 126 of the encoder 100 in cooperation with other components of the encoder 100.

Similarly, in an embodiment of the present application, the decoding method is implemented by the decoder 200 as shown in FIG. 10 and described in the corresponding description. In an embodiment, the decoding method is implemented by the inter-predictor 218 of the decoder 200 in cooperation with other components of the decoder 200.

As shown in FIG. 17, the encoding method in accordance with the present example includes the following steps:

Step 1702: predicting a first block of prediction samples for a current block of a picture, wherein predicting a first block of prediction samples includes at least a prediction process with a motion vector from a different picture;

Step 1704: padding the first block of prediction samples to form a second block of prediction samples, wherein the second block is larger than the first block;

Step 1706: calculating at least a gradient using the second block of prediction samples; and Step 1708: encoding the current block using at least the calculated gradient.

In an embodiment, the different picture may have a picture order count (POC) different from a POC of the picture in the time domain of a stream. As shown in FIGS. 18A, 18B and 18C, the picture may be referenced as a current picture, and the different picture may be referenced as a first picture or a second picture. For example, in FIG. 18A, if the different picture is the first picture, the POC of the different picture is smaller than the POC of the picture in the left time domain, but is greater than the POC of the picture in the right time domain. In FIG. 18B, if the different picture is the first picture, the POC of the different picture is smaller than the POC of the picture in both the left time domain and the right time domain. In FIG. 18C, if the different picture is the first picture, the POC of the different picture is greater than the POC of the picture in both the left time domain and the right time domain.

In another embodiment, the different picture may be an encoded reference picture which may be temporally and/or spatially neighboring the picture. The encoded reference picture may have a POC either smaller or greater than the POC of the picture, either temporally and/or spatially.

The current block may be randomly selected in the picture. For example, the current block may be a square 4×4 sample block. The size of the current block may be modified in accordance with actual prediction accuracy needs.

Similar to the motion vector shown in FIG. 5C, the motion vector in the present example of the encoding method points from the current block to the different picture, which may be the first picture or the second picture shown in FIGS. 18A to 18C. In an embodiment, the motion vector is received by the inter predictor 126 from the different picture, especially when the different picture is an encoded reference picture that was encoded by the same motion vector.

At step 1702, the inter predictor 126 of the encoder 100 predicts the first block of prediction samples for the current block of the picture by at least a prediction process, as described in the preceding description, using the motion vector from the different picture.

In an embodiment, the first block of prediction samples may be the same as a prediction block used in a prediction process, as described in the preceding description, performed for a prediction mode like a merge mode or an inter prediction mode.

In another embodiment, the first block of prediction samples may be the same as a reference block used in a motion compensation process, as described in the preceding description, performed for a prediction mode like a merge mode or an inter prediction mode.

At step 1704, the inter predictor 126 of the encoder 100 pads the first block of prediction samples to form a second block of prediction samples. The second block of prediction samples is larger than the first block of prediction samples. In this manner, more information may be retained in the second block for subsequent processing and advantageously provide an improved process to the inter prediction method, thereby reducing the memory bandwidth access of the inter prediction method. This is hardware friendly.

For example, step 1704 may be performed by the inter predictor 126 of the encoder 100 padding samples for at least two sides of the first block of prediction samples, wherein the at least two sides of the first block of prediction samples are not orthogonal.

In some embodiments, the inter predictor 126 of the encoder 100 may pad at least two sides of the first block of prediction samples in a parallel padding direction. As shown in FIG. 19A, the inter predictor 126 of the encoder 100 may pad two vertical sides of a 4×4 first block 1902 of prediction samples in a manner as depicted in broken lines in FIG. 19A. Alternatively, as shown in FIG. 19B, the inter predictor 126 of the encoder 100 may pad two horizontal sides of a 4×4 first block 1904 of prediction samples in a manner as depicted in broken lines in FIG. 19B.

In some other embodiments, the inter predictor 126 of the encoder 100 may pad four sides of the first block of prediction samples, as illustrated in FIGS. 20A, 20B, 20C and 20D. Moreover, FIGS. 20A, 20B, 20C and 20D further illustrate four padding processes that may be used for padding the first block of prediction samples. It is understandable to those skilled in the art that these padding processes may be further used for padding any sample blocks.

Figure 20A:
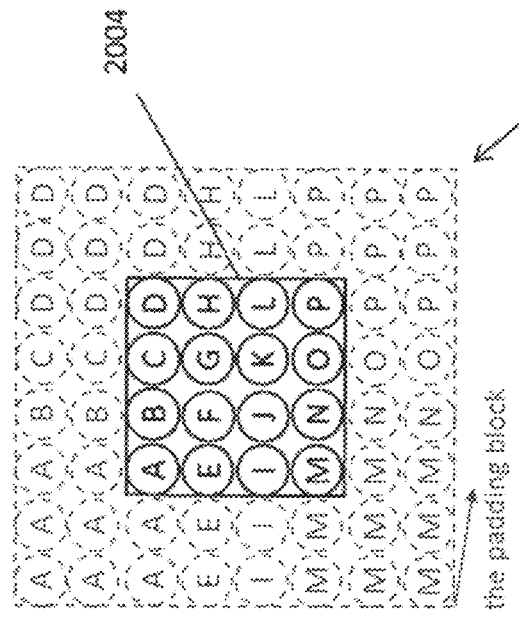
FIG. 20A illustrates an example of a process for padding a block of prediction samples in accordance with the example of the image encoding/decoding method as shown in FIG. 17.

In an example, as shown in FIG. 20A, the padding process may be performed by mirroring a first block 2002 of prediction samples in a manner as depicted in broken lines in FIG. 20A. For example, the inter predictor 126 of the encoder 100 may pad the first block of prediction samples by mirroring the first block 2002 of prediction samples in a symmetrical manner with respect to each edge of the first block 2002. The mirroring may include copying sample values (e.g. "A", "B", etc.) of the first block 2002 of prediction samples to samples surrounding the first block 2002 of prediction samples in a symmetrical manner to form a second block 2000 of prediction samples.

Figure 20B:
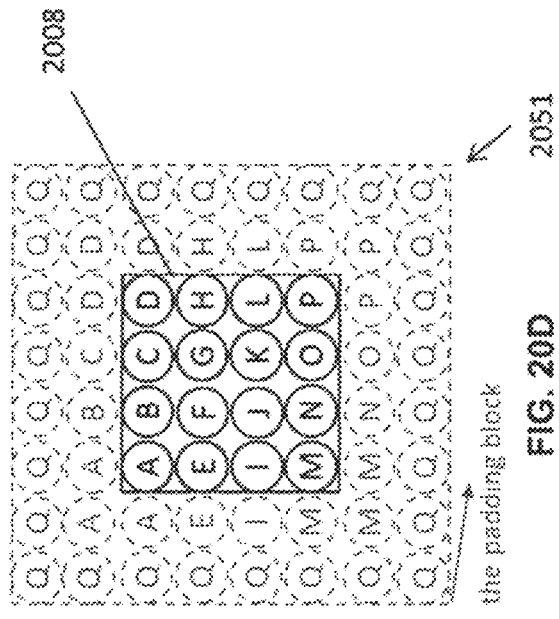
FIG. 20B illustrates another example of a process for padding a block of prediction samples in accordance with the example of the image encoding/decoding method as shown in FIG. 17.

In another example, as shown in FIG. 20B, the padding process may be performed by duplicating a first block 2004 of prediction samples, in a manner as depicted in broken lines in FIG. 20B. For example, the inter predictor 126 of the encoder 100 may pad the first block 2004 of prediction samples by duplicating sample values of samples located at each edge of the first block 2004 of prediction samples (e.g.

"A", "B", etc.) to corresponding samples surrounding the first block of prediction samples and are adjacent the respective samples located at each edge of the first block 2004 to form a second block 2001 of prediction samples.

It is noted that the corresponding samples may be one row of samples adjacent to the first block. The smaller the number of rows of samples that are padded, the higher the accuracy of the second block 2001. Furthermore, the corresponding samples may be a plurality of rows of samples including the one row that is adjacent to the first block. Specifically, the corresponding samples are neighboring the respective samples located at each edge of the first block 2004. The larger the number of rows of samples that are padded, the more the memory bandwidth can be reduced. Furthermore, the number of rows of samples to be padded may be set, for example, based on the size of the first block, and may be predetermined according to standards, etc.

Figure 20C:
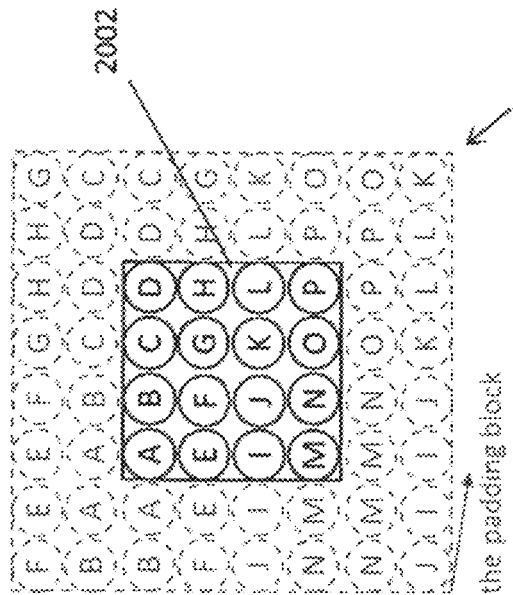
FIG. 20C illustrates another example of a process for padding a block of prediction samples in accordance with the example of the image encoding/decoding method as shown in FIG. 17.

In another example, as shown in FIG. 20C, the padding process may be performed by padding a fixed value (e.g. "Q", as shown in FIG. 20C) to samples surrounding the first block of prediction samples, in a manner as depicted in broken lines in FIG. 20C. For example, the fixed value may be selected from at least one of 0, 128, 512, a positive integer, a mean value of the first block of prediction samples, and a median value of the first block of prediction samples. The mean value and the median value may be related to sample values of the first block of prediction samples. In the example of FIG. 20C, the fixed value is a positive integer Q, the inter predictor 126 of the encoder 100 may pad the first block of prediction samples by padding the fixed value Q to samples surrounding the first block of prediction samples to form a second block 2050 of prediction samples.

In another example, the padding process may be performed by performing a function to the first block of prediction samples. Examples of the function may include a filter, a polynomial function, an exponential function and a clipping function. For the sake of simplicity, this example is not illustrated.

Figure 20D:
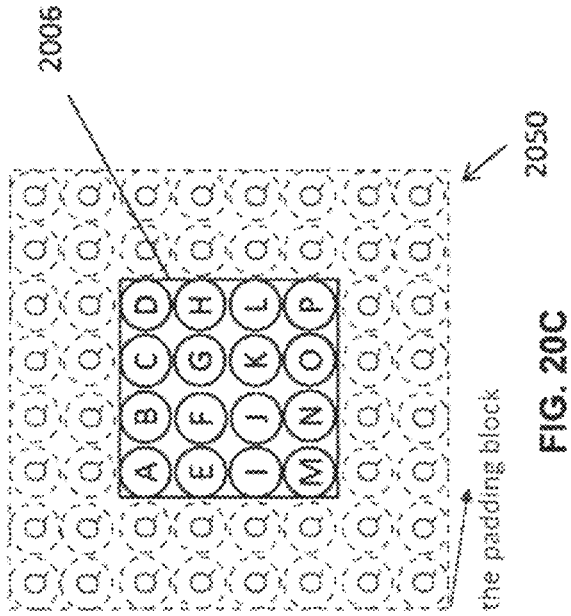
FIG. 20D illustrates yet another example of a process for padding a block of prediction samples in accordance with the example of the image encoding/decoding method as shown in FIG. 17.

In yet other example, as shown in FIG. 20D, the padding process may be performed by performing any combination of mirroring, duplicating, padding a first value and performing a function to the prediction samples as described above. In the example of FIG. 20D, the inter predictor 126 of the encoder 100 may pad the first block 2008 of prediction samples by performing a combination of duplicating the first block 2008 of prediction samples to samples at a first certain distance to the first block 2008, and padding a fixed value Q to samples at a second certain distance to the first block 2008, to form a second block 2050 of prediction samples.

In the examples shown in FIGS. 20A to 20D, the inter predictor 126 of the encoder 100 pads the 4×4 first blocks 2002, 2004, 2006, 2008 of prediction samples to form the 8×8 second blocks 2000, 2001, 2050, 2051 of prediction samples.

Referring back to the examples in FIGS. 19A and 19B, it can be seen that the inter predictor 126 of the encoder 100 pads the 4×4 first block 1902, 1904 of prediction samples by mirroring the first block 1902, 1904 of prediction samples to form a second block 1900, 1901 of prediction samples. In FIG. 19A, the second block 1900 of prediction samples is a 8×4 sample block. In FIG. 19B, the second block 1900 of prediction samples is a 4×8 sample block.

Therefore, it is understandable by those skilled in the art that the size of the second block of prediction samples desired from the padding process can be modified according to the actual prediction accuracy needs. Advantageously, the padding process reduces data to perform inter prediction process at a later stage.

Therefore, the padding step 1704 of the present encoding method can be carefully designed to pad a first block of prediction samples having a M×N size to form a second block of prediction samples having any desired size (M+d1)×(N+d2), based on the actual prediction accuracy needs based on the different padding directions and/or processes/techniques described above with respect to FIGS. 19A, 19B and FIGS. 20A to 20D. It is appreciable to those skilled in the art that M can be the same as or different from N, while d1 and d2 can be either greater than, or equal to 0.

By virtue of the padding, a small size of data can be padded to a bigger size so that more information is included to produce an accurate prediction for the current block. In this manner, the present encoding method is advantageous in that it requires only a small size of data as an input, thereby reducing memory bandwidth access of the inter prediction and providing a more hardware friendly process.

At step 1706, the inter predictor 126 of the encoder 100 calculates at least a gradient using the second block of prediction samples. In an embodiment, at the time of calculating at least the gradient, the inter predictor 126 of the encoder 100 may apply a gradient filter to the second block of prediction samples to generate at least a differential value to serve as the at least one gradient. An example of applying a gradient filter to generate the at least one gradient is described above under the section of Gradient Filter. In this manner, the data in the current block of the current picture is referenced by the data from a reference block of a reference picture being encoded with the respective gradient (i.e. the differential value) between the reference block and the current block. Such a step advantageously facilitates to reduce memory bandwidth access of the inter prediction and providing a more hardware friendly process.

Two examples of gradient filters are respectively shown in FIG. 21A and FIG. 21B. In FIG. 21A, one gradient filter {2, −9, 0, 9, −2} is applied to all the sample values in the second block of prediction samples, regardless of fractional parts of the motion vector. In FIG. 21A, the process of applying the gradient filter {2, −9, 0, 9, −2} is similar to that described above under the section of Gradient Filter. In the example of FIG. 21A, the equation (4) and (5) are used for all motion vectors.

In FIG. 21B, there are nine gradient filters: {8, −39, −3, 46, −17, 5}, {8, −32, −13, 50, −18, 5}, {7, −27, −20, 54, −19, 5}, {6, −21, −29, 57, −18, 5}, {4, −17, −36, 60, −15, 4}, {3, −9, −44, 61, −15, 4}, {1, −4, −48, 61, −13, 3}, {0, 1, −54, 60, −9, 2}, {−1, 4, −57, 57, −4, 1} provided to be applied to sample values in the second block of prediction samples according to fractional parts of the motion vector. In the example of FIG. 21B, the fractional parts of motion vector are the sub sample parts of motion vector, e.g. ¼ sample. Therefore, different gradient filter is selected based on the sub sample part of motion vector. For example, the motion vector in horizontal direction is 1+(¼) sample, the fractional part of the motion vector is ¼. Then, a gradient filter {4, −17, −36, 60, −15, 4} is selected to calculate horizontal gradient. The w[i] in equation (4) is replaced with {4, −17, −36, 60, −15, 4}. In another example, if the motion vector in vertical direction is 4+(7/16), the fractional part of the motion vector is 7/16. In this example, the gradient filter {0, 1, −54, 60, −9, 2} is selected to calculate vertical gradient. The w[i] in equation (5) is replaced with {0, 1, −54, 60, −9, 2}.

FIG. 21C and FIG. 21D depict two other examples of gradient filters. In FIG. 21C, one gradient filter {−1, 0, 1} is applied to all sample values in the second block of prediction samples, regardless of fractional parts of the motion vector.

In FIG. 21D, one gradient filter {−1, 1} is applied to all sample values in the second block of prediction samples, regardless of fractional parts of the motion vector. In FIG. 21C and FIG. 21D, the process of applying the respective gradient filter {−1, 0, 1} or {−1, 1} is similar to that described above under the section of Gradient Filter.

At step 1708, the inter predictor 126 of the encoder 100 encodes the current block of the picture using at least the calculated gradient.

As shown in the example 1700 of FIG. 17, the steps in the decoding method are similar to those in the encoding method, except for the last step 1708 where the encoder 100 encodes the current block using at least a gradient while the decoder 200 decodes the current block using the at least gradient.

The above examples and embodiments use a prediction block (interchangeably referred as a block of prediction samples) as an input to predict the current block. The following further describes other embodiments in accordance with the present encoding method, in which two prediction blocks are used as inputs to predict the current block.

When two prediction blocks (i.e. two blocks of prediction samples) are used as inputs to predict the current block, the step 1702 as described above includes further predicting another block of prediction samples for the current block with another motion vector from another different picture. The process of predicting the other block of prediction samples is the same as the process of predicting the first block of prediction samples. In addition, the step 1704 of padding as described above includes further padding the other block of prediction samples to form yet another block of prediction samples.

Figure 22:
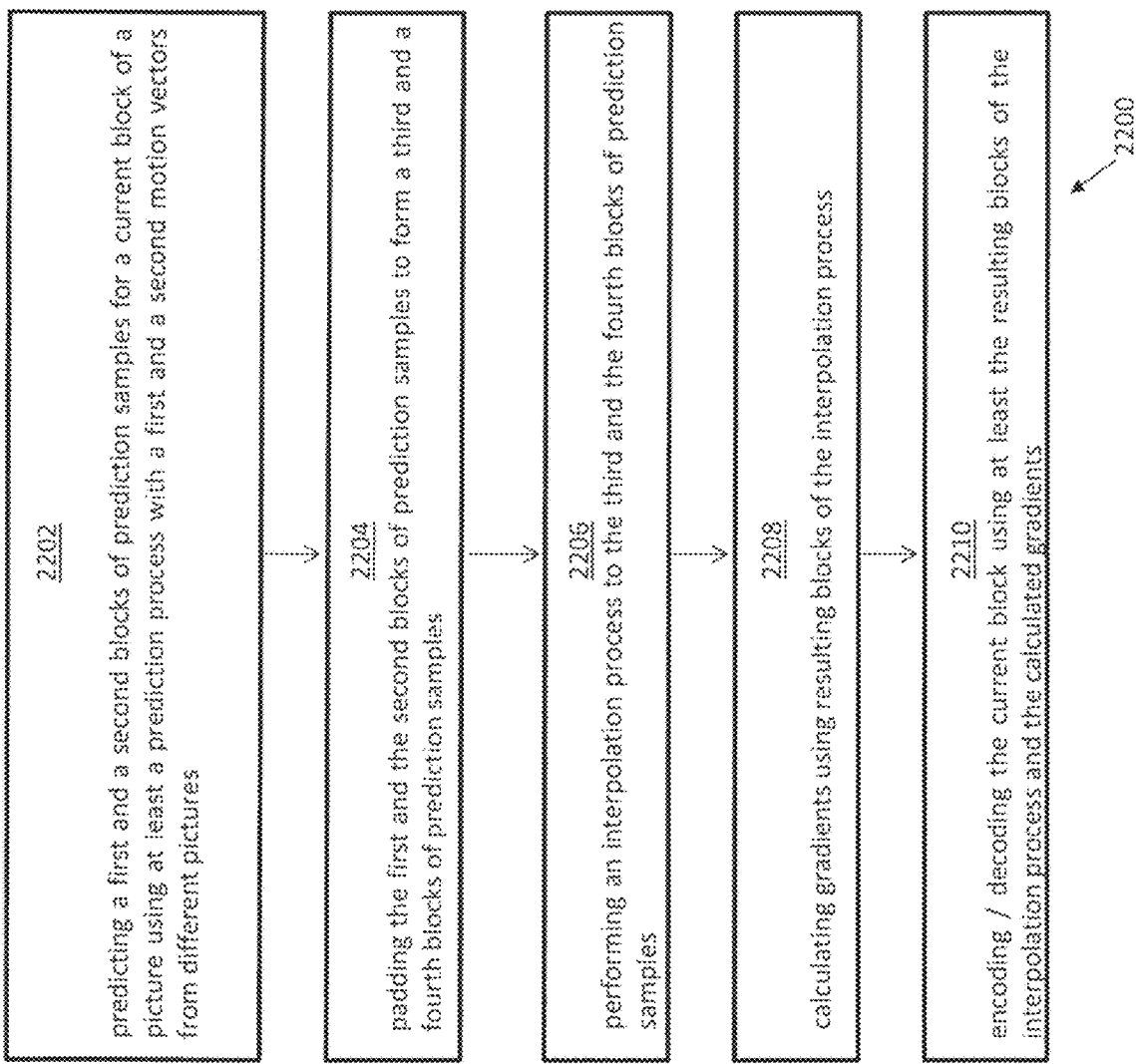
FIG. 22 is a flow chart illustrating an embodiment of an image encoding/decoding method in accordance with the example as shown in FIG. 17.

An embodiment 2200 of the image encoding/decoding method utilizing two reference pictures to predict the current block is shown in FIG. 22. In this embodiment, further to the usage of an additional prediction block as input, an interpolation process is also deployed for sub-sample precision. The embodiment includes steps comprising:

Step 2202: predicting a first block and a second block of prediction samples for a current block of a picture using at least a prediction process with a first and a second motion vectors from different pictures.

Step 2204: padding the first and the second blocks of prediction samples to form a third and a fourth blocks of prediction samples.

Step 2206: performing an interpolation process to the third and the fourth blocks of prediction samples.

Step 2208: calculating gradients using the results of the interpolation process.

Step 2210: encoding/decoding the current block using at least the results of the interpolation process and the calculated gradients.

Figure 23:
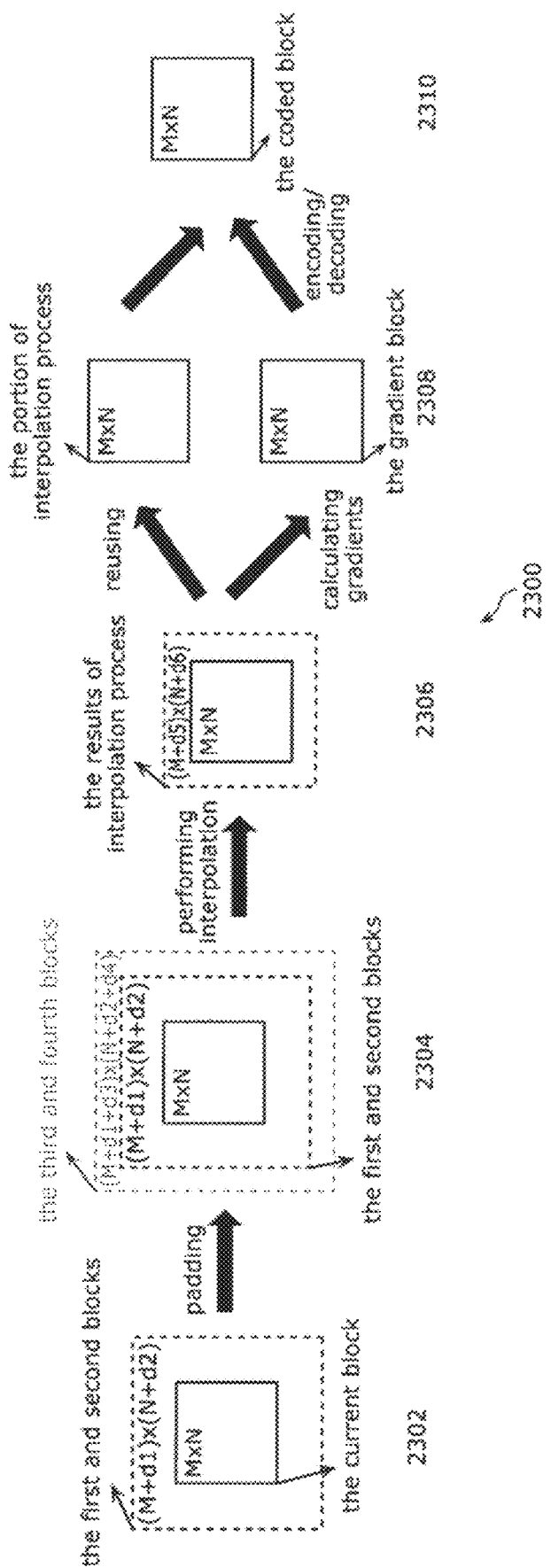
FIG. 23 is a conceptual diagram illustrating the embodiment of the image encoding/decoding method as shown in FIG. 22.

The steps 2202 to 2210 are depicted in the conceptual diagram 2300 in FIG. 23. The embodiment 2200 of the encoding method as shown in FIGS. 22 and 23 can be performed by the image encoder 100. It is noted that the decoding method performed by the image decoder 200 is the same as the encoding method performed by the image encoder 100 as shown in FIGS. 22 and 23.

As step 2202, a first block of prediction samples for a current block of a picture is predicted using at least a prediction process, wherein the prediction process predicts samples with a first motion vector from a different picture. In an embodiment, the first motion vector may point to a first picture, wherein the first picture is different from the current picture.

Similarly, a second block of prediction samples for a current block of a picture is predicted using at least a prediction process, wherein the prediction process predicts samples with a second motion vector from another different picture. The second motion vector may point to a second picture, wherein the second picture is different from the current picture.

In one example, the first picture may be different from the second picture. In other examples, the first picture may be the same as the second picture.

In one example, as shown in FIG. 18A, at least one of the picture order counts (POCs) of the first and the second picture is smaller than the POC of the current picture, and at least one of the POCs of the first and the second picture is larger than the POC of the current picture.

In another example, as shown in FIG. 18B, the POCs of the first and the second picture may be smaller than the POC of the current picture.

In yet another example, as shown in FIG. 18C, the POC of the first and the second picture may be larger than the POC of the current picture.

The POCs of the first, second and current pictures shown in FIGS. 18A to 18C are in the time domain and depict encoding orders of these pictures in a data stream. The encoding orders may be the same or different from playing orders of these pictures in a data stream (e.g. a video clip). It is understandable to those skilled in the art that the POCs may also refer to the orders of these pictures in a spatial domain.

In one example, the first and the second blocks of prediction samples that are predicted in step 2202 may be the same as reference blocks used in a motion compensation process performed for a prediction mode like a merge mode, an inter prediction mode, etc.

In one example, the first and the second blocks of prediction samples may be equal to or larger than the current block.

As shown in FIG. 23, an embodiment of the prediction step 2202 of FIG. 22 is depicted in step 2302. In this embodiment, the current block has a size of M×N, wherein M may be the same as or different from N. The inter predictor 126 of the encoder 100 may predict the first and the second blocks of prediction samples each having a size of (M+d1)×(N+d2), wherein d1 and d2 may be equal to or larger than zero. An example of the first block of prediction samples is depicted in dashed lines. The second block of prediction samples has the same size as the first block. It is appreciable that the second block of prediction samples may have a size that is different from that of the first block of prediction samples.

It may seem more advantageous to predict the first and the second blocks of prediction samples of a size larger than the current block, as more information can be included in the prediction samples, which contributes to a more accurate prediction result.

At step 2204, the first block of prediction samples are padded to form a third block of prediction samples, and similarly, the second block of prediction samples are padded to form a fourth block of prediction samples.

In an example, the third block of prediction samples is larger than the first block of prediction samples, and the fourth block of prediction samples is larger than the second block of prediction samples. As shown in the padding step 2304 of FIG. 23, the third and the fourth blocks may each have a size of (M+d1+d3)×(N+d2+d4), wherein d3 and d4 are larger than zero. An example of the third block of prediction samples is depicted in dashed lines. The fourth block of prediction samples has the same size as the third block. As described above, it is appreciable that the fourth block of prediction samples may have a size that is different from that of the third block of prediction samples.

In one example, the padding may include mirroring the first and the second blocks of prediction samples, as shown in FIG. 20A. In another example, the padding may include duplicating the first and the second blocks of prediction samples, as shown in FIG. 20B. In another example, the padding may include padding a fixed value, as shown in FIG. 20C, wherein the fixed value may be at least one of 0, 128, 512, a positive integer, a mean value of the prediction samples, and a median value of the prediction samples. In some examples, the padding may include performing a function to the prediction samples. Examples of the function may be a filter, a polynomial function, an exponential function and a clipping function. In some examples, the padding may include any combination of mirroring, duplicating, padding a fixed value and performing a function to the prediction samples, as shown in FIG. 20D.

At step 2206, an interpolation process is performed to the third and the fourth blocks of prediction samples. The interpolation process may include applying interpolation filters according to the first and the second motion vectors to the third and the fourth blocks of prediction samples, respectively.

In one example, the interpolation filters may be the same as the filters used in a motion compensation process performed for a prediction mode such as a merge mode, an inter prediction mode, etc. In other examples, the interpolation filters may be different from the filters used in a motion compensation process performed for a prediction mode as described above.

As shown in step 2306 of FIG. 23, the interpolation process performed to the third and the fourth blocks of prediction samples produces resulting blocks of interpolation process. The resulting blocks of interpolation process may each have a size of (M+d5)×(N+d6), wherein d5 and d6 are larger than zero. An example of the resulting block of interpolation process performed to the third block of prediction samples is depicted in dashed lines. The resulting block of interpolation process performed to the fourth block of prediction samples is similar. A portion of each of the resulting blocks of interpolation process may be used to code the current block, wherein the portion has a size of M×N. The portion may be the same as a resulting block of a motion compensation process performed for a prediction mode such as a merge mode, an inter prediction mode, etc.

At step 2208, gradients are calculated using the resulting blocks of interpolation process. The gradient calculation may include applying gradient filters to sample values in the resulting blocks of interpolation process to generate differential values. As shown in step 2308 of FIG. 23, the calculated gradients may form a block of size M×N.

In one example, there may be only one gradient filter to be applied to all the sample values in the resulting blocks of interpolation process regardless of the fractional parts of the first and the second motion vectors, as shown in FIG. 21A.

In another example, there may be nine gradient filters applied to sample values in the resulting blocks of interpolation process according to the fractional parts of the first and the second motion vectors, as shown in FIG. 21B.

At step 2210, the current block is encoded using at least the resulting block of interpolation process and the calculated gradients. An example of the encoded block is shown in step 2310 of FIG. 23.

It is noted that the term "encoding" and "coding" used in the description of step 2210 for the encoding method performed by the image encoder 100 may be replaced with the term "decoding" at step 2210 for an decoding method performed by the image decoder 200.

In the present embodiment, by virtue of introducing a padding process to the inter prediction, the present encoding and decoding method advantageously reduces the memory bandwidth access of the inter prediction process. Besides, by using the padding process, the present embodiment can perform only one interpolation process to produce satisfying prediction results. In this manner, the present application advantageously removes additional interpolation processes from the inter prediction process, which is hardware friendly.

It is noted that in the interpolation process performed to each of the third block and the fourth block, interpolation filters having mutually different numbers of taps may be used. For example, in order to obtain a resulting block of interpolation process having the size of (M+d5)×(N+d6) in the above example, only an eight-tap interpolation filter is used. However, the number of taps of an interpolation filter used to obtain a first region having a M×N size in the resulting block, and the number of taps of an interpolation filter used to obtain a second region which is a region in the resulting block other than the first region and is used to generate a gradient block, may be different. For example, the number of taps of the interpolation filter used to obtain the second region may be fewer than the number of taps of the interpolation filter used to obtain the first region. Specifically, if the number of taps of the interpolation filter used to obtain the first region is eight, the number of taps of the interpolation filter used to obtain the second region may be less than eight. Accordingly, processing load can be reduced while preventing deterioration of image quality.

Figure 24:
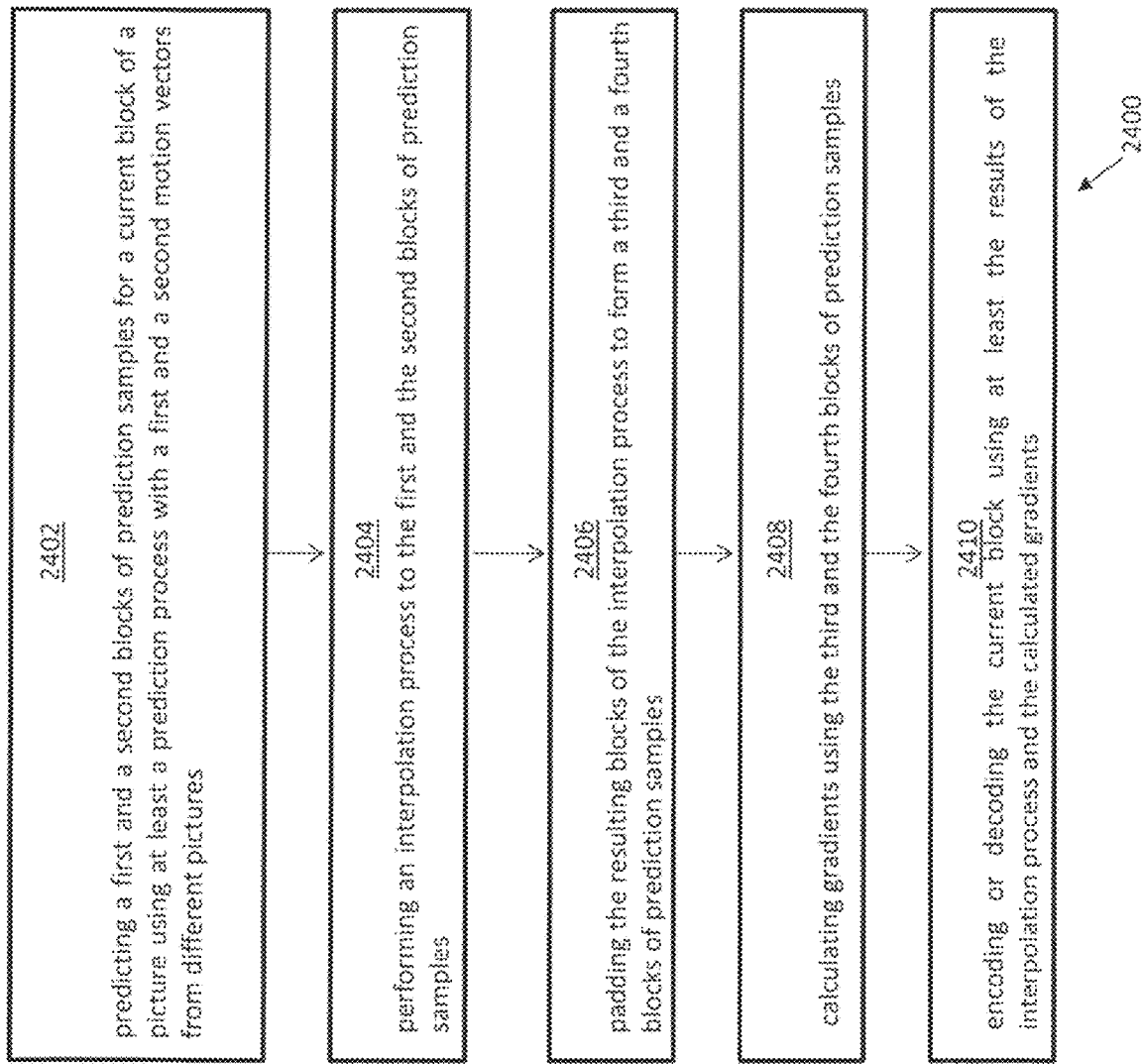
FIG. 24 is a flow chart illustrating another embodiment of an image encoding/decoding method in accordance with the example as shown in FIG. 17.

Another embodiment of the image encoding/decoding method utilizing two reference pictures to predict the current block is shown in FIG. 24. In this embodiment, the interpolation process in this embodiment is performed before the padding process. The embodiment includes steps comprising:

Step 2402: predicting a first block and a second block of prediction samples for a current block of a picture using at least a prediction process with a first and a second motion vectors from different pictures.

Step 2404: performing an interpolation process to the first and the second blocks of prediction samples.

Step 2406: padding the results of the interpolation process to form a third and a fourth blocks of prediction samples.

Step 2408: calculating gradients using the third and the fourth blocks of prediction samples.

Step 2410: encoding/decoding the current block using at least the results of the interpolation process and the calculated gradients.

Figure 25:
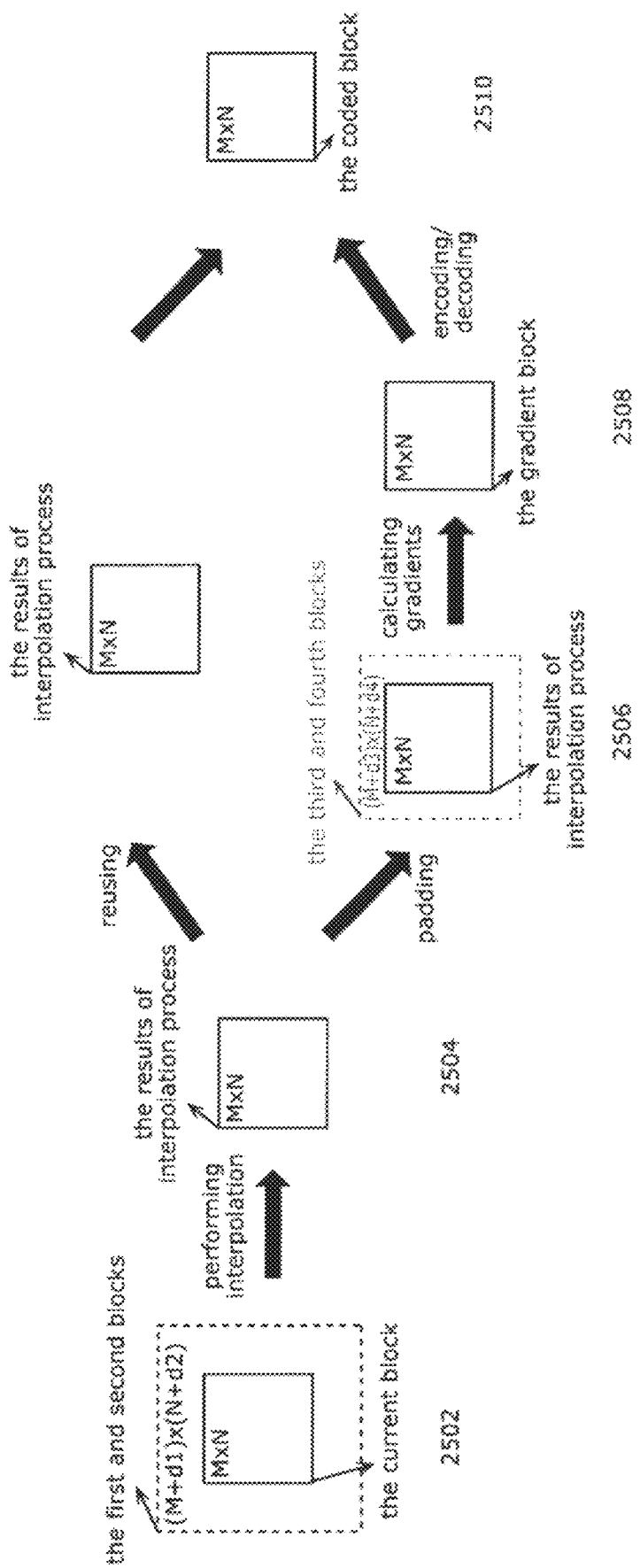
FIG. 25 is a conceptual diagram illustrating the embodiment of the image encoding/decoding method as shown in FIG. 24.

The steps 2402 to 2410 are depicted in the conceptual diagram in FIG. 25. The embodiment 2400 of the encoding method as shown in FIGS. 24 and 25 can be performed by the image encoder 100. It is noted that the decoding method performed by the image decoder 200 is the same as the encoding method performed by the image encoder 100 as shown in FIGS. 24 and 25.

At step 2402, a first block of prediction samples for a current block of a picture is predicted using at least a prediction process, wherein the prediction process predicts samples for the current block with a first motion vector from a different picture. In an embodiment, the first motion vector may point to a first picture, wherein the first picture is different from the current picture.

Similarly, a second block of prediction samples for a current block of a picture is predicted using at least a prediction process, wherein the prediction process predicts samples with a second motion vector from another different picture. The second motion vector may point to a second picture, wherein the second picture is different from the current picture.

In one example, the first picture may be different from the second picture. In other examples, the first picture may be the same as the second picture.

In one example, as shown in FIG. 18A, at least one of the picture order counts (POCs) of the first and the second picture is smaller than the POC of the current picture, and at least one of the POCs of the first and the second picture is larger than the POC of the current picture.

In another example, as shown in FIG. 18B, the POCs of the first and the second picture may be smaller than the POC of the current picture.

In yet another example, as shown in FIG. 18C, the POC of the first and the second picture may be larger than the POC of the current picture.

The POCs of the first, second and current pictures shown in FIGS. 18A to 18C are in the time domain and depict encoding orders of these pictures in a data stream. The encoding orders may be the same or different from playing orders of these pictures in a data stream (e.g. a video clip). It is understandable to those skilled in the art that the POCs may also refer to the orders of these pictures in a spatial domain.

In one example, the first and the second blocks of prediction samples that are predicted in step 2402 may be the same as reference blocks used in a motion compensation process performed for a prediction mode like a merge mode, an inter prediction mode, etc.

In one example, the first and the second blocks of prediction samples may be equal to or larger than the current block.

As shown in FIG. 25, an embodiment of the prediction step 2402 of FIG. 24 is depicted in step 2502. In this embodiment, the current block has a size of M×N, wherein M may be the same as or different from N. The inter predictor 126 of the encoder 100 may predict the first and the second blocks of prediction samples each having a size of (M+d1)×(N+d2), wherein d1 and d2 may be equal to or larger than zero. An example of the first block of prediction samples is depicted in dashed lines. The second block of prediction samples has the same size as the first block. As described above, it is appreciable that the second block of prediction samples may have a size that is different from that of the first block of prediction samples.

It may seem more advantageous to predict the first and the second blocks of prediction samples of a size larger than the current block, as more information can be included in the prediction samples, which contributes to a more accurate prediction result.

At step 2404, an interpolation process is performed to the first and the second blocks of prediction samples. The interpolation process may include applying interpolation filters according to the first and the second motion vectors to the first and the second blocks of prediction samples, respectively.

In one example, the interpolation filters may be the same as the filters used in a motion compensation process performed for a prediction mode, such as a merge mode, an inter prediction mode, etc. In other examples, the interpolation filters may be different from the filters used in a motion compensation process performed for a prediction mode as described above.

As shown in step 2504 of FIG. 25, the interpolation process performed to the first and the second blocks of prediction samples produces resulting blocks of interpolation process. The resulting blocks of interpolation process may each have a size of M×N. The resulting blocks of interpolation process may be used to code the current block, and may be the same as a resulting block of a motion compensation process performed for a prediction mode such as a merge mode, an inter prediction mode, etc.

At step 2406, the resulting block of interpolation process performed to the first block is padded to form a third block of prediction samples, wherein the third block of prediction samples is larger than the current block. Similarly, the resulting block of interpolation process performed to the second block is padded to form a fourth block of prediction samples, wherein the fourth block of prediction samples is larger than the current block.

As shown in step 2506 of FIG. 25, an example of the third block of prediction samples may have a size of (M+d3)×(N+d4), wherein d3 and d4 are larger than zero. The fourth block of prediction samples has the same size. As described above, it is appreciable that the fourth block of prediction samples may have a size that is different from that of the third block of prediction samples.

Figure 26:
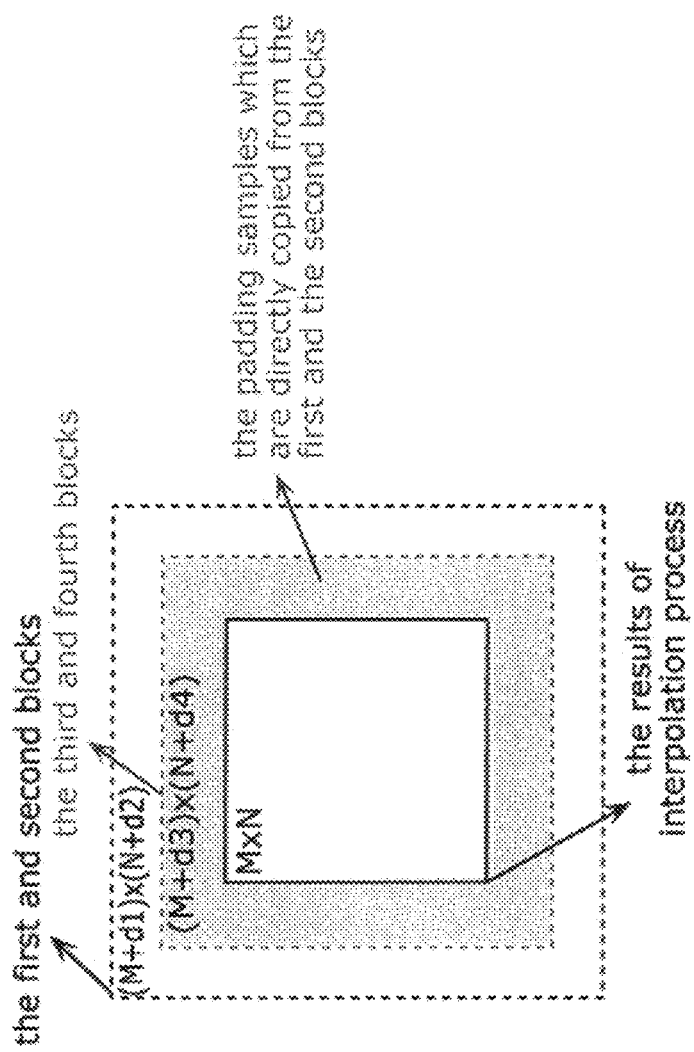
FIG. 26 illustrates an example of a block produced by a padding process in the embodiment of the image encoding/decoding method as shown in FIGS. 24 and 25.

In one example, the padding may include mirroring the resulting blocks of interpolation process, as shown in FIG. 20A. In another example, the padding may include duplicating the resulting blocks of interpolation process, as shown in FIG. 20B. In another example, the padding may include padding a fixed value, as shown in FIG. 20C, wherein the fixed value may be at least one of 0, 128, 512, a positive integer, a mean value of the prediction samples, and a median value of the prediction samples. In some examples, the padding may include performing a function to the resulting blocks of interpolation process. Examples of the function may be a filter, a polynomial function, an exponential function and a clipping function. In other examples, the padding may include using the prediction samples of the first and the second blocks, as shown in FIG. 26.

In other examples, the padding may include applying a second interpolation filter to the first and the second blocks, wherein the second interpolation filter is different from the interpolation filter performed in step 2404 and the number of taps of second interpolation filter is fewer than that of the interpolation performed in step 2404. In other examples, the padding may include any combination of mirroring, duplicating, padding a fixed value, performing a function to the resulting blocks of interpolation process, padding samples using the first and the second blocks and applying the second interpolation filter to the first and the second blocks, as shown in FIG. 20D.

At step 2408, gradients are calculated using the third and the fourth blocks of prediction samples. The gradient calculation may include applying gradient filters to sample values of the third and the fourth blocks of prediction samples to generate differential values. The gradient filters are as described above with respect to FIGS. 21A, 21B. As shown in step 2508 of FIG. 25, the calculated gradients may form a block of size M×N.

At step 2410, the current block is encoded using at least the resulting blocks of interpolation process and the calculated gradients. An example of the encoded block is shown in step 2510 of FIG. 25.

It is noted that the term "encoding" and "coding" used in the description of step 2410 for the encoding method performed by the image encoder 100 may be replaced with the term "decoding" at step 2410 for an decoding method performed by the image decoder 200.

In the present embodiment, by virtue of introducing a padding process to the inter prediction, the present encoding and decoding method advantageously reduces the memory bandwidth access of the inter prediction process. Besides, by using the padding process, the present embodiment can perform only one interpolation process to produce satisfying prediction results. In this manner, the present application advantageously removes additional interpolation processes from the inter prediction process, which is hardware friendly. This may keep the same number of operations of interpolation filter as that used in a motion compensation process performed for a prediction mode such as a merge mode, an inter prediction mode, etc.

Figure 27A:
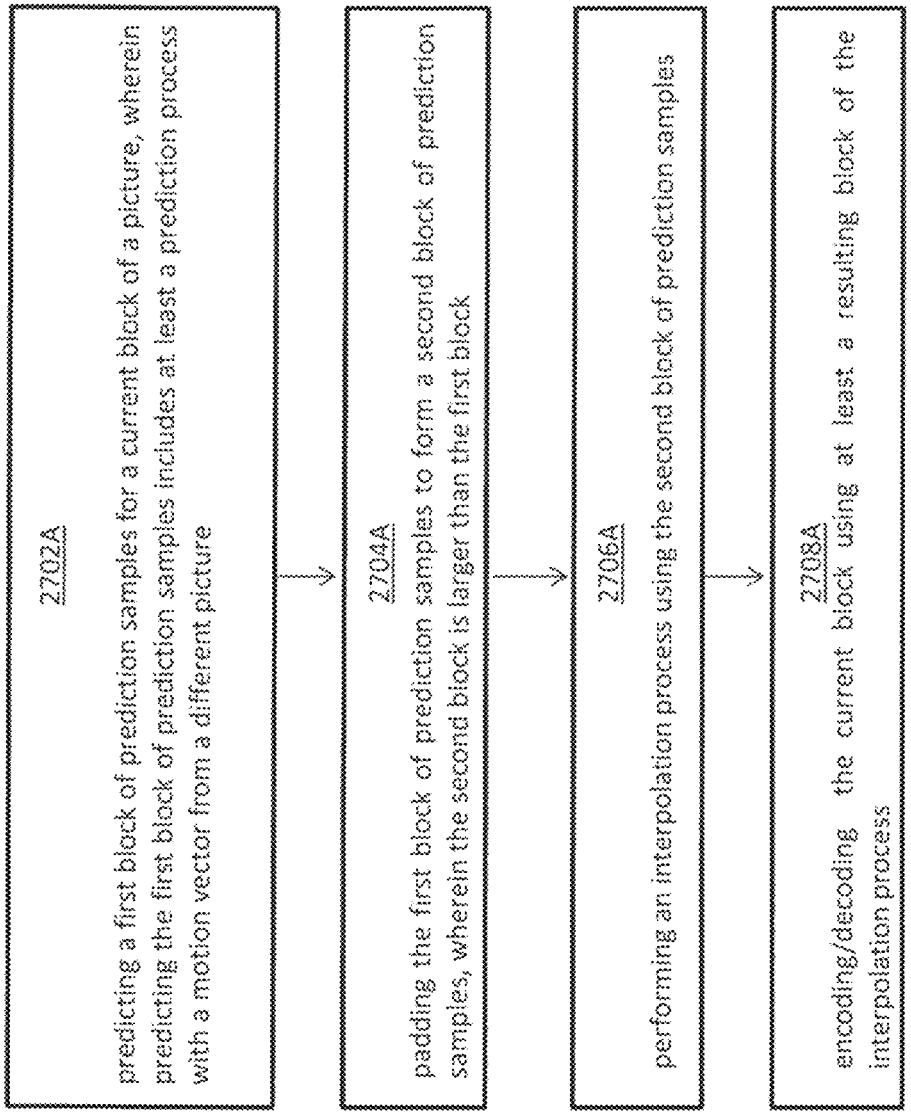
FIG. 27A is a flow chart illustrating another alternative example of an image encoding/decoding method using an inter prediction function to generate a prediction of a current block of a picture based on a reference block in a different picture.

FIG. 27A is a flow chart illustrating an alternative example of an image encoding/decoding method using an inter prediction function to generate a prediction of a current block of a picture.

Figure 28:
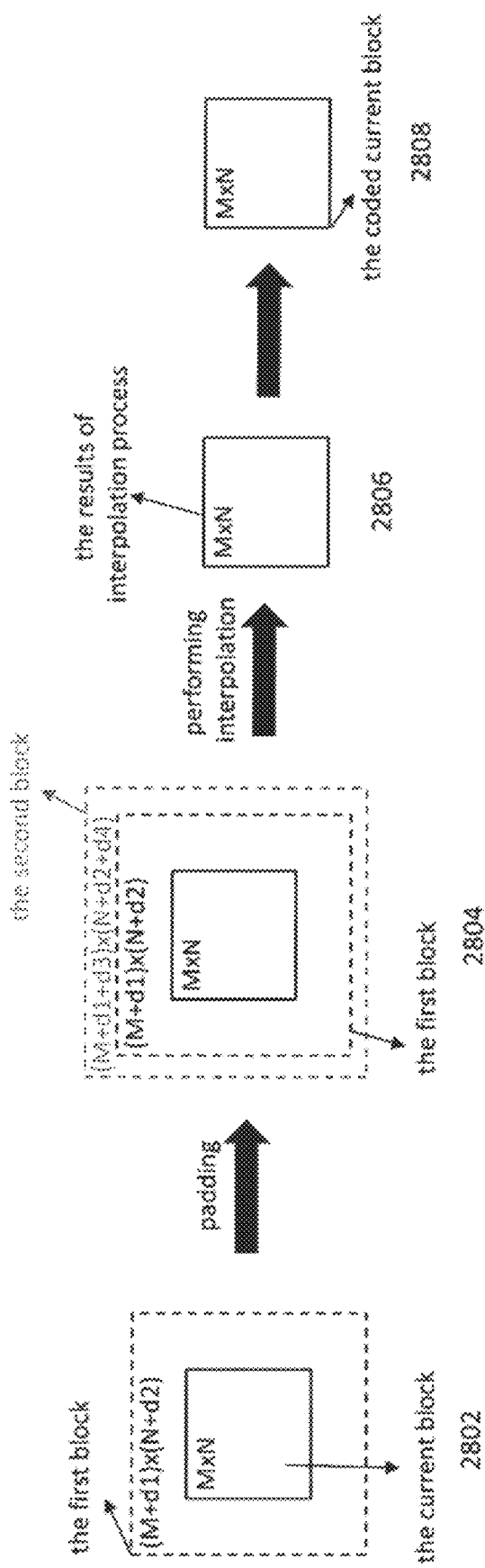
FIG. 28 is a conceptual diagram illustrating the embodiment of the image encoding/decoding method as shown in FIG. 27A.

Steps 2702A to 2708A of FIG. 27A are depicted in the conceptual diagram in FIG. 28. The embodiment 2700A of the encoding method as shown in FIG. 27A and FIG. 28 can be performed by the image encoder 100. It is noted that the decoding method performed by the image decoder 200 is the same as the encoding method performed by the image encoder 100 as shown in FIG. 27A and FIG. 28.

As shown in the example 2700A, steps 2702A and 2704A are the same as steps 1702 and 1704 as described with respect to FIG. 17. An embodiment of the first block of prediction samples predicted in step 2702A of FIG. 27A is depicted in step 2802 of FIG. 28. In the embodiment depicted in step 2802, a first block of prediction samples of a (M+d1)×(N+d2) size is predicted for a current block of a M×N size. It is appreciable to those skilled in the art that M can be the same as or different from N, while d1 and d2 can be either greater than, equal to, or less than 0.

An embodiment of a second block of prediction formed by padding the first block of prediction samples as per step 2704A of FIG. 27A is depicted in step 2804 of FIG. 28. As depicted in step 2804 of FIG. 28, the padding step 2704A of FIG. 27A can be carefully designed to pad the first block of prediction samples of a (M+d1)×(N+d2) size to form a second block of prediction samples having any desired size (M+d1+d3)×(N+d2+d4), based on the actual prediction accuracy needs based on the different padding directions and/or processes/techniques described above with respect to FIGS. 19A, 19B and FIGS. 20A to 20D. It is appreciable to those skilled in the art that d3 and d4 are greater than 0.

At step 2706A, an interpolation process is performed to the second block of prediction samples. The interpolation process may include applying interpolation filters according to the first motion vector to the second block of prediction samples. In one example, the interpolation filters may be the same as the filters used in a motion compensation process performed for a prediction mode, such as a merge mode, an inter prediction mode, etc. In other examples, the interpolation filters may be different from the filters used in a motion compensation process performed for a prediction mode as described above. An embodiment of the results of the interpolation process performed in step 2706A of FIG. 27A is depicted in step 2806 of FIG. 28.

At step 2708A, the current block is encoded using at least a resulting block of interpolation process that is performed to the second block of prediction samples. An embodiment of the current block encoded using the resulting block of interpolation process as depicted in step 2708A of FIG. 27A is depicted in step 2808 of FIG. 28.

It is noted that the term "encoding" and "coding" used in the description of step 2708A for the encoding method performed by the image encoder 100 may be replaced with the term "decoding" at step 2708A for an decoding method performed by the image decoder 200.

Figure 27B:
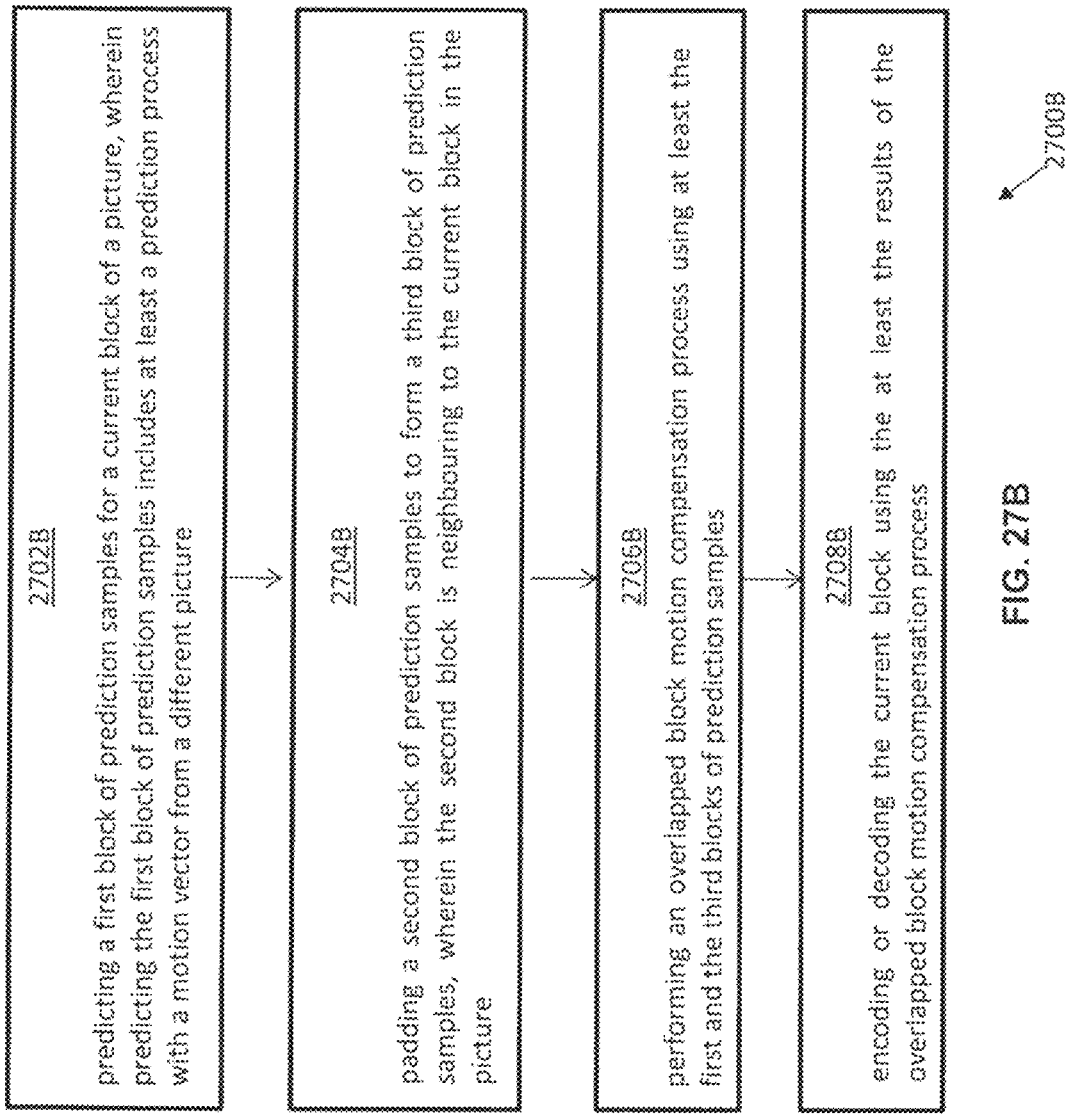
FIG. 27B is a flow chart illustrating another alternative example of an image encoding/decoding method using an inter prediction function to generate a prediction of a current block of a picture based on a reference block in a different picture.

FIG. 27B is a flow chart illustrating another alternative example of an image encoding/decoding method using an inter prediction function to generate a prediction of a current block of a picture based on a reference block in a different picture and a neighboring block of the current block.

Figure 29:
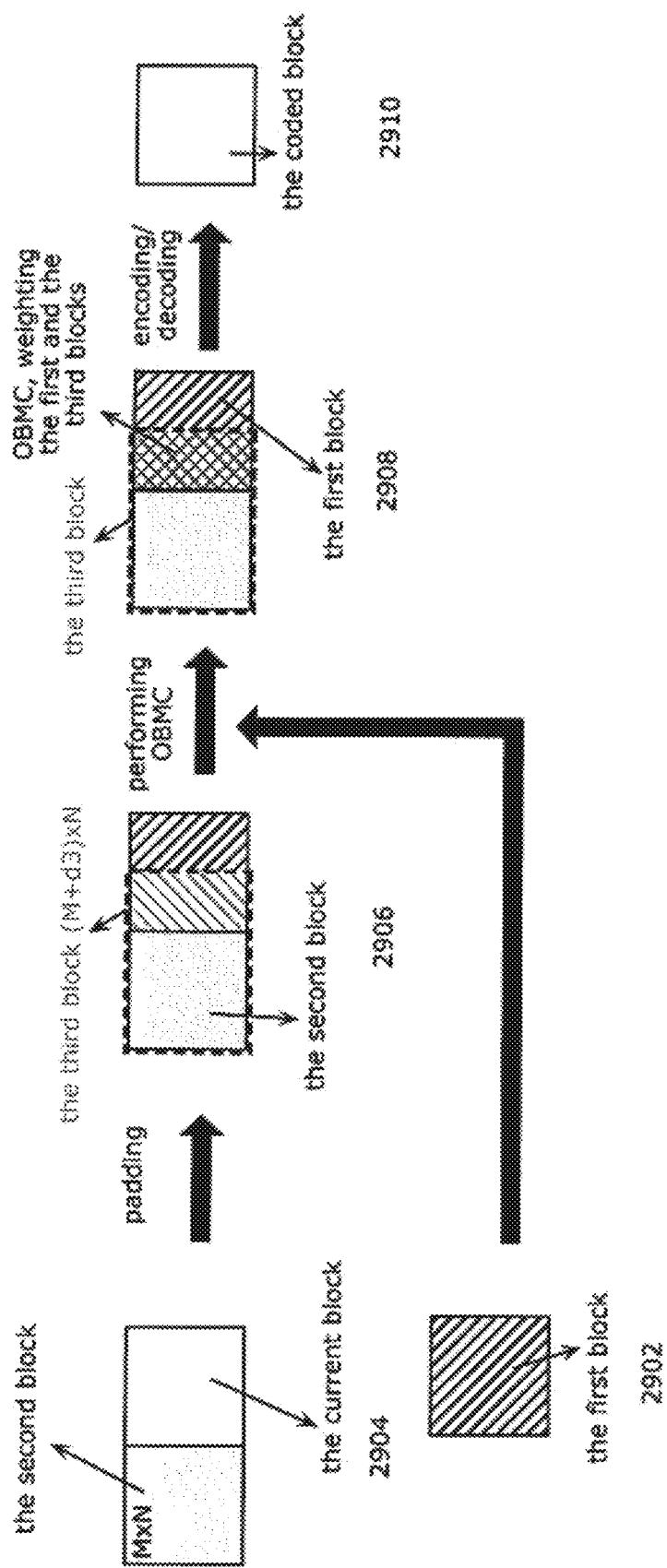
FIG. 29 is a conceptual diagram illustrating the embodiment of the image encoding/decoding method as shown in FIG. 27B.

The steps 2702B to 2708B of FIG. 27B are depicted in the conceptual diagram in FIG. 29. The embodiment 2700B of the encoding method as shown in FIG. 27B and FIG. 29 can be performed by the image encoder 100. It is noted that the decoding method performed by the image decoder 200 is the same as the encoding method performed by the image encoder 100 as shown in FIG. 27B and FIG. 29.

At step 2701B, a first block of prediction samples for a current block of a picture are predicted, wherein the prediction include at least a prediction process with a first motion vector from a different picture. As shown in FIG. 29, an embodiment of the first block of prediction samples predicted in step 2702B of FIG. 27B is depicted in step 2902.

At step 2704B, a second block of prediction samples are padded to form a third block of prediction samples. The second block may be neighboring to the current block. An embodiment of the second block is depicted in step 2904 of FIG. 29. In this embodiment, the second block has a size of M×N, wherein M may be the same as or different from N.

As shown in step 2906 of FIG. 29, the inter predictor 126 of the encoder 100 may be configured to perform the step 2704B, to pad the second block of prediction samples to form a third block of prediction samples. The third block of prediction samples may have a size of (M+d3)×N, wherein d3 may be equal to or larger than zero. An example of the third block of prediction samples is depicted in dashed lines.

In the example depicted in FIG. 29, the second block of prediction samples has the same size as the first block. It is appreciable that the second block of prediction samples may have a size that is different from that of the first block of prediction samples.

In addition, in the example of FIG. 29, the second block is a left block neighboring to the first block. It is appreciable that the second block may be at least one of top block, left block, right block, bottom block, top-left block, top-right block, bottom-left block and bottom-right block neighboring to the first block An illustration of possible positions of the second block are shown in FIG. 31, in which the second block is neighboring to a current block.

In one example, the padding in step 2704B may include mirroring the samples of the second block, as shown in FIG. 32A. In other examples, the padding in step 2704B may include duplicating the samples of the second block, as shown in FIG. 32B. In other examples, the padding in step 2704B may include padding a fixed value, as shown in FIG. 32C, wherein the fixed value may be at least one of 0, 128, 512, a positive integer, a mean value of the second block, and a median value of the second block. In other examples, the padding in step 2704B may include performing a function to the samples of the second block. Examples of the function may be a filter, a polynomial function, an exponential function and a clipping function. In other examples, the padding in step 2704B may include any combination of mirroring, duplicating, padding a first value and performing a function to the samples of the second block.

In the example of FIG. 29, the padding in step 2704B may include padding samples for only one side of the second block, as depicted in FIG. 33A. It is appreciable that in other examples, the padding in step 2704B may include padding samples for two sides of the second block, wherein the two sides of the second block are either parallel, as depicted in FIG. 33C, or orthogonal, as depicted in FIG. 33B. In other examples, the padding in step 2704B may include padding samples for more than two sides of the second block, as depicted in FIG. 33D.

At step 2706B, an overlapped block motion compensation process is performed using at least the first and the third blocks of prediction samples. The overlapped block motion compensation process is as described in the preceding paragraphs of the present application. The overlapped block motion compensation process produces an overlapped block motion compensation block OBMC, as shown in step 2908 of FIG. 29.

At step 2708B, the current block is encoded using at least the results of overlapped block motion compensation process. An example of the encoded block is shown in step 2910 of FIG. 29.

It is noted that the term "encoding" and "coding" used in the description of step 2708B for the encoding method performed by the image encoder 100 may be replaced with the term "decoding" at step 2708B for an decoding method performed by the image decoder 200.

In the present embodiment, by virtue of introducing a padding process to the overlapped block motion compensation process, the present encoding and decoding method advantageously reduces the memory bandwidth access of the inter prediction process.

Figure 27C:
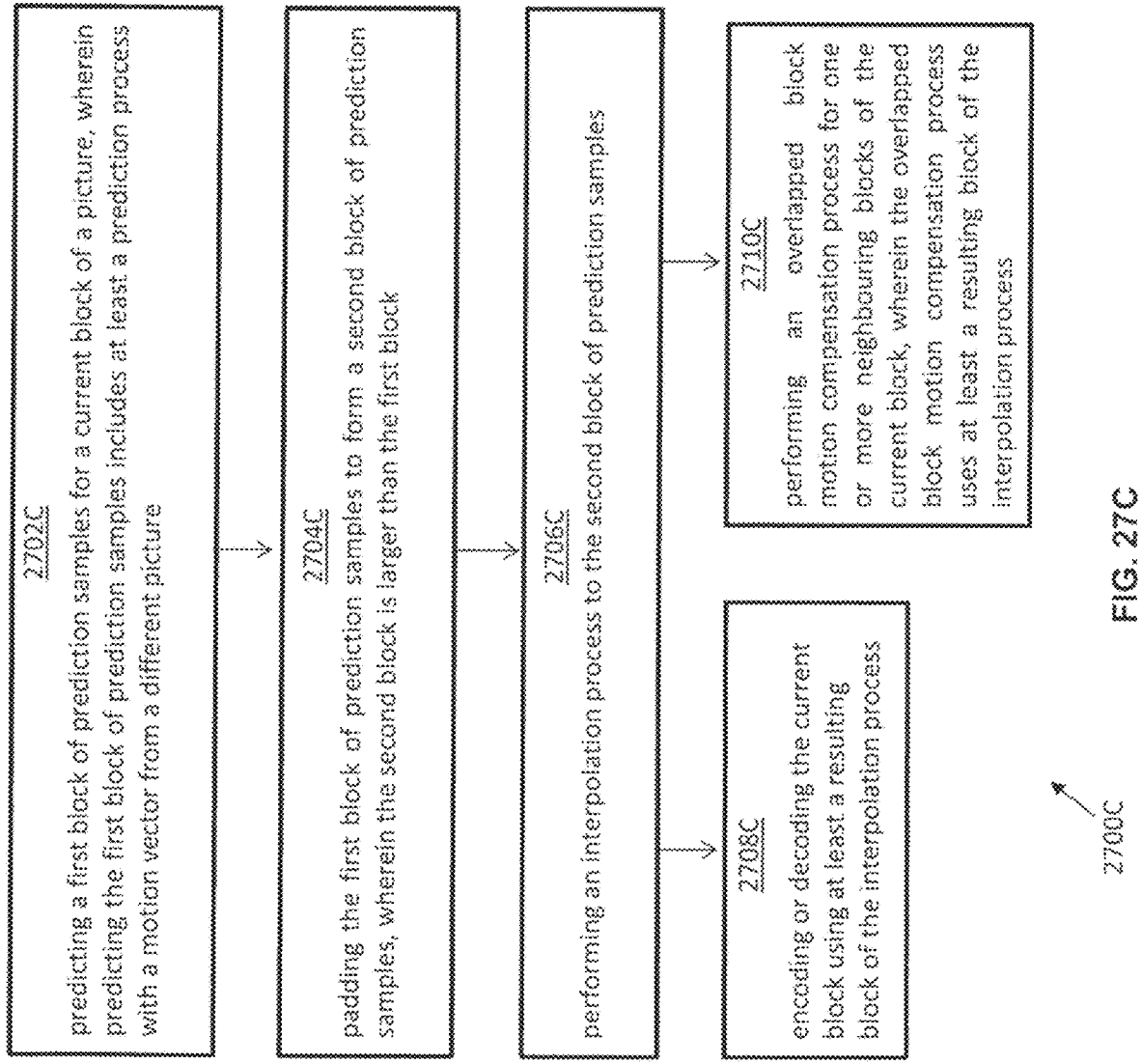
FIG. 27C is a flow chart illustrating yet another alternative example of an image encoding/decoding method using an inter prediction function to generate a prediction of a current block of a picture based on a reference block in a different picture.

FIG. 27C is a flow chart illustrating yet another alternative example of an image encoding/decoding method using an inter prediction function to generate a prediction of a current block of a picture based on a reference block in a different picture.

Figure 30:
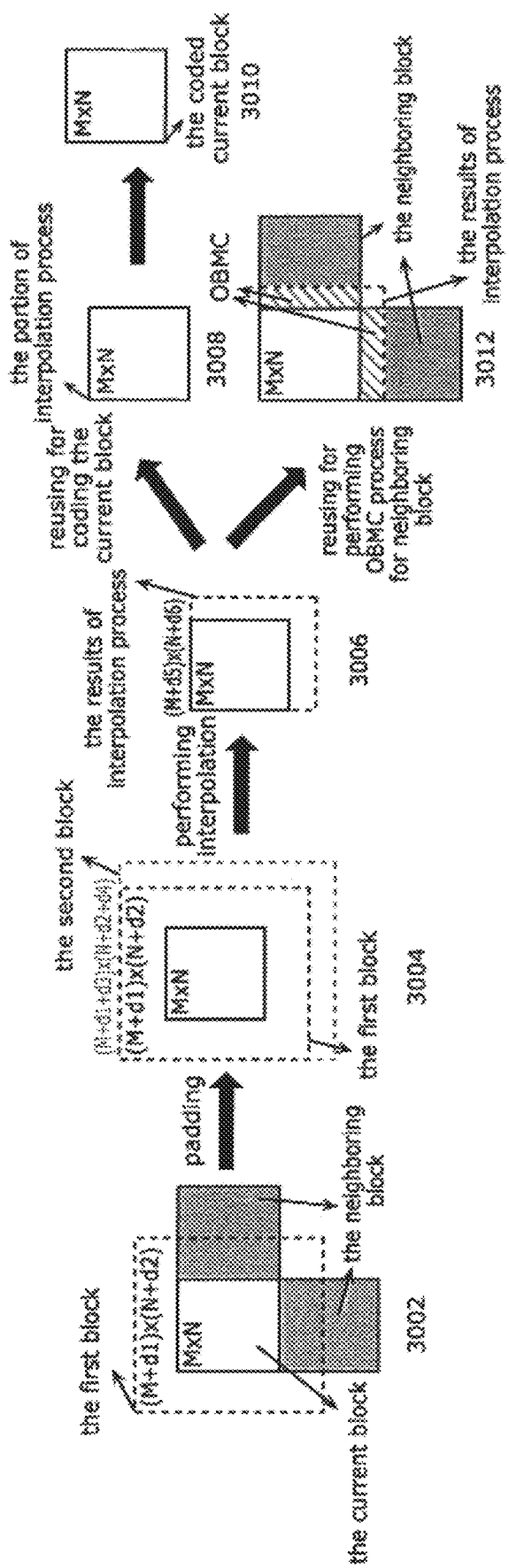
FIG. 30 is a conceptual diagram illustrating the embodiment of the image encoding/decoding method as shown in FIG. 27C.

The steps 2702C to 2410C of FIG. 27 are depicted in the conceptual diagram of FIG. 30. The embodiment 2700C of the encoding method as shown in FIGS. 27C and 30 can be performed by the image encoder 100. It is noted that the decoding method performed by the image decoder 200 is the same as the encoding method performed by the image encoder 100 as shown in FIGS. 24 and 25.

As shown in the example 2700C, steps 2702C and 2704C are the same as steps 1702 and 1704 as described with respect to FIG. 17.

As shown in FIG. 30, an embodiment of the prediction step 2702C of FIG. 27 is depicted in step 3002. In this embodiment, the current block has a size of M×N, wherein M may be the same as or different from N. The inter predictor 126 of the encoder 100 may predict the first block of prediction samples having a size of (M+d1)×(N+d2), wherein d1 and d2 may be equal to or larger than zero. As shown in step 3002 of FIG. 30, the current block may have one or more neighboring blocks, which may be utilized later in the present example of method.

As shown in FIG. 30, it may seem more advantageous to predict the first block of prediction samples of a size larger than the current block, as more information can be included in the prediction samples, which contributes to a more accurate prediction result. An example of the first block of prediction samples is depicted in dashed lines in step 3002 of FIG. 30.

As shown in step 3004 of FIG. 30, the inter predictor 126 of the encoder 100 may be configured to perform the step 2704C, to pad the first block of prediction samples to form a second block of prediction samples. The second block of prediction samples may have a size of (M+d1+d3)×(N+d2+d4), wherein d3 and d4 may be equal to or larger than zero. An example of the second block of prediction samples is depicted in thin dashed lines in step 3004 of FIG. 30, wherein the example of the first block of prediction samples is depicted in thick dashed lines.

As shown in FIG. 30, it may seem more advantageous to form the second block of prediction samples of a size larger than the first block, as more information can be included in the padded block of prediction samples, which contributes to a more accurate prediction result for the current block.

At step 2706C, an interpolation process is performed to the second block of prediction samples. The interpolation process may include applying interpolation filters according to the first motion vector to the second block of prediction samples. In one example, the interpolation filters may be the same as the filters used in a motion compensation process performed for a prediction mode, such as a merge mode, an inter prediction mode, etc. In other examples, the interpolation filters may be different from the filters used in a motion compensation process performed for a prediction mode as described above.

As shown in step 3006 of FIG. 30, the interpolation process performed to the second block of prediction samples may produce a resulting block of interpolation process. The resulting block of interpolation process may have a size of (M+d5)×(N+d6), wherein d5 and d6 are larger than zero. An example of the resulting block of interpolation process performed to the third block of prediction samples is depicted in dashed lines in step 3006 of FIG. 30. A portion of the resulting block of interpolation process may be used to code the current block, wherein the portion may have a size of M×N as shown in step 3008 of FIG. 30. The portion may be the same as a resulting block of a motion compensation process performed for a prediction mode such as a merge mode, an inter prediction mode, etc.

At step 2708C, the current block is encoded using at least a resulting blocking of interpolation process that is performed to the second block of prediction samples. An example of the encoded block is shown in step 3008 of FIG. 30.

Simultaneously with step 2708C, subsequently to step 2708C, or prior to step 2708C, an overlapped block motion compensation process is performed at step 2710C for one or more neighboring blocks of the current block. The overlapped block motion compensation process may use at least a resulting block of the interpolation process.

The overlapped block motion compensation process in step 2708C is as described in the preceding paragraphs of the present application. The overlapped block motion compensation process may produce one or more overlapped block motion compensation OBMC blocks between the one or more neighboring blocks and the current block, as shown in step 2906 of FIG. 29. With the one or more overlapped block motion compensation OBMC blocks between the one or more neighboring blocks and the current block produced at once, the methods of the present disclosure advantageously reduce memory bandwidth access (i.e. data fetched from off-chip memory, DRAM) required for OBMC process.

It is noted that the term "encoding" and "coding" used in the description of step 2708C for the encoding method performed by the image encoder 100 may be replaced with the term "decoding" at step 2708C for an decoding method performed by the image decoder 200.

In the present disclosure, the block of prediction samples described in the above examples and embodiments may be replaced with a non-rectangular shape partition of prediction samples. Examples of the non-rectangular shape partition may be at least one of a triangular shape partition, an L-shape partition, a pentagon shape partition, a hexagon shape partition and a polygon shape partition, as shown in FIG. 34.

Figure 34:
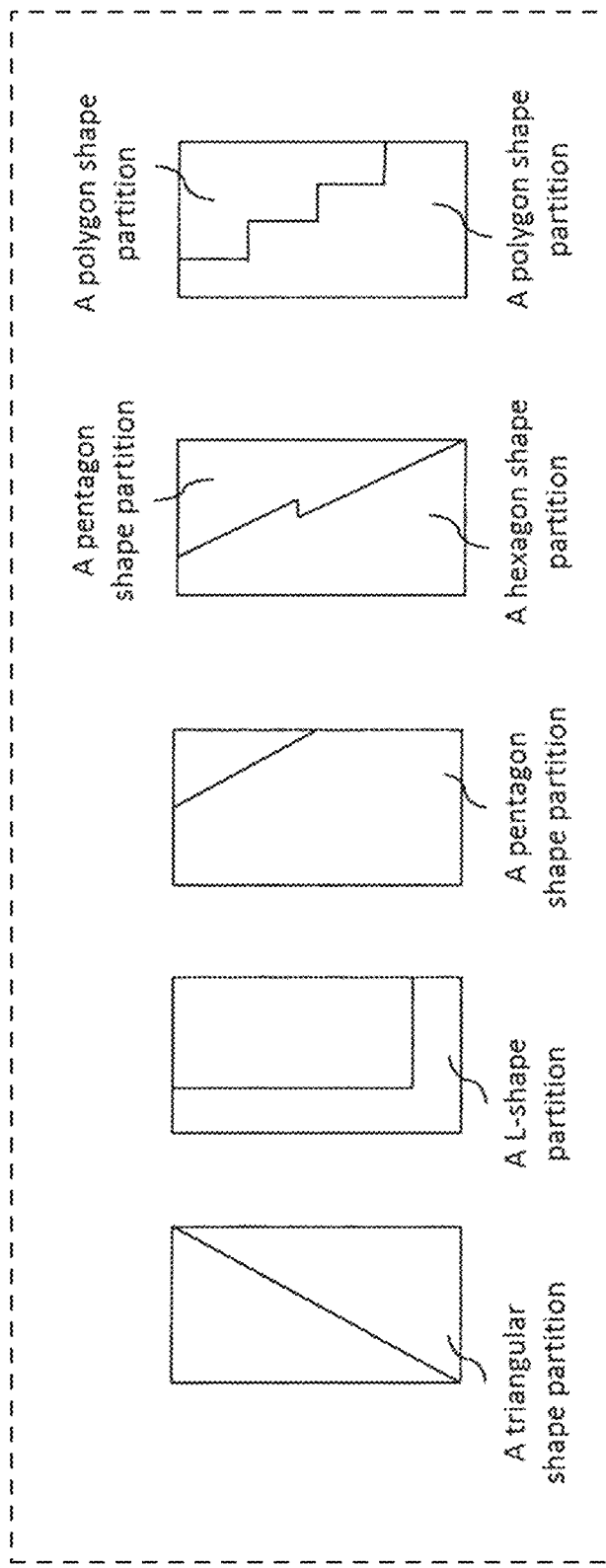
FIG. 34 shows alternative examples of blocks of prediction samples in accordance with the examples of the image encoding/decoding method as shown in FIGS. 17, 22, 24, 27A, 27B and 27C. In these alternative examples, the blocks of prediction samples are in non-rectangular shapes.

It is understandable by those skilled in the art that the non-rectangular shape partitions are not restricted to the shape partitions depicted in FIG. 34. In addition, the shape partitions depicted in FIG. 34 may be combined freely.

Figure 35:
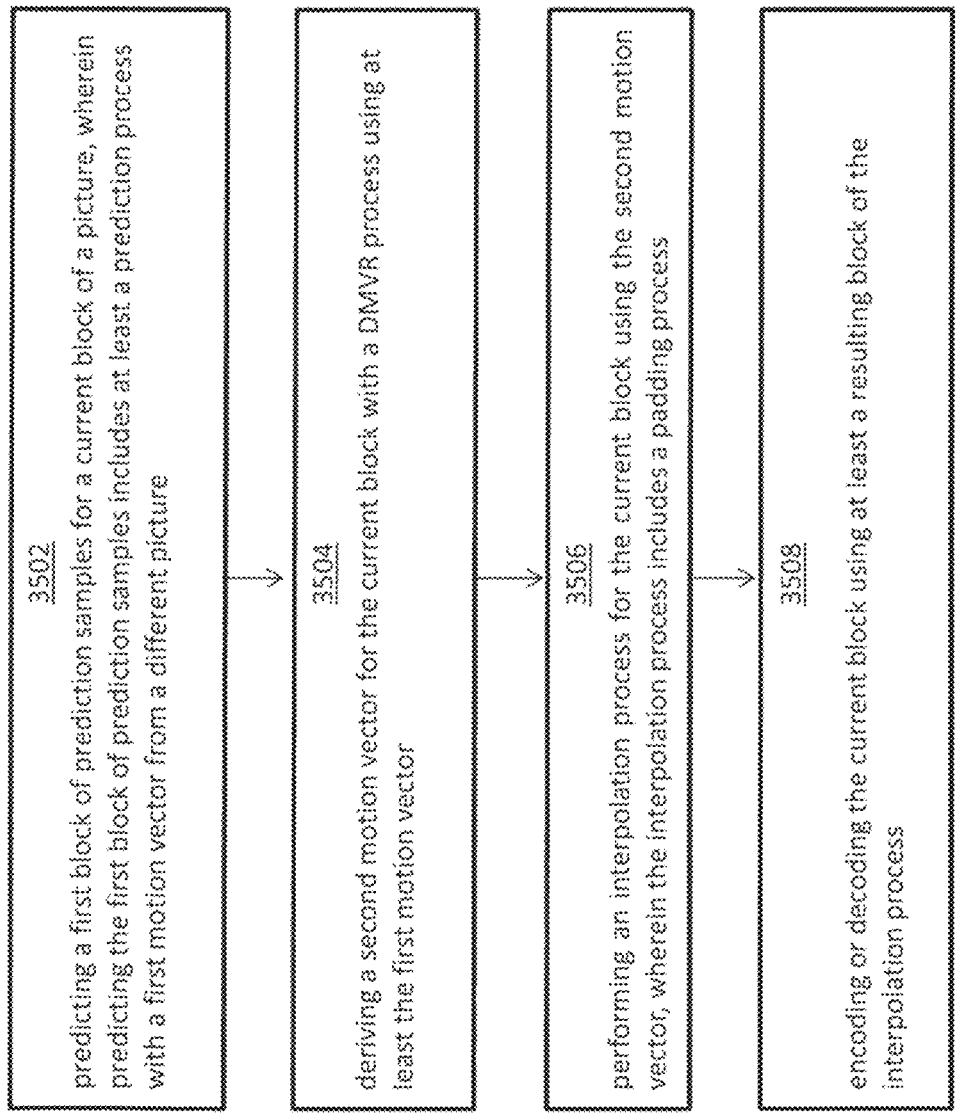
FIG. 35 shows a flow chart illustrating another alternative example of an image encoding/decoding method using an inter prediction function to generate a prediction of a current block of a picture based on a reference block in a different picture.

FIG. 35 shows a flow chart illustrating another alternative example of an image encoding/decoding method using an inter prediction function to generate a prediction of a current block of a picture based on a reference block in a different picture.

Figure 36:
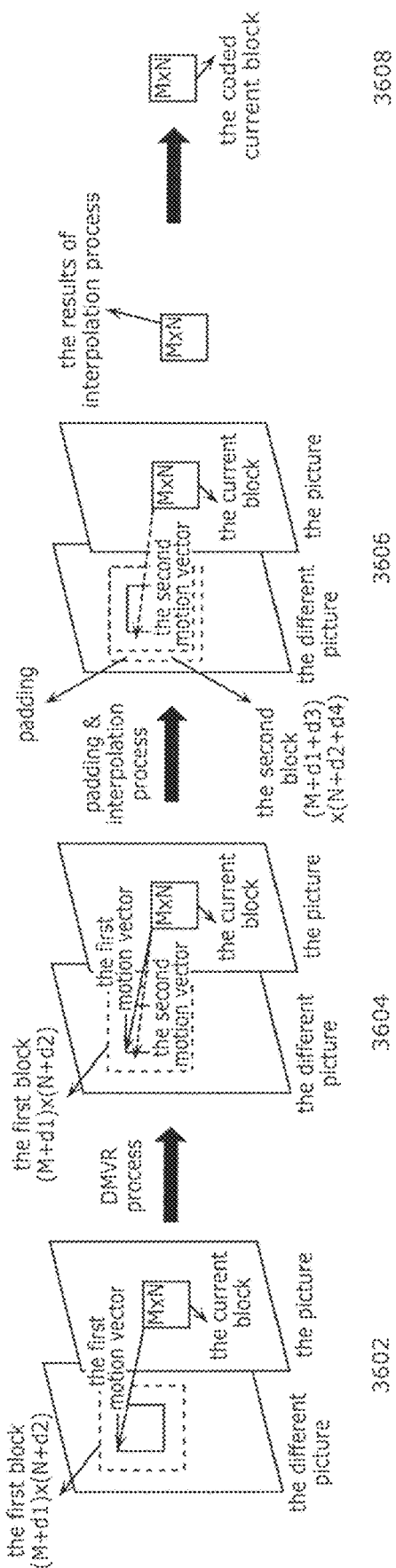
FIG. 36 is a conceptual diagram illustrating the embodiment of the image encoding/decoding method as shown in FIG. 35.

Steps 3502 to 3508 of FIG. 35 are depicted in the conceptual diagram in FIG. 36. The embodiment 3500 of the encoding method as shown in FIG. 35 and FIG. 36 can be performed by the image encoder 100. It is appreciable that the decoding method performed by the image decoder 200 is the same as the encoding method performed by the image encoder 100 as shown in FIG. 35 and FIG. 36.

At step 3502, a first block of prediction samples for a current block of a picture are predicted, wherein the prediction include at least a prediction process with a first motion vector from a different picture. As shown in FIG. 36, an embodiment of the first block of prediction samples predicted in step 3502 of FIG. 35 is depicted in step 3602. In this embodiment, the current block has a size of M×N, wherein M may be the same as or different from N. The inter predictor 126 of the encoder 100 may predict the first block of prediction samples having a size of (M+d1)×(N+d2), wherein d1 and d2 may be equal to or larger than zero.

At step 3504, a second motion vector is derived for the current block with a DMVR process as described in the preceding paragraphs, using at least the first motion vector. An embodiment of the second motion vector is depicted in step 3604 of FIG. 36. In this embodiment, the second motion vector is depicted in dotted lines which points from the current block to the first block.

At step 3506, an interpolation process may be performed for the current block using the second motion vector. The interpolation process may include a padding process. In an embodiment of step 3506, the inter predictor 126 of the encoder 100 may be configured to pad the first block of prediction samples into a second block of prediction samples according to the second motion vector, and perform the interpolation process to the second block of prediction samples using at least the second block of prediction samples. As depicted in step 3606 of FIG. 36, the second block of prediction samples may have a size of (M+d1+d3)×(N+d2+d4), wherein d3 and d4 may be equal to or larger than zero.

In the embodiment shown in FIG. 36, the second block is an L shape partition, as shown in FIG. 34, neighboring to the first block. It is appreciable that the second block may also be at least one of top block, left block, right block, bottom block, top-left block, top-right block, bottom-left block and bottom-right block neighboring to the first block. Alternatively, the second block may also be a triangular shape partition, an L-shape partition, a pentagon shape partition, a hexagon shape partition and a polygon shape partition neighboring to the first block.

Figure 37B:
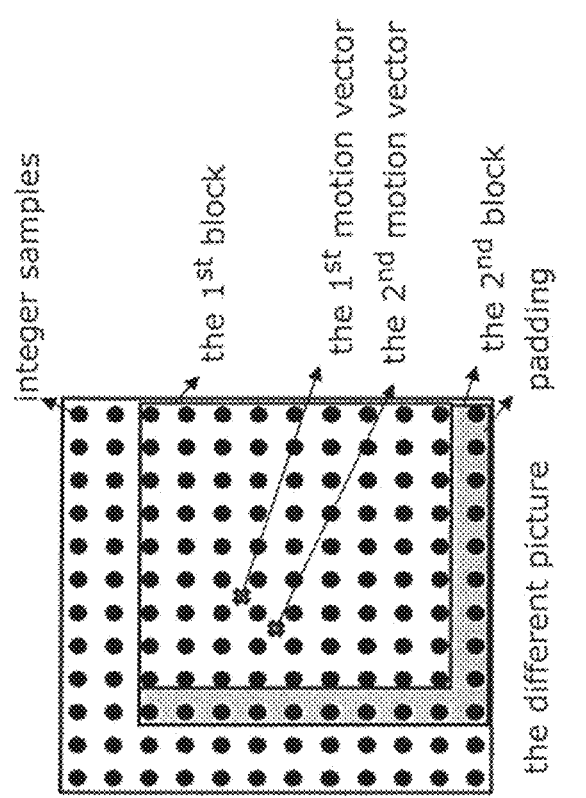
FIG. 37B illustrates another example of a process for padding a block of prediction samples according to a second motion vector, in accordance with the example of the image encoding/decoding method as shown in FIG. 35.
Figure 37A:
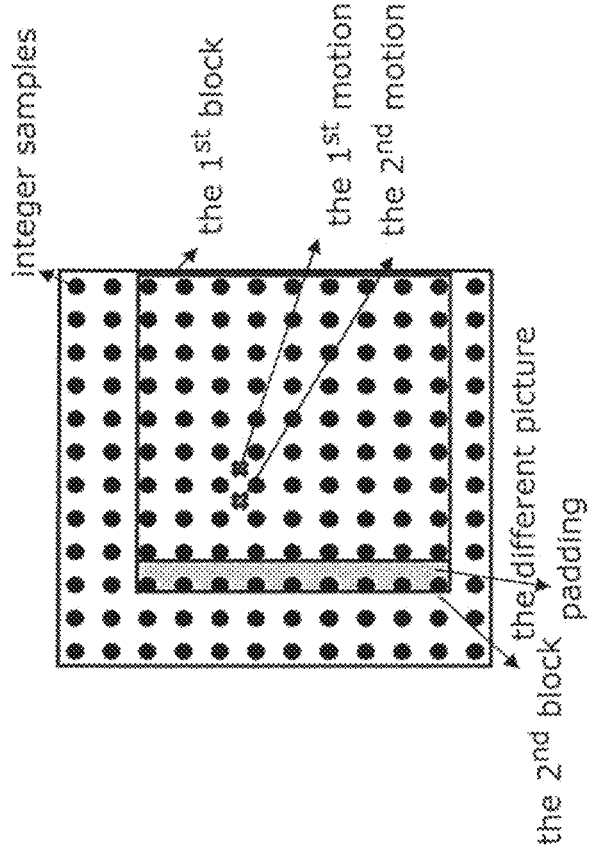
FIG. 37A illustrates an example of a process for padding a block of prediction samples according to a second motion vector, in accordance with the example of the image encoding/decoding method as shown in FIG. 35.

FIGS. 37A and 37B illustrate two examples of the padding process in step 3506.

In the example shown in FIG. 37A, the padding process in step 3506 includes padding samples for only one side of the first block to form the second block of prediction samples, using the second motion vector derived in step 3504.

In the example shown in FIG. 37B, the padding process in step 3506 includes padding samples for two sides of the first block to form the second block of prediction samples, using the second motion vector derived in step 3504. In the example of FIG. 37B, the two sides of the first block are orthogonal, as also depicted in FIG. 33B. Alternatively, the two sides of the first block are parallel, as depicted in FIG. 33C. It is appreciable that in other examples, the padding process in step 3506 may include padding samples for more than two sides of the second block, as depicted in FIG. 33D.

In some example, the padding process in step 3506 may include mirroring the samples of the first block, as shown in FIG. 32A. In other examples, the padding process in step 3506 may include duplicating the samples of the second block, as shown in FIG. 32B. In other examples, the padding process in step 3506 may include padding a fixed value, as shown in FIG. 32C, wherein the fixed value may be at least one of 0, 128, 512, a positive integer, a mean value of the second block, and a median value of the second block. In other examples, the padding process in step 3506 may include performing a function to the samples of the second block. Examples of the function may be a filter, a polynomial function, an exponential function and a clipping function. In other examples, the padding process in step 3506 may include any combination of mirroring, duplicating, padding a first value and performing a function to the samples of the second block.

As shown in step 3606, an interpolation process is performed to the second block of prediction samples. The interpolation process may include applying interpolation filters according to the second motion vector to the second block of prediction samples. In one example, the interpolation filters may be the same as the filters used in a motion compensation process performed for a prediction mode, such as a merge mode, an inter prediction mode, etc. In other examples, the interpolation filters may be different from the filters used in a motion compensation process performed for a prediction mode as described above.

As shown in step 3606 of FIG. 36, the interpolation process performed to the second block of prediction samples may produce a resulting block of interpolation process. The resulting block of interpolation process may have a size of M×N.

At step 3508, the current block is encoded using at least the resulting blocking of interpolation process that is performed at step 3506 to the second block of prediction samples. An example of the encoded block is shown in step 3608 of FIG. 36.

It is noted that the term "encoding" and "coding" used in the description of step 3508 for the encoding method performed by the image encoder 100 may be replaced with the term "decoding" at step 3508 for an decoding method performed by the image decoder 200.

In the present embodiment, by virtue of introducing a padding process to the overlapped block motion compensation process, the present encoding and decoding method advantageously reduces the memory bandwidth access for the for DMVR process.

Figure 38:
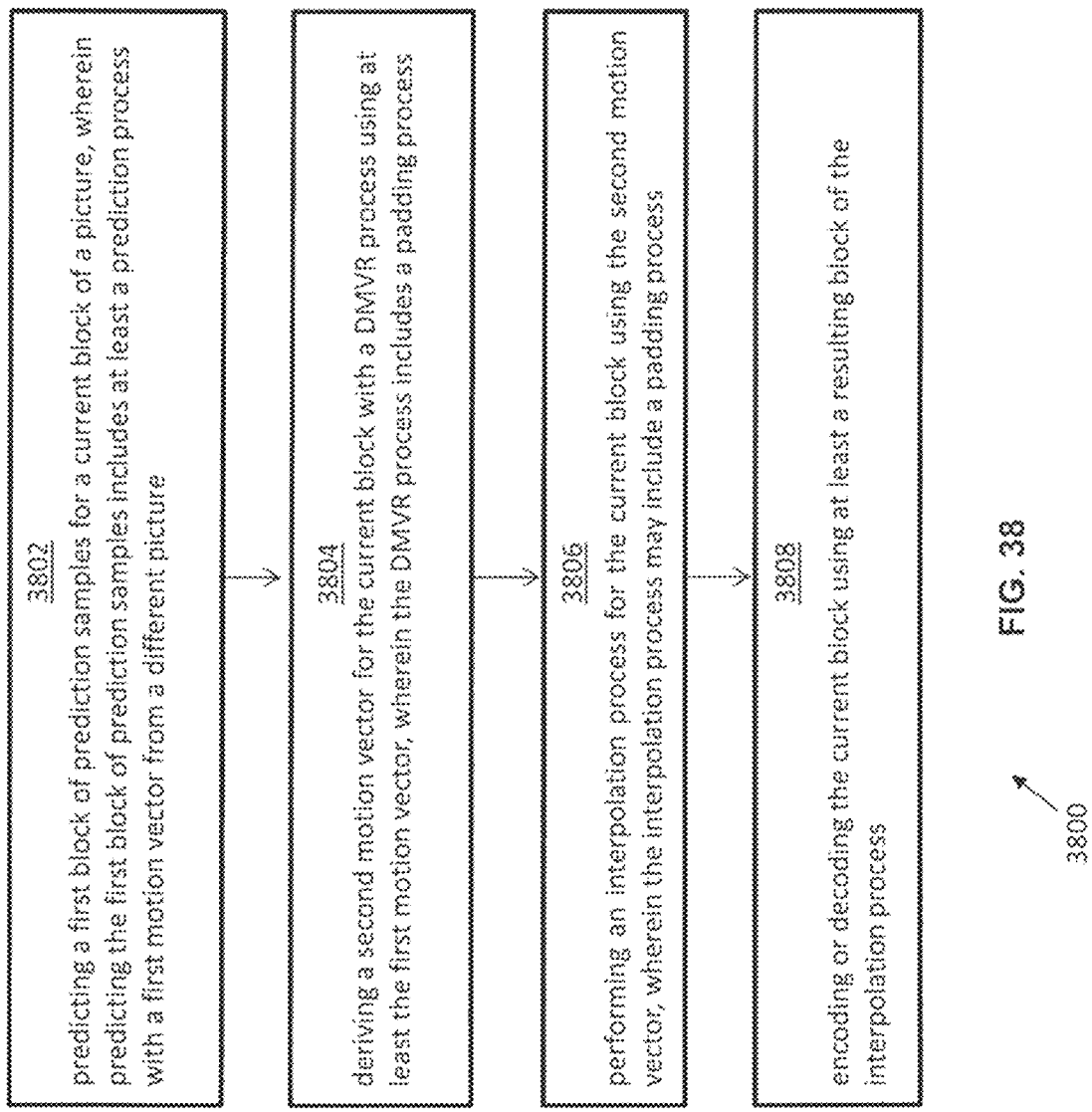
FIG. 38 shows a flow chart illustrating yet another alternative example of an image encoding/decoding method using an inter prediction function to generate a prediction of a current block of a picture based on a reference block in a different picture. The flow chart of FIG. 38 is similar to that of FIG. 35, except that a dynamic motion vector refreshing (DMVR) process in step 3804 further includes a padding process.

FIG. 38 shows a flow chart illustrating yet another alternative example of an image encoding/decoding method using an inter prediction function to generate a prediction of a current block of a picture based on a reference block in a different picture.

Figure 39:
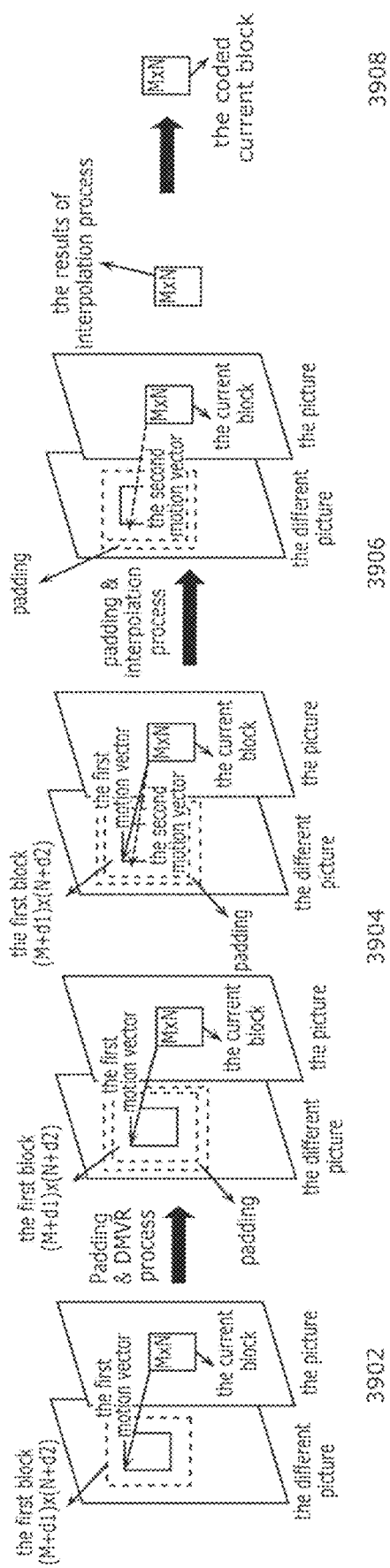
FIG. 39 is a conceptual diagram illustrating the embodiment of the image encoding/decoding method as shown in FIG. 38.

Steps 3802, 3804, 3806 and 3808 of FIG. 38 are depicted in the conceptual diagram in FIG. 39. The embodiment 3800 of the encoding method as shown in FIG. 38 and FIG. 39 can be performed by the image encoder 100. It is appreciable that the decoding method performed by the image decoder 200 is the same as the encoding method performed by the image encoder 100 as shown in FIG. 38 and FIG. 39.

As described above, steps 3802, 3804, 3806 and 3808 of FIG. 38 are similar to those of FIG. 35, except that the dynamic motion vector refreshing (DMVR) process in step 3804 further includes a padding process. In an embodiment shown in step 3904, the padding process in step 3804 includes padding the first block of prediction samples according to the first motion vector. In this regard, at step 3804, a second motion vector is derived for the current block with a DMVR process as described in the preceding paragraphs, using at least the first motion vector based on the padded first block. An embodiment of the second motion vector is depicted in step 3904 of FIG. 39, in dotted lines which points from the current block to the first block.

It is noted that the term "encoding" and "coding" used in the description of step 3808 for the encoding method performed by the image encoder 100 may be replaced with the term "decoding" at step 3808 for an decoding method performed by the image decoder 200.

In the present embodiment, by virtue of introducing a padding process to the overlapped block motion compensation process, the present encoding and decoding method advantageously reduces the memory bandwidth access for the for DMVR process.

In the present application, the term "block" described in the above examples and embodiments may be replaced with the term "prediction unit". The term "block" described in each of aspect may also be replaced with the term "sub prediction unit". The term "block" described in each of aspect may also be replaced with the term "coding unit".

(Implementations and Applications)

As described in each of the above embodiments, each functional or operational block can typically be realized as an MPU (micro processing unit) and memory, for example. Moreover, processes performed by each of the functional blocks may be realized as a program execution unit, such as a processor which reads and executes software (a program) recorded on a recording medium such as ROM. The software may be distributed. The software may be recorded on a variety of recording media such as semiconductor memory. Note that each functional block can, of course, also be realized as hardware (dedicated circuit).

The processing described in each of the embodiments may be realized via integrated processing using a single apparatus (system), and, alternatively, may be realized via decentralized processing using a plurality of apparatuses. Moreover, the processor that executes the above-described program may be a single processor or a plurality of processors. In other words, integrated processing may be performed, and, alternatively, decentralized processing may be performed.

Embodiments of the present disclosure are not limited to the above exemplary embodiments; various modifications may be made to the exemplary embodiments, the results of which are also included within the scope of the embodiments of the present disclosure.

Next, application examples of the moving picture encoding method (image encoding method) and the moving picture decoding method (image decoding method) described in each of the above embodiments will be described as well as various systems that implement the application examples. Such system may be characterized as including an image encoder that employs the image encoding method, an image decoder that employs the image decoding method, or an image encoder-decoder that includes both the image encoder and the image decoder. Other configurations of such system may be modified on a case-by-case basis.

(Usage Examples)

Figure 40:
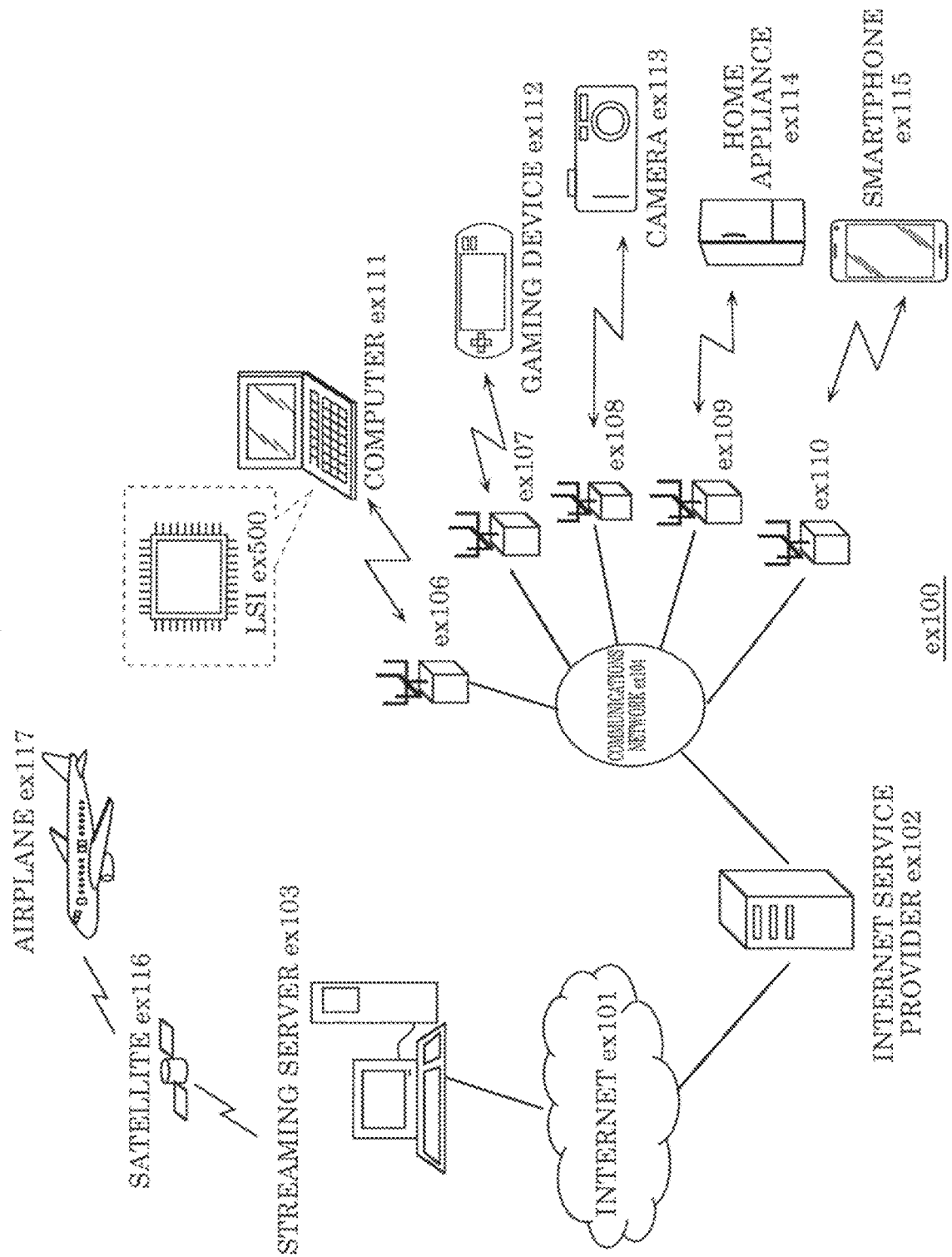
FIG. 40 illustrates an overall configuration of a content providing system for implementing a content distribution service.

FIG. 40 illustrates an overall configuration of content providing system ex100 suitable for implementing a content distribution service. The area in which the communication service is provided is divided into cells of desired sizes, and base stations ex106, ex107, ex108, ex109, and ex110, which are fixed wireless stations in the illustrated example, are located in respective cells.

In content providing system ex100, devices including computer ex111, gaming device ex112, camera ex113, home appliance ex114, and smartphone ex115 are connected to internet ex101 via internet service provider ex102 or communications network ex104 and base stations ex106 through ex110. Content providing system ex100 may combine and connect any combination of the above devices. In various implementations, the devices may be directly or indirectly connected together via a telephone network or near field communication, rather than via base stations ex106 through ex110. Further, streaming server ex103 may be connected to devices including computer ex111, gaming device ex112, camera ex113, home appliance ex114, and smartphone ex115 via, for example, internet ex101. Streaming server ex103 may also be connected to, for example, a terminal in a hotspot in airplane ex117 via satellite ex116.

Note that instead of base stations ex106 through ex110, wireless access points or hotspots may be used. Streaming server ex103 may be connected to communications network ex104 directly instead of via internet ex101 or internet service provider ex102, and may be connected to airplane ex117 directly instead of via satellite ex116.

Camera ex113 is a device capable of capturing still images and video, such as a digital camera. Smartphone ex115 is a smartphone device, cellular phone, or personal handyphone system (PHS) phone that can operate under the mobile communications system standards of the 2G, 3G, 3.9G, and 4G systems, as well as the next-generation 5G system.

Home appliance ex118 is, for example, a refrigerator or a device included in a home fuel cell cogeneration system.

In content providing system ex100, a terminal including an image and/or video capturing function is capable of, for example, live streaming by connecting to streaming server ex103 via, for example, base station ex106. When live streaming, a terminal (e.g., computer ex111, gaming device ex112, camera ex113, home appliance ex114, smartphone ex115, or airplane ex117) may perform the encoding processing described in the above embodiments on still-image or video content captured by a user via the terminal, may multiplex video data obtained via the encoding and audio data obtained by encoding audio corresponding to the video, and may transmit the obtained data to streaming server ex103. In other words, the terminal functions as the image encoder according to one aspect of the present disclosure.

Streaming server ex103 streams transmitted content data to clients that request the stream. Client examples include computer ex111, gaming device ex112, camera ex113, home appliance ex114, smartphone ex115, and terminals inside airplane ex117, which are capable of decoding the above-described encoded data. Devices that receive the streamed data decode and reproduce the received data. In other words, the devices may each function as the image decoder according to one aspect of the present disclosure.

(Decentralized Processing)

Streaming server ex103 may be realized as a plurality of servers or computers between which tasks such as the processing, recording, and streaming of data are divided. For example, streaming server ex103 may be realized as a content delivery network (CDN) that streams content via a network connecting multiple edge servers located throughout the world. In a CDN, an edge server physically near the client is dynamically assigned to the client. Content is cached and streamed to the edge server to reduce load times. In the event of, for example, some type of error or change in connectivity due, for example, to a spike in traffic, it is possible to stream data stably at high speeds since it is possible to avoid affected parts of the network by, for example, dividing the processing between a plurality of edge servers or switching the streaming duties to a different edge server, and continuing streaming.

Decentralization is not limited to just the division of processing for streaming; the encoding of the captured data may be divided between and performed by the terminals, on the server side, or both. In one example, in typical encoding, the processing is performed in two loops. The first loop is for detecting how complicated the image is on a frame-by-frame or scene-by-scene basis, or detecting the encoding load. The second loop is for processing that maintains image quality and improves encoding efficiency. For example, it is possible to reduce the processing load of the terminals and improve the quality and encoding efficiency of the content by having the terminals perform the first loop of the encoding and having the server side that received the content perform the second loop of the encoding. In such a case, upon receipt of a decoding request, it is possible for the encoded data resulting from the first loop performed by one terminal to be received and reproduced on another terminal in approximately real time. This makes it possible to realize smooth, real-time streaming.

In another example, camera ex113 or the like extracts a feature amount from an image, compresses data related to the feature amount as metadata, and transmits the compressed metadata to a server. For example, the server determines the significance of an object based on the feature amount and changes the quantization accuracy accordingly to perform compression suitable for the meaning (or content significance) of the image. Feature amount data is particularly effective in improving the precision and efficiency of motion vector prediction during the second compression pass performed by the server.

Moreover, encoding that has a relatively low processing load, such as variable length coding (VLC), may be handled by the terminal, and encoding that has a relatively high processing load, such as context-adaptive binary arithmetic coding (CABAC), may be handled by the server.

In yet another example, there are instances in which a plurality of videos of approximately the same scene are captured by a plurality of terminals in, for example, a stadium, shopping mall, or factory. In such a case, for example, the encoding may be decentralized by dividing processing tasks between the plurality of terminals that captured the videos and, if necessary, other terminals that did not capture the videos and the server, on a per-unit basis. The units may be, for example, groups of pictures (GOP), pictures, or tiles resulting from dividing a picture. This makes it possible to reduce load times and achieve streaming that is closer to real-time.

Since the videos are of approximately the same scene, management and/or instruction may be carried out by the server so that the videos captured by the terminals can be cross-referenced. Moreover, the server may receive encoded data from the terminals, change reference relationship between items of data or correct or replace pictures themselves, and then perform the encoding. This makes it possible to generate a stream with increased quality and efficiency for the individual items of data.

Furthermore, the server may stream video data after performing transcoding to convert the encoding format of the video data. For example, the server may convert the encoding format from MPEG to VP (e.g., VP9), and may convert H. 264 to H. 265.

In this way, encoding can be performed by a terminal or one or more servers. Accordingly, although the device that performs the encoding is referred to as a "server" or "terminal" in the following description, some or all of the processes performed by the server may be performed by the terminal, and likewise some or all of the processes performed by the terminal may be performed by the server. This also applies to decoding processes.

(3D, Multi-Angle)

There has been an increase in usage of images or videos combined from images or videos of different scenes concurrently captured or of the same scene captured from different angles by a plurality of terminals such as camera ex113 and/or smartphone ex115. Videos captured by the terminals are combined based on, for example, the separately-obtained relative positional relationship between the terminals, or regions in a video having matching feature points.

In addition to the encoding of two-dimensional moving pictures, the server may encode a still image based on scene analysis of a moving picture either automatically or at a point in time specified by the user, and transmit the encoded still image to a reception terminal. Furthermore, when the server can obtain the relative positional relationship between the video capturing terminals, in addition to two-dimensional moving pictures, the server can generate three-dimensional geometry of a scene based on video of the same scene captured from different angles. The server may separately encode three-dimensional data generated from, for example, a point cloud and, based on a result of recognizing or tracking a person or object using three-dimensional data, may select or reconstruct and generate a video to be transmitted to a reception terminal from videos captured by a plurality of terminals.

This allows the user to enjoy a scene by freely selecting videos corresponding to the video capturing terminals, and allows the user to enjoy the content obtained by extracting a video at a selected viewpoint from three-dimensional data reconstructed from a plurality of images or videos. Furthermore, as with video, sound may be recorded from relatively different angles, and the server may multiplex audio from a specific angle or space with the corresponding video and transmit the multiplexed video and audio.

In recent years, content that is a composite of the real world and a virtual world, such as virtual reality (VR) and augmented reality (AR) content, has also become popular. In the case of VR images, the server may create images from the viewpoints of both the left and right eyes and perform encoding that tolerates reference between the two viewpoint images, such as multi-view coding (MVC), and, alternatively, may encode the images as separate streams without referencing. When the images are decoded as separate streams, the streams may be synchronized when reproduced so as to recreate a virtual three-dimensional space in accordance with the viewpoint of the user.

In the case of AR images, the server superimposes virtual object information existing in a virtual space onto camera information representing a real-world space, based on a three-dimensional position or movement from the perspective of the user. The decoder may obtain or store virtual object information and three-dimensional data, generate two-dimensional images based on movement from the perspective of the user, and then generate superimposed data by seamlessly connecting the images. Alternatively, the decoder may transmit, to the server, motion from the perspective of the user in addition to a request for virtual object information. The server may generate superimposed data based on three-dimensional data stored in the server in accordance with the received motion, and encode and stream the generated superimposed data to the decoder. Note that superimposed data includes, in addition to RGB values, an a value indicating transparency, and the server sets the a value for sections other than the object generated from three-dimensional data to, for example, 0, and may perform the encoding while those sections are transparent. Alternatively, the server may set the background to a predetermined RGB value, such as a chroma key, and generate data in which areas other than the object are set as the background.

Decoding of similarly streamed data may be performed by the client (i. e., the terminals), on the server side, or divided therebetween. In one example, one terminal may transmit a reception request to a server, the requested content may be received and decoded by another terminal, and a decoded signal may be transmitted to a device having a display. It is possible to reproduce high image quality data by decentralizing processing and appropriately selecting content regardless of the processing ability of the communications terminal itself. In yet another example, while a TV, for example, is receiving image data that is large in size, a region of a picture, such as a tile obtained by dividing the picture, may be decoded and displayed on a personal terminal or terminals of a viewer or viewers of the TV. This makes it possible for the viewers to share a big-picture view as well as for each viewer to check his or her assigned area or inspect a region in further detail up close.

In situations in which a plurality of wireless connections are possible over near, mid, and far distances, indoors or outdoors, it may be possible to seamlessly receive content using a streaming system standard such as MPEG-DASH. The user may switch between data in real time while freely selecting a decoder or display apparatus including the user's terminal, displays arranged indoors or outdoors, etc. Moreover, using, for example, information on the position of the user, decoding can be performed while switching which terminal handles decoding and which terminal handles the displaying of content. This makes it possible to map and display information, while the use is on the move in route to a destination, on the wall of a nearby building in which a device capable of displaying content is embedded or on part of the ground. Moreover, it is also possible to switch the bit rate of the received data based on the accessibility to the encoded data on a network, such as when encoded data is cached on a server quickly accessible from the reception terminal or when encoded data is copied to an edge server in a content delivery service.

(Scalable Encoding)

Figure 41:
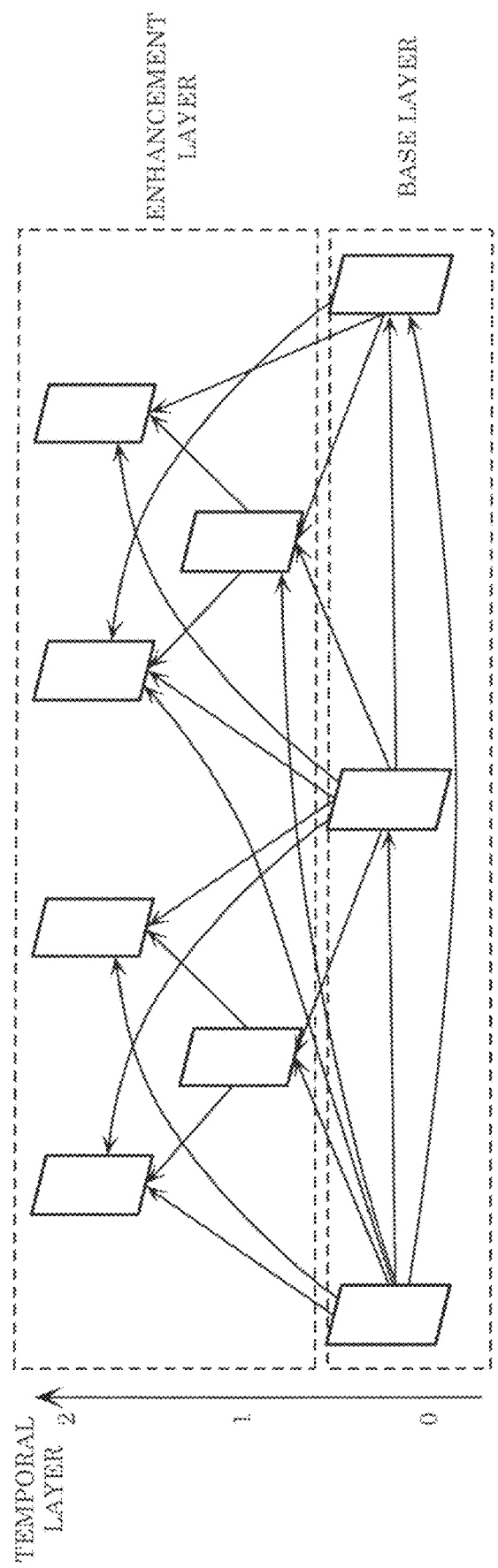
FIG. 41 illustrates one example of encoding structure in scalable encoding.

The switching of content will be described with reference to a scalable stream, illustrated in FIG. 41, which is compression coded via implementation of the moving picture encoding method described in the above embodiments. The server may have a configuration in which content is switched while making use of the temporal and/or spatial scalability of a stream, which is achieved by division into and encoding of layers, as illustrated in FIG. 41. Note that there may be a plurality of individual streams that are of the same content but different quality. In other words, by determining which layer to decode based on internal factors, such as the processing ability on the decoder side, and external factors, such as communication bandwidth, the decoder side can freely switch between low resolution content and high resolution content while decoding. For example, in a case in which the user wants to continue watching, for example at home on a device such as a TV connected to the internet, a video that the user had been previously watching on smartphone ex115 while on the move, the device can simply decode the same stream up to a different layer, which reduces the server side load.

Furthermore, in addition to the configuration described above in which scalability is achieved as a result of the pictures being encoded per layer with the enhancement layer being above the base layer, the enhancement layer may include metadata based on, for example, statistical information on the image. The decoder side may generate high image quality content by performing super-resolution imaging on a picture in the base layer based on the metadata. Super-resolution imaging may improve the SN ratio while maintaining resolution and/or increasing resolution. Metadata includes information for identifying a linear or a non-linear filter coefficient used in super-resolution processing, or information identifying a parameter value in filter processing, machine learning, or least squares method used in super-resolution processing.

Figure 42:
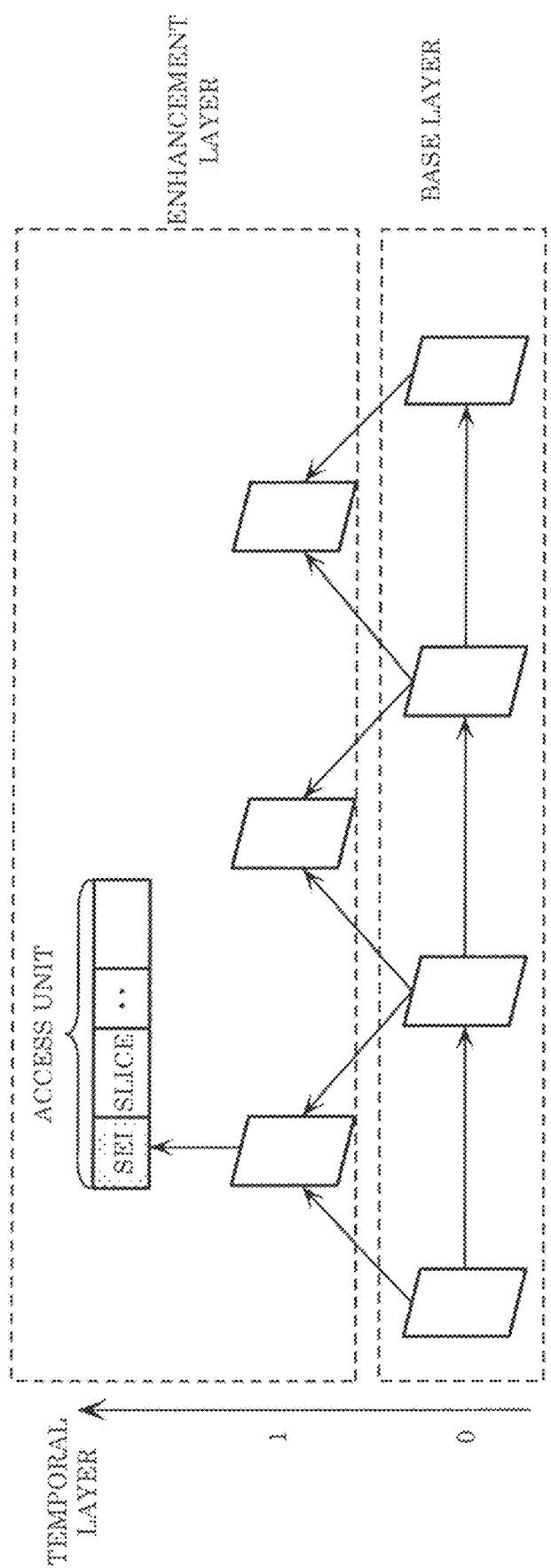
FIG. 42 illustrates one example of encoding structure in scalable encoding.

Alternatively, a configuration may be provided in which a picture is divided into, for example, tiles in accordance with, for example, the meaning of an object in the image. On the decoder side, only a partial region is decoded by selecting a tile to decode. Further, by storing an attribute of the object (person, car, ball, etc.) and a position of the object in the video (coordinates in identical images) as metadata, the decoder side can identify the position of a desired object based on the metadata and determine which tile or tiles include that object. For example, as illustrated in FIG. 42, metadata may be stored using a data storage structure different from sample data such as an SEI (supplemental enhancement information) message in HEVC. This metadata indicates, for example, the position, size, or color of the main object.

Metadata may be stored in units of a plurality of pictures, such as stream, sequence, or random access units. The decoder side can obtain, for example, the time at which a specific person appears in the video, and by fitting the time information with picture unit information, can identify a picture in which the object is present and the position of the object in the picture.

(Web Page Optimization)

Figure 43:
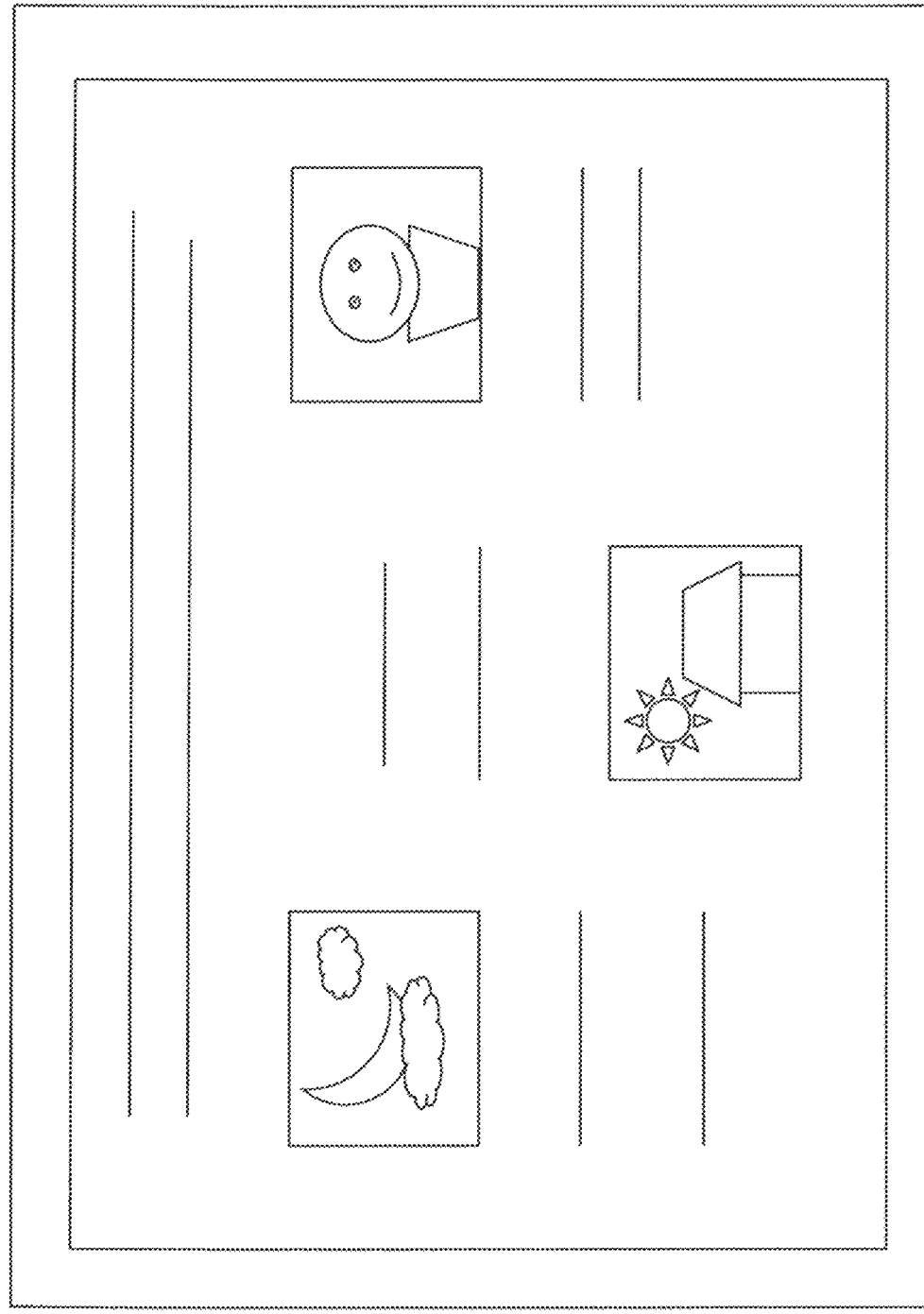
FIG. 43 illustrates an example of a display screen of a web page.
Figure 44:
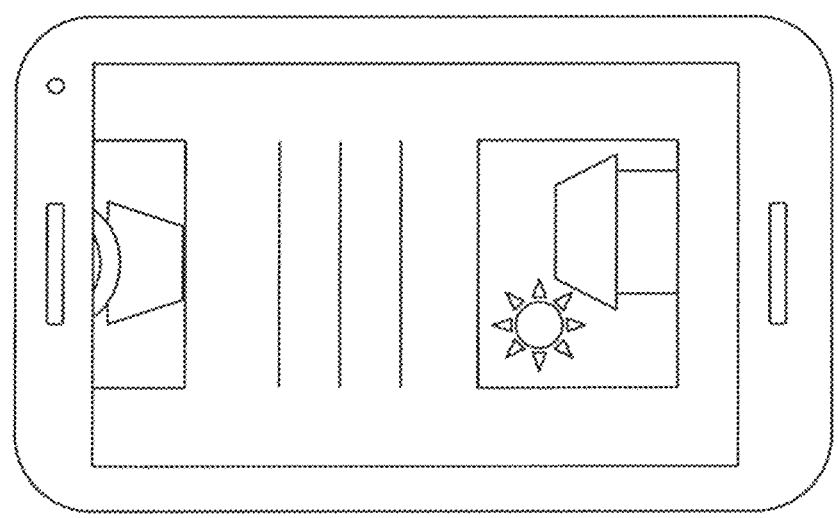
FIG. 44 illustrates an example of a display screen of a web page.

FIG. 43 illustrates an example of a display screen of a web page on computer ex111, for example. FIG. 44 illustrates an example of a display screen of a web page on smartphone ex115, for example. As illustrated in FIG. 43 and FIG. 44, a web page may include a plurality of image links which are links to image content, and the appearance of the web page differs depending on the device used to view the web page. When a plurality of image links are viewable on the screen, until the user explicitly selects an image link, or until the image link is in the approximate center of the screen or the entire image link fits in the screen, the display apparatus (decoder) may display, as the image links, still images included in the content or I pictures, may display video such as an animated gif using a plurality of still images or I pictures, or may receive only the base layer and decode and display the video.

When an image link is selected by the user, the display apparatus performs decoding while giving the highest priority to the base layer. Note that if there is information in the HTML code of the web page indicating that the content is scalable, the display apparatus may decode up to the enhancement layer. Further, in order to guarantee real time reproduction, before a selection is made or when the bandwidth is severely limited, the display apparatus can reduce delay between the point in time at which the leading picture is decoded and the point in time at which the decoded picture is displayed (that is, the delay between the start of the decoding of the content to the displaying of the content) by decoding and displaying only forward reference pictures (I picture, P picture, forward reference B picture). Still further, the display apparatus may purposely ignore the reference relationship between pictures and coarsely decode all B and P pictures as forward reference pictures, and then perform normal decoding as the number of pictures received over time increases.

(Autonomous Driving)

When transmitting and receiving still image or video data such as two- or three-dimensional map information for autonomous driving or assisted driving of an automobile, the reception terminal may receive, in addition to image data belonging to one or more layers, information on, for example, the weather or road construction as metadata, and associate the metadata with the image data upon decoding. Note that metadata may be assigned per layer and, alternatively, may simply be multiplexed with the image data.

In such a case, since the automobile, drone, airplane, etc., including the reception terminal is mobile, the reception terminal can seamlessly receive and perform decoding while switching between base stations among base stations ex106 through ex110 by transmitting information indicating the position of the reception terminal. Moreover, in accordance with the selection made by the user, the situation of the user, and/or the bandwidth of the connection, the reception terminal can dynamically select to what extent the metadata is received or to what extent the map information, for example, is updated.

In content providing system ex100, the client can receive, decode, and reproduce, in real time, encoded information transmitted by the user.

(Streaming of Individual Content)

In content providing system ex100, in addition to high image quality, long content distributed by a video distribution entity, unicast or multicast streaming of low image quality, and short content from an individual are also possible. Such content from individuals is likely to further increase in popularity. The server may first perform editing processing on the content before the encoding processing in order to refine the individual content. This may be achieved using the following configuration, for example.

In real-time while capturing video or image content or after the content has been captured and accumulated, the server performs recognition processing based on the raw data or encoded data, such as capture error processing, scene search processing, meaning analysis, and/or object detection processing. Then, based on the result of the recognition processing, the server—either when prompted or automatically—edits the content, examples of which include: correction such as focus and/or motion blur correction; removing low-priority scenes such as scenes that are low in brightness compared to other pictures or out of focus; object edge adjustment; and color tone adjustment. The server encodes the edited data based on the result of the editing. It is known that excessively long videos tend to receive fewer views. Accordingly, in order to keep the content within a specific length that scales with the length of the original video, the server may, in addition to the low-priority scenes described above, automatically clip out scenes with low movement based on an image processing result. Alternatively, the server may generate and encode a video digest based on a result of an analysis of the meaning of a scene.

There may be instances in which individual content may include content that infringes a copyright, moral right, portrait rights, etc. Such instance may lead to an unfavorable situation for the creator, such as when content is shared beyond the scope intended by the creator. Accordingly, before encoding, the server may, for example, edit images so as to blur faces of people in the periphery of the screen or blur the inside of a house, for example. Further, the server may be configured to recognize the faces of people other than a registered person in images to be encoded, and when such faces appear in an image, may apply a mosaic filter, for example, to the face of the person. Alternatively, as pre- or post-processing for encoding, the user may specify, for copyright reasons, a region of an image including a person or a region of the background to be processed. The server may process the specified region by, for example, replacing the region with a different image or blurring the region. If the region includes a person, the person may be tracked in the moving picture, and the person's head region may be replaced with another image as the person moves.

Since there is a demand for real-time viewing of content produced by individuals, which tends to be small in data size, the decoder first receives the base layer as the highest priority and performs decoding and reproduction, although this may differ depending on bandwidth. When the content is reproduced two or more times, such as when the decoder receives the enhancement layer during decoding and reproduction of the base layer and loops the reproduction, the decoder may reproduce a high image quality video including the enhancement layer. If the stream is encoded using such scalable encoding, the video may be low quality when in an unselected state or at the start of the video, but it can offer an experience in which the image quality of the stream progressively increases in an intelligent manner. This is not limited to just scalable encoding; the same experience can be offered by configuring a single stream from a low quality stream reproduced for the first time and a second stream encoded using the first stream as a reference.

(Other Implementation and Application Examples)

The encoding and decoding may be performed by LSI ex500 (see FIG. 40), which is typically included in each terminal. LSI ex500 may be configured of a single chip or a plurality of chips. Software for encoding and decoding moving pictures may be integrated into some type of a recording medium (such as a CD-ROM, a flexible disk, or a hard disk) that is readable by, for example, computer ex111, and the encoding and decoding may be performed using the software. Furthermore, when smartphone ex115 is equipped with a camera, the video data obtained by the camera may be transmitted. In this case, the video data is coded by LSI ex500 included in smartphone ex115.

Note that LSI ex500 may be configured to download and activate an application. In such a case, the terminal first determines whether it is compatible with the scheme used to encode the content or whether it is capable of executing a specific service. When the terminal is not compatible with the encoding scheme of the content or when the terminal is not capable of executing a specific service, the terminal first downloads a codec or application software and then obtains and reproduces the content.

Aside from the example of content providing system ex100 that uses internet ex101, at least the moving picture encoder (image encoder) or the moving picture decoder (image decoder) described in the above embodiments may be implemented in a digital broadcasting system. The same encoding processing and decoding processing may be applied to transmit and receive broadcast radio waves superimposed with multiplexed audio and video data using, for example, a satellite, even though this is geared toward multicast whereas unicast is easier with content providing system ex100.

(Hardware Configuration)

Figure 45:
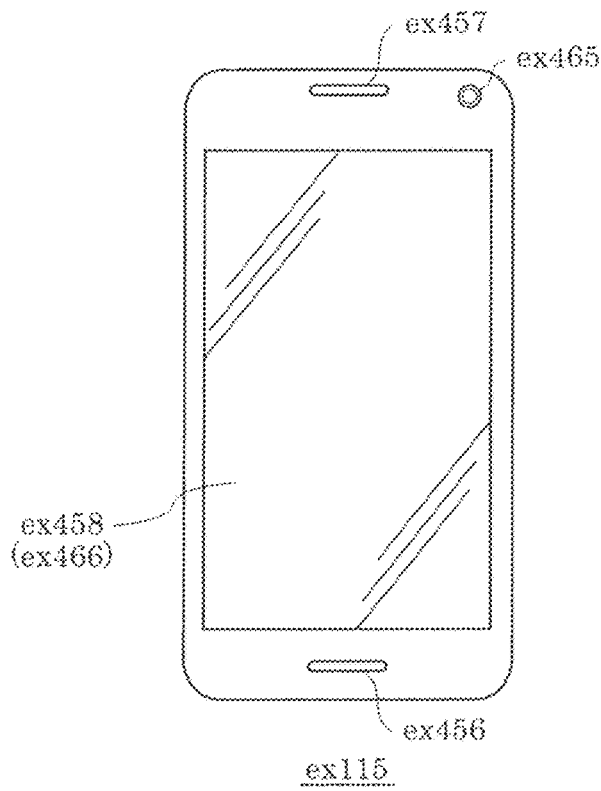
FIG. 45 illustrates one example of a smartphone.
Figure 46:
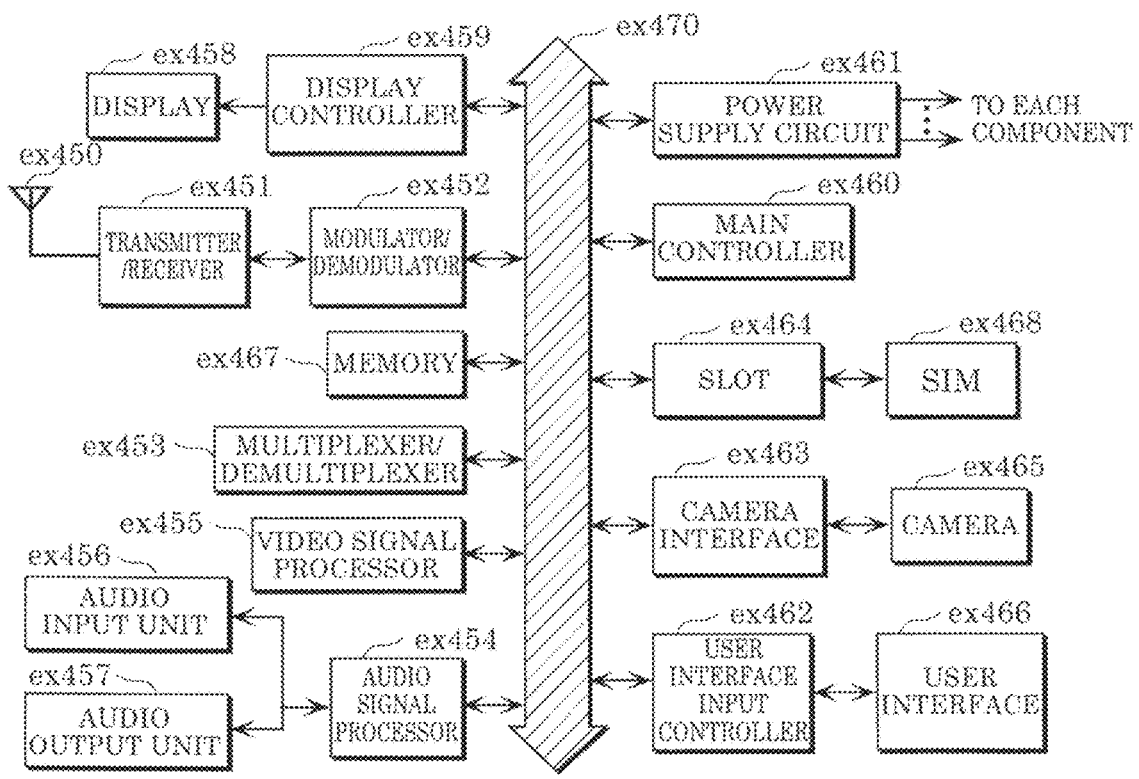
FIG. 46 is a block diagram illustrating a configuration example of a smartphone.

FIG. 45 illustrates further details of smartphone ex115 shown in FIG. 40. FIG. 46 illustrates a configuration example of smartphone ex115. Smartphone ex115 includes antenna ex450 for transmitting and receiving radio waves to and from base station ex110, camera ex465 capable of capturing video and still images, and display ex458 that displays decoded data, such as video captured by camera ex465 and video received by antenna ex450. Smartphone ex115 further includes user interface ex466 such as a touch panel, audio output unit ex457 such as a speaker for outputting speech or other audio, audio input unit ex456 such as a microphone for audio input, memory ex467 capable of storing decoded data such as captured video or still images, recorded audio, received video or still images, and mail, as well as decoded data, and slot ex464 which is an interface for SIM ex468 for authorizing access to a network and various data. Note that external memory may be used instead of memory ex467.

Main controller ex460, which comprehensively controls display ex458 and user interface ex466, power supply circuit ex461, user interface input controller ex462, video signal processor ex455, camera interface ex463, display controller ex459, modulator/demodulator ex452, multiplexer/demultiplexer ex453, audio signal processor ex454, slot ex464, and memory ex467 are connected via bus ex470.

When the user turns the power button of power supply circuit ex461 on, smartphone ex115 is powered on into an operable state and each component is supplied with power from a battery pack.

Smartphone ex115 performs processing for, for example, calling and data transmission, based on control performed by main controller ex460, which includes a CPU, ROM, and RAM. When making calls, an audio signal recorded by audio input unit ex456 is converted into a digital audio signal by audio signal processor ex454, to which spread spectrum processing is applied by modulator/demodulator ex452 and digital-analog conversion and frequency conversion processing is applied by transmitter/receiver ex451, and the resulting signal is transmitted via antenna ex450. The received data is amplified, frequency converted, and analog-digital converted, inverse spread spectrum processed by modulator/demodulator ex452, converted into an analog audio signal by audio signal processor ex454, and then output from audio output unit ex457. In data transmission mode, text, still-image, or video data is transmitted by main controller ex460 via user interface input controller ex462 based on operation of user interface ex466 of the main body, for example. Similar transmission and reception processing is performed. In data transmission mode, when sending a video, still image, or video and audio, video signal processor ex455 compression encodes, via the moving picture encoding method described in the above embodiments, a video signal stored in memory ex467 or a video signal input from camera ex465, and transmits the encoded video data to multiplexer/demultiplexer ex453. Audio signal processor ex454 encodes an audio signal recorded by audio input unit ex456 while camera ex465 is capturing a video or still image, and transmits the encoded audio data to multiplexer/demultiplexer ex453. Multiplexer/demultiplexer ex453 multiplexes the encoded video data and encoded audio data using a predetermined scheme, modulates and converts the data using modulator/demodulator (modulator/demodulator circuit) ex452 and transmitter/receiver ex451, and transmits the result via antenna ex450.

When video appended in an email or a chat, or a video linked from a web page is received, for example, in order to decode the multiplexed data received via antenna ex450, multiplexer/demultiplexer ex453 demultiplexes the multiplexed data to divide the multiplexed data into a bitstream of video data and a bitstream of audio data, supplies the encoded video data to video signal processor ex455 via synchronous bus ex470, and supplies the encoded audio data to audio signal processor ex454 via synchronous bus ex470. Video signal processor ex455 decodes the video signal using a moving picture decoding method corresponding to the moving picture encoding method described in the above embodiments, and video or a still image included in the linked moving picture file is displayed on display ex458 via display controller ex459. Audio signal processor ex454 decodes the audio signal and outputs audio from audio output unit ex457. Since real-time streaming is becoming increasingly popular, there may be instances in which reproduction of the audio may be socially inappropriate depending on the user's environment. Accordingly, as an initial value, a configuration in which only video data is reproduced, i.e., the audio signal is not reproduced, is preferable. Audio may be synchronized and reproduced only when an input, such as when the user clicks video data, is received.

Although smartphone ex115 was used in the above example, three other implementations are conceivable: a transceiver terminal including both an encoder and a decoder; a transmitter terminal including only an encoder; and a receiver terminal including only a decoder. In the description of the digital broadcasting system, an example is given in which multiplexed data obtained as a result of video data being multiplexed with audio data is received or transmitted. The multiplexed data, however, may be video data multiplexed with data other than audio data, such as text data related to the video. Further, the video data itself rather than multiplexed data maybe received or transmitted.

Although main controller ex460 including a CPU is described as controlling the encoding or decoding processes, various terminals often include GPUs. Accordingly, a configuration is acceptable in which a large area is processed at once by making use of the performance ability of the GPU via memory shared by the CPU and GPU or memory including an address that is managed so as to allow common usage by the CPU and GPU. This makes it possible to shorten encoding time, maintain the real-time nature of the stream, and reduce delay. In particular, processing relating to motion estimation, deblocking filtering, sample adaptive offset (SAO), and transformation/quantization can be effectively carried out by the GPU instead of the CPU in units of pictures, for example, all at once.

It will be appreciated by a person skilled in the art that numerous variations and/or modifications may be made to the present disclosure as shown in the specific embodiments without departing from the spirit or scope of the disclosure as broadly described. The present embodiments are, therefore, to be considered in all respects illustrative and not restrictive.

According to the present disclosure, there is provided various features such as:

1. An encoder for encoding a block to be coded in a picture using inter prediction, the encoder comprising:
    a processor; and
    memory,
    the processor using the memory to perform the steps of:
    acquiring two predicted images from two reference pictures by performing motion compensation using motion vectors corresponding to each of the two reference pictures;
    acquiring two gradient images corresponding to the two predicted images from the two reference pictures;
    deriving local motion estimation values using the two predicted images and the two gradient images in sub-blocks obtained by dividing the block to be coded; and
    generating a final prediction image of the block to be coded using the two predicted images, the two gradient images, and the local motion estimation values of the sub-blocks.

2. The encoder according to statement 1, wherein pixels are interpolated with sub-pixel precision by referencing pixels in an interpolation reference range surrounding a predicted block indicated by motion vectors in each of the two reference pictures when the two predicted images are to be obtained with sub-pixel precision in the acquisition of the two predicted images,
    the interpolation reference range being included in an ordinary reference range referenced in order to perform motion compensation on a block to be coded in ordinary inter prediction in which processing is performed using local motion estimation values.

3. The encoder according to statement 2, wherein the interpolation reference range matches the ordinary reference range.

4. The encoder according to statement 2 or 3, wherein pixels are referenced in a gradient reference range surrounding the predicted block in each of the two reference pictures in the acquisition of the two gradient images, and wherein the gradient reference range is included in the interpolation reference range.

5. The encoder according to statement 4, wherein the gradient reference range matches the interpolation reference range.

6. The encoder according to any one of statements 1 to 5, wherein values of pixels included in a predicted sub-block in an area corresponding to the sub-block in each of the two reference pictures are weighted and used in the derivation of the local motion estimation values, and wherein the pixel positioned at the center of the area among these pixels is weighted with values higher than those used for pixels outside the center of the area.

7. The encoder according to statement 6, wherein pixels are referenced in another predicted sub-block included in the predicted block indicated by the motion vectors in addition to the pixels in the predicted sub-block in the area corresponding to the sub-block in each of the two reference pictures in the derivation of the local motion estimation values, the other predicted sub-block being adjacent to the predicted sub-block.

8. The encoder according to any one of statements 6 to 7, wherein only some of the pixels in the predicted sub-block in the area corresponding to the sub-block are referenced in each of the two reference pictures in the derivation of the local motion estimation values.

9. The encoder according to statement 8, wherein
    in the derivation of the local motion estimation values,
    (i) a pixel pattern is selected in each of the two reference pictures from a plurality of pixel patterns indicating some of the pixels in the predicted sub-block, the pixel patterns being different from one another, and
    (ii) pixels in the predicted sub-block indicating the selected pixel pattern are referenced to derive local motion estimation values for the sub-block, the processor being configured to write information indicating the selected pixel pattern to a bit stream.

10. The encoder according to statement 8, wherein
    in the derivation of the local motion estimation values,
    (i) a pixel pattern is selected adaptively based on the two predicted images in each of the two reference pictures from a plurality of pixel patterns indicating some of the pixels in the predicted sub-block, the pixel patterns being different from one another, and
    (ii) pixels in the predicted sub-block indicating the selected pixel pattern are referenced to derive local motion estimation values for the sub-block.

11. An encoding method for encoding a block to be coded in a picture using inter prediction, the encoding method comprising the steps of:
    acquiring two predicted images from two reference pictures by performing motion compensation using motion vectors corresponding to each of the two reference pictures;
    acquiring two gradient images corresponding to the two predicted images from the two reference pictures;
    deriving local motion estimation values using the two predicted images and the two gradient images in sub-blocks obtained by dividing the block to be coded; and
    generating a final prediction image of the block to be coded using the two predicted images, the two gradient images, and the local motion estimation values of the sub-blocks.

12. A decoder for decoding a block to be decoded in a picture using inter prediction, the decoder comprising:
    a processor; and
    memory,
    the processor using the memory to perform the steps of:
    acquiring two predicted images from two reference pictures by performing motion compensation using motion vectors corresponding to each of the two reference pictures;
    acquiring two gradient images corresponding to the two predicted images from the two reference pictures;
    deriving local motion estimation values using the two predicted images and the two gradient images in sub-blocks obtained by dividing the block to be decoded; and
    generating a final prediction image of the block to be decoded using the two predicted images, the two gradient images, and the local motion estimation values of the sub-blocks.

13. The decoder according to statement 12, wherein pixels are interpolated with sub-pixel precision by referencing pixels in an interpolation reference range surrounding a predicted block indicated by motion vectors in each of the two reference pictures when the two predicted images are to be obtained with sub-pixel precision in the acquisition of the two predicted images, the interpolation reference range being included in an ordinary reference range referenced in order to perform motion compensation on a block to be decoded in ordinary inter prediction in which processing is performed using local motion estimation values.

14. The decoder according to statement 13, wherein the interpolation range matches the ordinary reference range.

15. The decoder according to statement 13 or 14, wherein pixels are referenced in a gradient reference range surrounding the predicted block in each of the two reference pictures in the acquisition of the two gradient images, and wherein the gradient reference range is included in the interpolation reference range.

16. The decoder according to statement 15, wherein the gradient reference range matches the interpolation reference range.

17. The decoder according to any one of statements 12 to 16, wherein values of pixels included in a predicted sub-block in an area corresponding to the sub-block in each of the two reference pictures is weighted and used in the derivation of the local motion estimation values, and wherein the pixel positioned at the center of the area among these pixels is weighted with values higher than those used for pixels outside the center of the area.

18. The decoder according to statement 17, wherein pixels are referenced in another predicted sub-block included in the predicted block indicated by the motion vectors in addition to the pixels in the predicted sub-block in the area corresponding to the sub-block in each of the two reference pictures in the derivation of the local motion estimation values, the other predicted sub-block being adjacent to the predicted sub-block.

19. The decoder according to any one of statements 17 to 18, wherein only some of the pixels in the predicted sub-block in the area corresponding to the sub-block are referenced in each of the two reference pictures in the derivation of the local motion estimation values.

20. The decoder according to statement 19, wherein the processor obtains information indicating a selected pixel pattern from a bit stream, and in the derivation of the local motion estimation values, (i) a pixel pattern is selected in each of the two reference pictures from a plurality of pixel patterns indicating some of the pixels in the predicted sub-block based on the obtained information, the pixel patterns being different from one another, and (ii) pixels in the predicted sub-block indicating the selected pixel pattern are referenced to derive local motion estimation values for the sub-block.

21. The decoder according to statement 19, wherein in the derivation of the local motion estimation values, (i) a pixel pattern is selected adaptively based on the two predicted images in each of the two reference pictures from a plurality of pixel patterns indicating some of the pixels in the predicted sub-block, the pixel patterns being different from one another, and (ii) pixels in the predicted sub-block indicating the selected pixel pattern are referenced to derive local motion estimation values for the sub-block.

22. A decoding method for decoding a block to be decoded in a picture using inter prediction, the decoding method comprising the steps of:

acquiring two predicted images from two reference pictures by performing motion compensation using motion vectors corresponding to each of the two reference pictures;

acquiring two gradient images corresponding to the two predicted images from the two reference pictures;

deriving local motion estimation values using the two predicted images and the two gradient images in sub-blocks obtained by dividing the block to be decoded; and generating a final prediction image of the block to be decoded using the two predicted images, the two gradient images, and the local motion estimation values of the sub-blocks.

23. An image encoder comprising:

circuitry; and a memory coupled to the circuitry, wherein the circuitry, in operation, performs the following:

predicting a first block of prediction samples for a current block of a picture, wherein predicting the first block of prediction samples includes at least a prediction process with a motion vector from a different picture;

padding the first block of prediction samples to form a second block of prediction samples, wherein the second block is larger than the first block;

calculating at least a gradient using the second block of prediction samples; and encoding the current block using at least the calculated gradient.

24. The image encoder of claim 23, wherein the first block of prediction samples is a prediction block used in the prediction process performed for a prediction mode, wherein the prediction mode is a merge mode or an inter prediction mode.

25. The image encoder of claim 23, wherein the first block of prediction samples is a reference block used in a motion compensation process performed for a prediction mode, wherein the prediction mode is a merge mode or an inter prediction mode.

26. The image encoder of claim 23, wherein the circuitry performs the following when padding the first block of prediction samples to form the second block of prediction samples:

padding at least two sides of the first block of prediction samples to form the second block of prediction samples, wherein the at least two sides of the first block are not orthogonal.

27. The image encoder of claim 23, wherein the circuitry performs the following when calculating at least a gradient:

applying a gradient filter to the second block of prediction samples to generate at least a differential value.

28. The image encoder of claim 23, wherein the circuitry performs the following when padding the first block of prediction samples to form the second block of prediction samples:

mirroring the prediction samples of the first block to form the second block of prediction samples.

29. The image encoder of claim 23, wherein the circuitry performs the following when padding the first block of prediction samples to form the second block of prediction samples:

duplicating the prediction samples of the first block to form the second block of prediction samples.

30. The image encoder of claim 23, wherein the circuitry performs the following when padding the first block of prediction samples to form the second block of prediction samples:

padding a fixed value to the first block of prediction samples to form the second block of prediction samples, wherein the fixed value may be 0, 128, a positive integer, a mean value of the first block of prediction samples, or a median value of the first block of prediction samples.

31. The image encoder of claim 23, wherein the circuitry performs the following when padding the first block of prediction samples to form the second block of prediction samples:

performing a function to the first block of prediction samples to form the second block of prediction samples.

32. The image encoder of claim 23, wherein the circuitry performs the following when padding the first block of prediction samples to form the second block of prediction samples:

combining at least two of mirroring, duplicating, padding a fixed value and performing a function to the first block of prediction samples to form the second block of prediction samples.

33. The image encoder of claim 23, wherein the circuitry further performs the following when predicting the first block of prediction samples for the current block of the picture:

predicting another block of prediction samples for the current block of the picture, wherein predicting the other block of prediction samples includes at least a prediction process with another motion vector from another different picture.

34. The image encoder of claim 33, wherein the other different picture has a picture order count that is different from a picture order count of the different picture and/or a picture order count of the picture.

35. The image encoder of claim 34, wherein the circuitry further performs the following when padding the first block of prediction samples to form the second block of prediction samples:

padding the other block of prediction samples to form yet another block of prediction samples.

36. The image encoder of claim 23, wherein after the circuitry pads the first block of prediction samples to form the second block of prediction samples, the circuitry performs an interpolation process for a prediction mode, wherein the prediction mode is a merge mode or an inter prediction mode.

37. The image encoder of claim 23, wherein before the circuitry pads the first block of prediction samples to form the second block of prediction samples, the circuitry performs an interpolation process for a prediction mode, wherein the prediction mode is a merge mode or an inter prediction mode.

38. The image encoder of claim 23, wherein the circuitry performs the following when encoding the current block using at least the calculated gradient: encoding the current block using a resulting block of prediction samples produced by an interpolation process and at least the calculated gradient.

39. The image encoder of claim 38, wherein the circuitry performs the following when calculating at least the gradient:

applying one or more gradient filter to the resulting block of prediction samples produced by the interpolation process to generate one or more differential value.

40. An image encoder comprising:
circuitry; and
a memory coupled to the circuitry,
wherein the circuitry, in operation, performs the following:
predicting a first block of prediction samples for a current block of a picture, wherein predicting the first block of prediction samples includes at least a prediction process with a motion vector from a different picture;
padding the first block of prediction samples to form a second block of prediction samples, wherein the second block is larger than the first block;
performing an interpolation process using the second block of prediction samples; and
encoding the current block using at least a resulting block of the interpolation process.

41. The image encoder according to claim 40, wherein the circuitry, in operation, performs the following:
performing an overlapped block motion compensation process for predicting one or more neighboring blocks of the current block, wherein the overlapped block motion compensation process uses at least a resulting block of the interpolation process.

42. The image encoder according to claim 40, wherein when the circuitry, in operation, pads the first block of prediction samples to form the second block of prediction samples, the circuitry is configured to perform the following:
padding samples for two sides of the first block of prediction samples, wherein the two sides of the first block are parallel to each other.

43. The image encoder according to claim 40, wherein when the circuitry, in operation, pads the first block of prediction samples to form the second block of prediction samples, the circuitry is configured to perform the following:
padding samples for more than two sides of the first block of prediction samples.

44. An image encoder comprising:
circuitry; and
a memory coupled to the circuitry,
wherein the circuitry, in operation, performs the following:
predicting a first block of prediction samples for a current block of a picture, wherein predicting the first block of prediction samples includes at least a prediction process with a motion vector from a different picture;
padding a second block of prediction samples to form a third block of prediction samples, wherein the second block is neighboring to the current block;
performing an overlapped block motion compensation process using at least the first block and the third block of prediction samples; and
encoding the current block using at least a resulting block of the overlapped block motion compensation process.

45. An image encoder comprising:
circuitry; and
a memory coupled to the circuitry,
wherein the circuitry, in operation, performs the following:
predicting a first block of prediction samples for a current block of a picture, wherein predicting the first block of prediction samples includes at least a prediction process with a first motion vector from a different picture;
deriving a second motion vector for the current block with a dynamic motion vector refreshing (DMVR) process using at least the first motion vector;

performing an interpolation process for the current block using the second motion vector, wherein the interpolation process includes a padding process; and encoding the current block using at least a resulting block of the interpolation process.

46. The image encoder according to claim 45, wherein when performing the interpolation process for the current block, the circuitry is configured to perform the following:

padding the first block of prediction samples into a second block of prediction samples according to the second motion vector; and performing the interpolation process using at least the second block of prediction samples.

47. The image encoder according to claim 46, wherein when padding the first block of prediction samples into the second block of prediction samples, the circuitry is configured to pad one or more sides of the first block of prediction samples according to the second motion vector.

48. The image encoder according to claim 45, wherein when deriving the second motion vector using the DMVR process, the circuitry is configured to perform a padding process to the first block of prediction samples according to the first motion vector.

49. An image encoder comprising:

a splitter which, in operation, receives and splits an original picture into blocks;

a first adder which, in operation, receives the blocks from the splitter and predictions from a prediction controller, and subtracts each prediction from its corresponding block to output a residual;

a transformer which, in operation, performs a transform on the residuals outputted from the adder to output transform coefficients;

a quantizer which, in operation, quantizes the transform coefficients to generate quantized transform coefficients;

an entropy encoder which, in operation, encodes the quantized transform coefficients to generate a bitstream;

an inverse quantizer and transformer which, in operation, inverse quantizes the quantized transform coefficients to obtain the transform coefficients and inverse transforms the transform coefficients to obtain the residuals;

a second adder which, in operation, adds the residuals outputted from the inverse quantizer and transformer and the predictions outputted from the prediction controller to reconstruct the blocks; and the prediction controller coupled to an inter predictor and a memory, wherein the inter predictor, in operation, generates a prediction of a current block based on a reference block in an encoded reference picture, wherein when generating the prediction of the current block based on the reference block in the encoded reference picture, the inter predictor performs:

predicting a first block of prediction samples for the current block, wherein predicting the first block of prediction samples includes at least a prediction process with a motion vector from the encoded reference picture;

padding the first block of prediction samples to form a second block of prediction samples, wherein the second block is larger than the first block;

calculating at least a gradient using the second block of prediction samples; and encoding the current block using at least the calculated gradient.

50. The image encoder of claim 49, wherein the first block of prediction samples is a prediction block used in the prediction process performed for a prediction mode, wherein the prediction mode is a merge mode or an inter prediction mode.

51. The image encoder of claim 49, wherein the first block of prediction samples is a reference block used in a motion compensation process performed for a prediction mode, wherein the prediction mode is a merge mode or an inter prediction mode.

52. The image encoder of claim 49, wherein the inter predictor performs the following when padding the first block of prediction samples to form the second block of prediction samples:

padding at least two sides of the first block of prediction samples to form the second block of prediction samples, wherein the at least two sides of the first block are not orthogonal.

53. The image encoder of claim 49, wherein the inter predictor performs the following when calculating at least a gradient:

applying a gradient filter to the second block of prediction samples to generate at least a differential value.

54. The image encoder of claim 49, wherein the inter predictor performs the following when padding the first block of prediction samples to form the second block of prediction samples:

mirroring the prediction samples of the first block to form the second block of prediction samples.

55. The image encoder of claim 49, wherein the inter predictor performs the following when padding the first block of prediction samples to form the second block of prediction samples:

duplicating the prediction samples of the first block to form the second block of prediction samples.

56. The image encoder of claim 49, wherein the inter predictor performs the following when padding the first block of prediction samples to form the second block of prediction samples:

padding a fixed value to the first block of prediction samples to form the second block of prediction samples, wherein the fixed value may be 0, 128, a positive integer, a mean value of the first block of prediction samples, or a median value of the first block of prediction samples.

57. The image encoder of claim 49, wherein the inter predictor performs the following when padding the first block of prediction samples to form the second block of prediction samples:

performing a function to the first block of prediction samples to form the second block of prediction samples.

58. The image encoder of claim 49, wherein the inter predictor performs the following when padding the first block of prediction samples to form the second block of prediction samples:

combining at least two of mirroring, duplicating, padding a fixed value and performing a function to the first block of prediction samples to form the second block of prediction samples.

59. The image encoder of claim 49, wherein the inter predictor further performs the following when predicting the first block of prediction samples for the current block of the picture:

predicting another block of prediction samples for the current block, wherein predicting the other block of prediction samples includes at least a prediction process with another motion vector from another encoded reference picture.

60. The image encoder of claim 59, wherein the other encoded reference picture has a picture order count that is different from a picture order count of the encoded reference picture and/or a picture order count of the original picture.

61. The image encoder of claim 60, wherein the inter predictor further performs the following when padding the first block of prediction samples to form the second block of prediction samples:

padding the other block of prediction samples to form yet another block of prediction samples.

62. The image encoder of claim 49, wherein after the inter predictor pads the first block of prediction samples to form the second block of prediction samples, the inter predictor performs an interpolation process for a prediction mode, wherein the prediction mode is a merge mode or an inter prediction mode.

63. The image encoder of claim 49, wherein before the inter predictor pads the first block of prediction samples to form the second block of prediction samples, the inter predictor performs an interpolation process for a prediction mode, wherein the prediction mode is a merge mode or an inter prediction mode.

64. The image encoder of claim 49, wherein the inter predictor performs the following when encoding the current block using at least the calculated gradient:

encoding the current block using a resulting block of prediction samples produced by an interpolation process and at least the calculated gradient.

65. The image encoder of claim 64, wherein the inter predictor performs the following when calculating at least the gradient:

applying one or more gradient filter to the resulting block of prediction samples produced by the interpolation process to generate one or more differential value.

66. An image encoder comprising:

a splitter which, in operation, receives and splits an original picture into blocks;

a first adder which, in operation, receives the blocks from the splitter and predictions from a prediction controller, and subtracts each prediction from its corresponding block to output a residual;

a transformer which, in operation, performs a transform on the residuals outputted from the adder to output transform coefficients;

a quantizer which, in operation, quantizes the transform coefficients to generate quantized transform coefficients;

an entropy encoder which, in operation, encodes the quantized transform coefficients to generate a bitstream;

an inverse quantizer and transformer which, in operation, inverse quantizes the quantized transform coefficients to obtain the transform coefficients and inverse transforms the transform coefficients to obtain the residuals;

a second adder which, in operation, adds the residuals outputted from the inverse quantizer and transformer and the predictions outputted from the prediction controller to reconstruct the blocks; and the prediction controller coupled to an inter predictor and a memory, wherein the inter predictor, in operation, generates a prediction of a current block based on a reference block in an encoded reference picture, wherein when generating the prediction of the current block based on the reference block in the encoded reference picture, the inter predictor performs:

predicting a first block of prediction samples for a current block of a picture, wherein predicting the first block of prediction samples includes at least a prediction process with a motion vector from a different picture;

padding the first block of prediction samples to form a second block of prediction samples, wherein the second block is larger than the first block;

performing an interpolation process using the second block of prediction samples; and encoding the current block using at least a resulting block of the interpolation process.

67. The image encoder of claim 66, wherein the inter predictor, in operation, performs the following:

performing an overlapped block motion compensation process for predicting one or more neighboring blocks of the current block, wherein the overlapped block motion compensation process uses at least a resulting block of the interpolation process.

68. The image encoder according to claim 66, wherein when the inter predictor, in operation, pads the first block of prediction samples to form the second block of prediction samples, the inter predictor is configured to perform the following:

padding samples for two sides of the first block of prediction samples, wherein the two sides of the first block are parallel to each other.

69. The image encoder according to claim 66, wherein when the inter predictor, in operation, pads the first block of prediction samples to form the second block of prediction samples, the inter predictor is configured to perform the following:

padding samples for more than two sides of the first block of prediction samples.

70. An image encoder comprising:

a splitter which, in operation, receives and splits an original picture into blocks;

a first adder which, in operation, receives the blocks from the splitter and predictions from a prediction controller, and subtracts each prediction from its corresponding block to output a residual;

a transformer which, in operation, performs a transform on the residuals outputted from the adder to output transform coefficients;

a quantizer which, in operation, quantizes the transform coefficients to generate quantized transform coefficients;

an entropy encoder which, in operation, encodes the quantized transform coefficients to generate a bitstream;

an inverse quantizer and transformer which, in operation, inverse quantizes the quantized transform coefficients to obtain the transform coefficients and inverse transforms the transform coefficients to obtain the residuals;

a second adder which, in operation, adds the residuals outputted from the inverse quantizer and transformer and the predictions outputted from the prediction controller to reconstruct the blocks; and the prediction controller coupled to an inter predictor and a memory, wherein the inter predictor, in operation, generates a prediction of a current block based on a reference block in an encoded reference picture, wherein when generating the prediction of the current block based on the reference block in the encoded reference picture, the inter predictor performs:

predicting a first block of prediction samples for a current block of a picture, wherein predicting the first block of prediction samples includes at least a prediction process with a motion vector from a different picture;

padding a second block of prediction samples to form a third block of prediction samples, wherein the second block is neighboring to the current block;

performing an overlapped block motion compensation process using at least the first block and the third block of prediction samples; and encoding the current block using at least a resulting block of the overlapped block motion compensation process.

71. An image encoder comprising:

a splitter which, in operation, receives and splits an original picture into blocks;

a first adder which, in operation, receives the blocks from the splitter and predictions from a prediction controller, and subtracts each prediction from its corresponding block to output a residual;

a transformer which, in operation, performs a transform on the residuals outputted from the adder to output transform coefficients;

a quantizer which, in operation, quantizes the transform coefficients to generate quantized transform coefficients;

an entropy encoder which, in operation, encodes the quantized transform coefficients to generate a bitstream;

an inverse quantizer and transformer which, in operation, inverse quantizes the quantized transform coefficients to obtain the transform coefficients and inverse transforms the transform coefficients to obtain the residuals;

a second adder which, in operation, adds the residuals outputted from the inverse quantizer and transformer and the predictions outputted from the prediction controller to reconstruct the blocks; and the prediction controller coupled to an inter predictor and a memory, wherein the inter predictor, in operation, generates a prediction of a current block based on a reference block in an encoded reference picture, wherein when generating the prediction of the current block based on the reference block in the encoded reference picture, the inter predictor performs:

predicting a first block of prediction samples for a current block of a picture, wherein predicting the first block of prediction samples includes at least a prediction process with a first motion vector from a different picture;

deriving a second motion vector for the current block with a dynamic motion vector refreshing (DMVR) process using at least the first motion vector;

performing an interpolation process for the current block using the second motion vector, wherein the interpolation process includes a padding process; and encoding the current block using at least a resulting block of the interpolation process.

72. The image encoder according to claim 71, wherein when performing the interpolation process for the current block, the inter predictor is configured to perform the following:

padding the first block of prediction samples into a second block of prediction samples according to the second motion vector; and performing the interpolation process using at least the second block of prediction samples.

73. The image encoder according to claim 72, wherein when padding the first block of prediction samples into the second block of prediction samples, the inter predictor is configured to pad one or more sides of the first block of prediction samples according to the second motion vector.

74. The image encoder according to claim 71, wherein when deriving the second motion vector using the DMVR process, the inter predictor is configured to perform a padding process to the first block of prediction samples according to the first motion vector.

75. An image decoder comprising:

circuitry; and a memory coupled to the circuitry, wherein the circuitry, in operation, performs the following:

predicting a first block of prediction samples for a current block of a picture, wherein predicting the first block of prediction samples includes at least a prediction process with a motion vector from a different picture;

padding the first block of prediction samples to form a second block of prediction samples, wherein the second block is larger than the first block;

calculating at least a gradient using the second block of prediction samples; and decoding the current block using at least the calculated gradient.

76. The image decoder of claim 75, wherein the first block of prediction samples is a prediction block used in the prediction process performed for a prediction mode, wherein the prediction mode is a merge mode or an inter prediction mode.

77. The image decoder of claim 75, wherein the first block of prediction samples is a reference block used in a motion compensation process performed for a prediction mode, wherein the prediction mode is a merge mode or an inter prediction mode.

78. The image decoder of claim 75, wherein the circuitry performs the following when padding the first block of prediction samples to form the second block of prediction samples:

padding at least two sides of the first block of prediction samples to form the second block of prediction samples, wherein the at least two sides of the first block are not orthogonal.

79. The image decoder of claim 75, wherein the circuitry performs the following when calculating at least a gradient:

applying a gradient filter to the second block of prediction samples to generate at least a differential value.

80. The image decoder of claim 75, wherein the circuitry performs the following when padding the first block of prediction samples to form the second block of prediction samples:

mirroring the prediction samples of the first block to form the second block of prediction samples.

81. The image decoder of claim 75, wherein the circuitry performs the following when padding the first block of prediction samples to form the second block of prediction samples:

duplicating the prediction samples of the first block to form the second block of prediction samples.

82. The image decoder of claim 75, wherein the circuitry performs the following when padding the first block of prediction samples to form the second block of prediction samples:

padding a fixed value to the first block of prediction samples to form the second block of prediction samples, wherein the fixed value may be 0, 128, a positive integer, a mean value of the first block of prediction samples, or a median value of the first block of prediction samples.

83. The image decoder of claim 75, wherein the circuitry performs the following when padding the first block of prediction samples to form the second block of prediction samples:

performing a function to the first block of prediction samples to form the second block of prediction samples.

84. The image decoder of claim 75, wherein the circuitry performs the following when padding the first block of prediction samples to form the second block of prediction samples:
  combining at least two of mirroring, duplicating, padding a fixed value and performing a function to the first block of prediction samples to form the second block of prediction samples.

85. The image decoder of claim 75, wherein the circuitry further performs the following when predicting the first block of prediction samples for the current block of the picture:
  predicting another block of prediction samples for the current block of the picture, wherein predicting the other block of prediction samples includes at least a prediction process with another motion vector from another different picture.

86. The image decoder of claim 85, wherein the other different picture has a picture order count that is different from a picture order count of the different picture and/or a picture order count of the picture.

87. The image decoder of claim 86, wherein the circuitry further performs the following when padding the first block of prediction samples to form the second block of prediction samples:
  padding the other block of prediction samples to form yet another block of prediction samples.

88. The image decoder of claim 75, wherein after the circuitry pads the first block of prediction samples to form the second block of prediction samples, the circuitry performs an interpolation process for a prediction mode, wherein the prediction mode is a merge mode or an inter prediction mode.

89. The image decoder of claim 75, wherein before the circuitry pads the first block of prediction samples to form the second block of prediction samples, the circuitry performs an interpolation process for a prediction mode, wherein the prediction mode is a merge mode or an inter prediction mode.

90. The image decoder of claim 75, wherein the circuitry performs the following when decoding the current block using at least the calculated gradient:
  decoding the current block using a resulting block of prediction samples produced by an interpolation process and at least the calculated gradient.

91. The image decoder of claim 90, wherein the circuitry performs the following when calculating at least the gradient:
  applying one or more gradient filter to the resulting block of prediction samples produced by the interpolation process to generate one or more differential value.

92. An image decoder comprising:
  circuitry; and
  a memory coupled to the circuitry,
  wherein the circuitry, in operation, performs the following:
    predicting a first block of prediction samples for a current block of a picture, wherein predicting the first block of prediction samples includes at least a prediction process with a motion vector from a different picture;
    padding the first block of prediction samples to form a second block of prediction samples, wherein the second block is larger than the first block;
    performing an interpolation process using the second block of prediction samples; and
    decoding the current block using at least a resulting block of the interpolation process.

93. The image decoder of claim 92, wherein the circuitry, in operation, performs the following:
  performing an overlapped block motion compensation process for predicting one or more neighboring blocks of the current block, wherein the overlapped block motion compensation process uses at least a resulting block of the interpolation process.

94. The image decoder according to claim 92, wherein when the circuitry, in operation, pads the first block of prediction samples to form the second block of prediction samples, the circuitry is configured to perform the following:
  padding samples for two sides of the first block of prediction samples, wherein the two sides of the first block are parallel to each other.

95. The image decoder according to claim 92, wherein when the circuitry, in operation, pads the first block of prediction samples to form the second block of prediction samples, the circuitry is configured to perform the following:
  padding samples for more than two sides of the first block of prediction samples.

96. An image decoder comprising:
  circuitry; and
  a memory coupled to the circuitry,
  wherein the circuitry, in operation, performs the following:
    predicting a first block of prediction samples for a current block of a picture, wherein predicting the first block of prediction samples includes at least a prediction process with a motion vector from a different picture;
    padding a second block of prediction samples to form a third block of prediction samples, wherein the second block is neighboring to the current block;
    performing an overlapped block motion compensation process using at least the first block and the third block of prediction samples; and
    decoding the current block using at least at least a resulting block of the overlapped block motion compensation process.

97. An image decoder comprising:
  circuitry; and
  a memory coupled to the circuitry,
  wherein the circuitry, in operation, performs the following:
    predicting a first block of prediction samples for a current block of a picture, wherein predicting the first block of prediction samples includes at least a prediction process with a first motion vector from a different picture;
    deriving a second motion vector for the current block with a dynamic motion vector refreshing (DMVR) process using at least the first motion vector;
    performing an interpolation process for the current block using the second motion vector, wherein the interpolation process includes a padding process; and
    decoding the current block using at least a resulting block of the interpolation process.

98. The image decoder according to claim 97, wherein when performing the interpolation process for the current block, the circuitry is configured to perform the following:
  padding the first block of prediction samples into a second block of prediction samples according to the second motion vector; and
  performing the interpolation process using at least the second block of prediction samples.

99. The image decoder according to claim 98, wherein when padding the first block of prediction samples into the second block of prediction samples, the circuitry is configured to pad one or more sides of the first block of prediction samples according to the second motion vector.

100. The image decoder according to claim 97, wherein when deriving the second motion vector using the DMVR process, the circuitry is configured to perform a padding process to the first block of prediction samples according to the first motion vector.

101. An image decoder comprising:

an entropy decoder which, in operation, receives and decodes an encoded bitstream to obtain quantized transform coefficients;

an inverse quantizer and transformer which, in operation, inverse quantizes the quantized transform coefficients to obtain transform coefficients and inverse transform the transform coefficients to obtain residuals;

an adder which, in operation, adds the residuals outputted from the inverse quantizer and transformer and predictions outputted from a prediction controller to reconstruct blocks; and the prediction controller coupled to an inter predictor and a memory, wherein the inter predictor, in operation, generates a prediction of a current block of a picture based on a reference block in a decoded reference picture, wherein when generating the prediction of the current block based on the reference block in the decoded reference picture, the inter predictor performs:

predicting a first block of prediction samples for the current block, wherein predicting the first block of prediction samples includes at least a prediction process with a motion vector from the decoded reference picture;

padding the first block of prediction samples to form a second block of prediction samples, wherein the second block is larger than the first block;

calculating at least a gradient using the second block of prediction samples; and decoding the current block using at least the calculated gradient.

102. The image decoder of claim 101, wherein the first block of prediction samples is a prediction block used in the prediction process performed for a prediction mode, wherein the prediction mode is a merge mode or an inter prediction mode.

103. The image decoder of claim 101, wherein the first block of prediction samples is a reference block used in a motion compensation process performed for a prediction mode, wherein the prediction mode is a merge mode or an inter prediction mode.

104. The image decoder of claim 101, wherein the inter predictor performs the following when padding the first block of prediction samples to form the second block of prediction samples:

padding at least two sides of the first block of prediction samples to form the second block of prediction samples, wherein the at least two sides of the first block are not orthogonal.

105. The image decoder of claim 101, wherein the inter predictor performs the following when calculating at least a gradient, the inter predictor performs the following:

applying a gradient filter to the second block of prediction samples to generate at least a differential value.

106. The image decoder of claim 101, wherein the inter predictor performs the following when padding the first block of prediction samples to form the second block of prediction samples:

mirroring the prediction samples of the first block to form the second block of prediction samples.

107. The image decoder of claim 101, wherein the inter predictor performs the following when padding the first block of prediction samples to form the second block of prediction samples:

duplicating the prediction samples of the first block to form the second block of prediction samples.

108. The image decoder of claim 101, wherein the inter predictor performs the following when padding the first block of prediction samples to form the second block of prediction samples:

padding a fixed value to the first block of prediction samples to form the second block of prediction samples, wherein the fixed value may be 0, 128, a positive integer, a mean value of the first block of prediction samples, or a median value of the first block of prediction samples.

109. The image decoder of claim 101, wherein the inter predictor performs the following when padding the first block of prediction samples to form the second block of prediction samples:

performing a function to the first block of prediction samples to form the second block of prediction samples.

110. The image decoder of claim 101, wherein the inter predictor performs the following when padding the first block of prediction samples to form the second block of prediction samples:

combining at least two of mirroring, duplicating, padding a fixed value and performing a function to the first block of prediction samples to form the second block of prediction samples.

111. The image decoder of claim 101, wherein the inter predictor further performs the following when predicting the first block of prediction samples for the current block of the picture:

predicting another block of prediction samples for the current block, wherein predicting the other block of prediction samples includes at least a prediction process with another motion vector from another decoded reference picture.

112. The image decoder of claim 111, wherein the other decoded reference picture has a picture order count that is different from a picture order count of the decoded reference picture and/or a picture order count of the picture.

113. The image decoder of claim 112, wherein the inter predictor further performs the following when padding the first block of prediction samples to form the second block of prediction samples:

padding the other block of prediction samples to form yet another block of prediction samples.

114. The image decoder of claim 101, wherein after the inter predictor pads the first block of prediction samples to form the second block of prediction samples, the inter predictor performs an interpolation process for a prediction mode, wherein the prediction mode is a merge mode or an inter prediction mode.

115. The image decoder of claim 101, wherein before the inter predictor pads the first block of prediction samples to form the second block of prediction samples, the inter predictor performs an interpolation process for a prediction mode, wherein the prediction mode is a merge mode or an inter prediction mode.

116. The image decoder of claim 101, wherein the inter predictor performs the following when decoding the current block using at least the calculated gradient:

decoding the current block using a resulting block of prediction samples produced by an interpolation process and at least the calculated gradient.

117. The image decoder of claim 116, wherein the inter predictor performs the following when calculating at least the gradient:

applying one or more gradient filter to the resulting block of prediction samples produced by the interpolation process to generate one or more differential value.

118. An image decoder comprising:

an entropy decoder which, in operation, receives and decodes an encoded bitstream to obtain quantized transform coefficients;

an inverse quantizer and transformer which, in operation, inverse quantizes the quantized transform coefficients to obtain transform coefficients and inverse transform the transform coefficients to obtain residuals;

an adder which, in operation, adds the residuals outputted from the inverse quantizer and transformer and predictions outputted from a prediction controller to reconstruct blocks; and the prediction controller coupled to an inter predictor and a memory, wherein the inter predictor, in operation, generates a prediction of a current block of a picture based on a reference block in a decoded reference picture, wherein when generating the prediction of the current block based on the reference block in the decoded reference picture, the inter predictor performs:

predicting a first block of prediction samples for a current block of a picture, wherein predicting the first block of prediction samples includes at least a prediction process with a motion vector from a different picture;

padding the first block of prediction samples to form a second block of prediction samples, wherein the second block is larger than the first block;

performing an interpolation process using the second block of prediction samples; and decoding the current block using at least a resulting block of the interpolation process.

119. The image decoder of claim 118, wherein the circuitry, in operation, performs the following:

performing an overlapped block motion compensation process for predicting one or more neighboring blocks of the current block, wherein the overlapped block motion compensation process uses at least a resulting block of the interpolation process.

120. The image decoder according to claim 118, wherein when the circuitry, in operation, pads the first block of prediction samples to form the second block of prediction samples, the circuitry is configured to perform the following:

padding samples for two sides of the first block of prediction samples, wherein the two sides of the first block are parallel to each other.

121. The image decoder according to claim 118, wherein when the circuitry, in operation, pads the first block of prediction samples to form the second block of prediction samples, the circuitry is configured to perform the following:

padding samples for more than two sides of the first block of prediction samples.

122. An image decoder comprising:

an entropy decoder which, in operation, receives and decodes an encoded bitstream to obtain quantized transform coefficients;

an inverse quantizer and transformer which, in operation, inverse quantizes the quantized transform coefficients to obtain transform coefficients and inverse transform the transform coefficients to obtain residuals;

an adder which, in operation, adds the residuals outputted from the inverse quantizer and transformer and predictions outputted from a prediction controller to reconstruct blocks; and the prediction controller coupled to an inter predictor and a memory, wherein the inter predictor, in operation, generates a prediction of a current block of a picture based on a reference block in a decoded reference picture, wherein when generating the prediction of the current block based on the reference block in the decoded reference picture, the inter predictor performs:

predicting a first block of prediction samples for a current block of a picture, wherein predicting the first block of prediction samples includes at least a prediction process with a motion vector from a different picture;

padding a second block of prediction samples to form a third block of prediction samples, wherein the second block is neighboring to the current block;

performing an overlapped block motion compensation process using at least the first block and the third block of prediction samples; and decoding the current block using at least at least a resulting block of the overlapped block motion compensation process.

123. An image decoder comprising:

circuitry; and a memory coupled to the circuitry, wherein the circuitry, in operation, performs the following:

predicting a first block of prediction samples for a current block of a picture, wherein predicting the first block of prediction samples includes at least a prediction process with a first motion vector from a different picture;

deriving a second motion vector for the current block with a dynamic motion vector refreshing (DMVR) process using at least the first motion vector;

performing an interpolation process for the current block using the second motion vector, wherein the interpolation process includes a padding process; and decoding the current block using at least a resulting block of the interpolation process.

124. The image decoder according to claim 123, wherein when performing the interpolation process for the current block, the circuitry is configured to perform the following:

padding the first block of prediction samples into a second block of prediction samples according to the second motion vector; and performing the interpolation process using at least the second block of prediction samples.

125. The image decoder according to claim 124, wherein when padding the first block of prediction samples into the second block of prediction samples, the circuitry is configured to pad one or more sides of the first block of prediction samples according to the second motion vector.

126. The image decoder according to claim 123, wherein when deriving the second motion vector using the DMVR process, the circuitry is configured to perform a padding process to the first block of prediction samples according to the first motion vector.

127. An image encoding method, comprising enabling an image encoder performing steps in accordance with any one of claims 1 to 48.

128. An image decoding method, comprising enabling an image decoder performing steps in accordance with any one of claims 75 to 100.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure can be applied, for example, to television receivers, digital video recorders, car navigation systems, mobile phones, digital cameras, and digital video cameras.

What is claimed is:

1. An image encoder comprising:
memory; and
circuitry coupled to the memory, wherein
in operation, the circuitry:
- generates a prediction block by performing an interpolation process using a value of a sample included in a reference picture;
- generates a gradient block using the prediction block, the gradient block having a size that is same as a size of the prediction block;
- generates a predicted image using the gradient block; and
- encodes a current block based on the predicted image, wherein
the generation of the gradient block includes a process of calculating a gradient value indicating a difference between a value of a lower sample and a value of an upper sample, the lower sample being adjacent to a bottom of a target sample, the upper sample being adjacent to a top of the target sample, the target sample being included in the prediction block,
a first gradient value located on an upper edge of the gradient block is calculated using, as the value of the upper sample, a value of a first sample which is co-located with the first gradient value in the prediction block, and
a second gradient value that is adjacent to a bottom of the first gradient value is calculated using the value of the first sample as the value of the upper sample.

2. An image decoder comprising:
memory; and
circuitry coupled to the memory, wherein
in operation, the circuitry:
- generates a prediction block by performing an interpolation process using a value of a sample included in a reference picture;
- generates a gradient block using the prediction block, the gradient block having a size that is same as a size of the prediction block;
- generates a predicted image using the gradient block; and
- decodes a current block based on the predicted image, wherein
the generation of the gradient block includes a process of calculating a gradient value indicating a difference between a value of a lower sample and a value of an upper sample, the lower sample being adjacent to a bottom of a target sample, the upper sample being adjacent to a top of the target sample, the target sample being included in the prediction block,
a first gradient value located on an upper edge of the gradient block is calculated using, as the value of the upper sample, a value of a first sample which is co-located with the first gradient value in the prediction block, and
a second gradient value that is adjacent to a bottom of the first gradient value is calculated using the value of the first sample as the value of the upper sample.

* * * * *